US007237634B2

(12) United States Patent
Severinsky et al.

(10) Patent No.: US 7,237,634 B2
(45) Date of Patent: *Jul. 3, 2007

(54) HYBRID VEHICLES

(75) Inventors: Alex J. Severinsky, Washington, DC (US); Theodore Louckes, Holly, MI (US)

(73) Assignee: PAICE LLC, Bonita Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/229,762

(22) Filed: Jan. 13, 2006

(65) Prior Publication Data

US 2006/0100057 A1 May 11, 2006

Related U.S. Application Data

(60) Division of application No. 10/382,577, filed on Mar. 7, 2003, now Pat. No. 7,104,347, which is a division of application No. 09/822,866, filed on Apr. 2, 2001, now Pat. No. 6,554,088, which is a continuation-in-part of application No. 09/264,817, filed on Mar. 9, 1999, now Pat. No. 6,209,672, said application No. 10/382,577 and a continuation-in-part of application No. 09/392,743, filed on Sep. 9, 1999, now Pat. No. 6,338,391.

(60) Provisional application No. 60/122,296, filed on Mar. 1, 1999, provisional application No. 60/100,095, filed on Sep. 14, 1998.

(51) Int. Cl.
*B06K 6/02* (2006.01)
(52) U.S. Cl. .................... 180/65.2; 180/65.4; 180/701; 180/54
(58) Field of Classification Search ............... 180/65.2, 180/65.3, 65.4, 65.8, 165; 477/2, 3; 701/54
See application file for complete search history.

(56) References Cited

U.S. PATENT DOCUMENTS

| 913,846 | A | 3/1909 | Pieper |
| 1,824,014 | A | 9/1931 | Froelich |
| 2,666,492 | A | 1/1954 | Nims et al. |

(Continued)

FOREIGN PATENT DOCUMENTS

DE 2517110 10/1975

(Continued)

OTHER PUBLICATIONS

Winkelman et al, SAE paper 730511, "Computer Simulation . . . " (1973).

(Continued)

*Primary Examiner*—David R. Dunn
(74) *Attorney, Agent, or Firm*—Michael de Angeli

(57) ABSTRACT

A hybrid vehicle comprises an internal combustion engine, a traction motor, a starter motor, and a battery bank, all controlled by a microprocessor in accordance with the vehicle's instantaneous torque demands so that the engine is run only under conditions of high efficiency, typically only when the load is at least equal to 30% of the engine's maximum torque output. In some embodiments, a turbocharger may be provided, activated only when the load exceeds the engine's maximum torque output for an extended period; a two-speed transmission may further be provided, to further broaden the vehicle's load range. A hybrid brake system provides regenerative braking, with mechanical braking available in the event the battery bank is fully charged, in emergencies, or at rest; a control mechanism is provided to control the brake system to provide linear brake feel under varying circumstances.

306 Claims, 17 Drawing Sheets

U.S. PATENT DOCUMENTS

| | | |
|---|---|---|
| 3,211,249 A | 10/1965 | Papst |
| 3,454,122 A | 7/1969 | Grady, Jr. |
| 3,502,165 A | 3/1970 | Matsukata |
| 3,525,874 A | 8/1970 | Toy |
| 3,566,717 A | 3/1971 | Berman et al. |
| 3,620,323 A | 11/1971 | Maeda |
| 3,623,568 A | 11/1971 | Mori |
| 3,650,345 A | 3/1972 | Yardney |
| 3,699,351 A | 10/1972 | Addie |
| 3,719,881 A | 3/1973 | Shibata et al. |
| 3,732,751 A | 5/1973 | Berman et al. |
| 3,753,059 A | 8/1973 | Berman |
| 3,790,816 A | 2/1974 | Berman |
| 3,791,473 A | 2/1974 | Rosen |
| 3,837,419 A | 9/1974 | Nakamura |
| 3,874,472 A | 4/1975 | Deane |
| 3,888,325 A | 6/1975 | Reinbeck |
| 3,904,883 A | 9/1975 | Horwinski |
| 3,923,115 A | 12/1975 | Helling |
| 3,970,163 A | 7/1976 | Kinoshita |
| 4,042,056 A | 8/1977 | Horwinski |
| 4,090,577 A | 5/1978 | Moore |
| 4,095,664 A | 6/1978 | Bray |
| 4,099,589 A | 7/1978 | Williams |
| 4,126,200 A | 11/1978 | Miller et al. |
| 4,148,192 A | 4/1979 | Cummings |
| 4,165,795 A | 8/1979 | Lynch et al. |
| 4,180,138 A | 12/1979 | Shea |
| 4,187,436 A | 2/1980 | Etienne |
| 4,216,684 A | 8/1980 | Hagin et al. |
| 4,233,858 A | 11/1980 | Rowlett |
| 4,269,280 A | 5/1981 | Rosen |
| 4,287,792 A | 9/1981 | Dailey |
| 4,305,254 A | 12/1981 | Kawakatsu |
| 4,306,156 A | 12/1981 | Monaco et al. |
| 4,313,080 A | 1/1982 | Park |
| 4,331,911 A | 5/1982 | Park |
| 4,335,429 A | 6/1982 | Kawakatsu |
| 4,351,405 A | 9/1982 | Fields et al. |
| 4,354,144 A | 10/1982 | McCarthy |
| 4,400,997 A | 8/1983 | Fiala |
| 4,405,029 A | 9/1983 | Hunt |
| 4,407,132 A | 10/1983 | Kawakatsu |
| 4,411,171 A | 10/1983 | Fiala |
| 4,416,360 A | 11/1983 | Fiala |
| 4,438,342 A | 3/1984 | Kenyon |
| 4,439,989 A | 4/1984 | Yamakawa |
| 4,444,285 A | 4/1984 | Stewart et al. |
| 4,470,476 A | 9/1984 | Hunt |
| 4,495,451 A | 1/1985 | Barnard |
| 4,511,012 A | 4/1985 | Rauneker |
| 4,533,011 A | 8/1985 | Heidemeyer |
| 4,562,894 A | 1/1986 | Yang |
| 4,578,955 A | 4/1986 | Medina |
| 4,583,505 A | 4/1986 | Frank et al. |
| 4,588,040 A | 5/1986 | Albright, Jr. et al. |
| 4,591,016 A | 5/1986 | Matthews |
| 4,592,454 A | 6/1986 | Michel |
| 4,593,779 A | 6/1986 | Krohling |
| 4,597,463 A | 7/1986 | Barnard |
| 4,611,466 A | 9/1986 | Keedy |
| 4,631,456 A | 12/1986 | Drescher et al. |
| 4,646,896 A | 3/1987 | Hammond et al. |
| 4,674,280 A | 6/1987 | Stuhr |
| 4,680,986 A | 7/1987 | Elsner |
| 4,697,660 A | 10/1987 | Wu et al. |
| 4,753,078 A | 6/1988 | Gardner |
| 4,762,191 A | 8/1988 | Hagin et al. |
| 4,765,656 A | 8/1988 | Becker et al. |
| 4,774,811 A | 10/1988 | Kawamura |
| 4,815,334 A | 3/1989 | Lexen |
| 4,862,009 A | 8/1989 | King |
| 4,923,025 A | 5/1990 | Ellers |
| 4,951,769 A | 8/1990 | Kawamura |
| 4,953,646 A | 9/1990 | Kim |
| 5,000,003 A | 3/1991 | Wicks |
| 5,053,632 A | 10/1991 | Suzuki et al. |
| 5,081,365 A | 1/1992 | Field et al. |
| 5,117,931 A | 6/1992 | Nishida |
| 5,120,282 A | 6/1992 | Fjällström |
| 5,125,469 A | 6/1992 | Scott |
| 5,141,173 A | 8/1992 | Lay |
| 5,172,784 A | 12/1992 | Varela, Jr. |
| 5,176,213 A | 1/1993 | Kawai et al. |
| 5,193,634 A | 3/1993 | Masut |
| 5,212,431 A | 5/1993 | Origuchi et al. |
| 5,242,335 A | 9/1993 | Kutter |
| 5,249,637 A | 10/1993 | Heidl et al. |
| 5,253,929 A | 10/1993 | Ohori |
| 5,255,733 A | 10/1993 | King |
| 5,258,651 A | 11/1993 | Sherman |
| 5,264,764 A | 11/1993 | Kuang |
| 5,283,470 A | 2/1994 | Hadley et al. |
| 5,291,960 A | 3/1994 | Brandenburg et al. |
| 5,301,764 A | 4/1994 | Gardner |
| 5,318,142 A | 6/1994 | Bates et al. |
| 5,323,688 A | 6/1994 | Walker |
| 5,323,868 A | 6/1994 | Kawashima |
| 5,326,158 A | 7/1994 | Ohori |
| 5,327,987 A | 7/1994 | Abdelmalek |
| 5,327,992 A | 7/1994 | Boll |
| 5,336,932 A | 8/1994 | Barske |
| 5,337,848 A | 8/1994 | Bader |
| 5,343,970 A | 9/1994 | Severinsky ............... 180/65.2 |
| 5,345,154 A | 9/1994 | King |
| 5,345,761 A | 9/1994 | King et al. |
| 5,346,031 A | 9/1994 | Gardner |
| 5,350,031 A | 9/1994 | Sugiyama et al. |
| 5,371,412 A | 12/1994 | Iwashita |
| 5,372,213 A | 12/1994 | Hasebe et al. |
| 5,384,521 A | 1/1995 | Coe |
| 5,403,244 A | 4/1995 | Tankersley |
| 5,406,126 A | 4/1995 | Hadley et al. |
| 5,412,251 A | 5/1995 | Furutani |
| 5,412,293 A | 5/1995 | Minesawa et al. |
| 5,415,245 A | 5/1995 | Hammond |
| 5,415,603 A | 5/1995 | Tuzuki et al. |
| 5,427,196 A | 6/1995 | Yamaguchi et al. |
| 5,428,274 A | 6/1995 | Furutani et al. |
| 5,433,282 A | 7/1995 | Moroto et al. |
| 5,441,122 A | 8/1995 | Yoshida |
| 5,457,363 A | 10/1995 | Yoshii et al. |
| 5,463,294 A | 10/1995 | Valdivia |
| 5,473,228 A | 12/1995 | Nii |
| 5,476,151 A | 12/1995 | Tsuchida et al. |
| 5,489,001 A | 2/1996 | Yang |
| 5,492,189 A | 2/1996 | Kriegler et al. |
| 5,492,190 A | 2/1996 | Yoshida |
| 5,492,192 A | 2/1996 | Brooks et al. |
| 5,495,906 A | 3/1996 | Furutani |
| 5,495,907 A | 3/1996 | Data |
| 5,495,912 A | 3/1996 | Gray, Jr. et al. |
| 5,497,941 A | 3/1996 | Numazawa et al. |
| 5,513,718 A | 5/1996 | Suzuki et al. |
| 5,513,719 A | 5/1996 | Moroto et al. |
| 5,515,937 A | 5/1996 | Adler et al. |
| 5,539,318 A | 7/1996 | Sasaki |
| 5,545,928 A | 8/1996 | Kotani |
| 5,547,433 A | 8/1996 | Yang |
| 5,549,524 A | 8/1996 | Yang |
| 5,550,445 A | 8/1996 | Nii |
| 5,558,173 A | 9/1996 | Sherman |
| 5,558,175 A | 9/1996 | Sherman |
| 5,558,588 A | 9/1996 | Schmidt |

| | | | | | |
|---|---|---|---|---|---|
| 5,558,595 A | 9/1996 | Schmidt et al. | 5,791,427 A | 8/1998 | Yamaguchi et al. |
| 5,562,565 A | 10/1996 | Moroto et al. | 5,799,744 A | 9/1998 | Yamaguchi et al. |
| 5,562,566 A | 10/1996 | Yang | 5,801,497 A | 9/1998 | Shamoto et al. |
| 5,565,711 A | 10/1996 | Hagiwara | 5,804,947 A | 9/1998 | Nii et al. |
| 5,566,774 A | 10/1996 | Yoshida | 5,806,617 A | 9/1998 | Yamaguchi et al. |
| 5,568,023 A | 10/1996 | Grayer et al. | 5,816,358 A | 10/1998 | Adler et al. |
| 5,569,995 A | 10/1996 | Kusaka et al. | 5,818,116 A | 10/1998 | Nakae |
| 5,570,615 A | 11/1996 | Westphal et al. | 5,820,172 A | 10/1998 | Brigham et al. |
| 5,586,613 A | 12/1996 | Ehsani | 5,823,280 A | 10/1998 | Lateur ...................... 180/65.2 |
| 5,588,498 A | 12/1996 | Kitada | 5,823,281 A | 10/1998 | Yamaguchi et al. |
| 5,589,743 A | 12/1996 | King | 5,826,671 A | 10/1998 | Nakae et al. |
| 5,608,308 A | 3/1997 | Kiuchi et al. | 5,831,341 A | 11/1998 | Selfors et al. |
| 5,614,809 A | 3/1997 | Kiuchi et al. | 5,833,022 A | 11/1998 | Welke |
| 5,621,304 A | 4/1997 | Kiuchi et al. | 5,833,570 A | 11/1998 | Tabata |
| 5,623,194 A | 4/1997 | Boll | 5,839,530 A | 11/1998 | Dietzel |
| 5,632,352 A | 5/1997 | Jeanneret et al. | 5,839,533 A | 11/1998 | Mikami et al. |
| 5,635,805 A | 6/1997 | Ibaraki et al. | 5,841,201 A | 11/1998 | Tabata et al. |
| 5,637,977 A | 6/1997 | Saito et al. | 5,842,534 A | 12/1998 | Frank ........................ 180/65.2 |
| 5,637,987 A | 6/1997 | Fattic et al. | 5,844,342 A | 12/1998 | Miyatani et al. |
| 5,643,119 A | 7/1997 | Yamaguchi et al. | 5,845,731 A | 12/1998 | Buglione et al. .......... 180/65.2 |
| 5,644,200 A | 7/1997 | Yang | 5,846,155 A | 12/1998 | Taniguchi et al. |
| 5,650,713 A | 7/1997 | Takeuchi et al. | 5,847,469 A | 12/1998 | Tabata |
| 5,650,931 A | 7/1997 | Nii | 5,851,698 A | 12/1998 | Reichmann et al. |
| 5,653,302 A | 8/1997 | Edye et al. | 5,856,047 A | 1/1999 | Venkatesan et al. |
| 5,656,921 A | 8/1997 | Farrall | 5,856,709 A | 1/1999 | Ibaraki et al. |
| 5,660,077 A | 8/1997 | Nekola | 5,862,497 A | 1/1999 | Yano et al. |
| 5,664,635 A | 9/1997 | Koga et al. | 5,865,263 A | 2/1999 | Yamaguchi et al. |
| 5,667,029 A | 9/1997 | Urban et al. | 5,873,426 A | 2/1999 | Tabata |
| 5,669,842 A | 9/1997 | Schmidt | 5,875,691 A | 3/1999 | Hata |
| 5,672,920 A | 9/1997 | Donegan et al. | 5,883,484 A | 3/1999 | Akao |
| 5,675,203 A | 10/1997 | Schulze et al. | 5,883,496 A | 3/1999 | Esaki et al. |
| 5,675,222 A | 10/1997 | Fliege | 5,887,670 A | 3/1999 | Tabata et al. |
| 5,678,646 A | 10/1997 | Fliege | 5,887,674 A | 3/1999 | Gray |
| 5,679,087 A | 10/1997 | Lutz | 5,890,470 A | 4/1999 | Woon |
| 5,680,050 A | 10/1997 | Kawai et al. | 5,890,555 A | 4/1999 | Miller |
| 5,685,798 A | 11/1997 | Lutz | 5,893,895 A | 4/1999 | Ibaraki |
| 5,691,588 A | 11/1997 | Lutz | 5,895,100 A | 4/1999 | Ito et al. |
| 5,697,466 A | 12/1997 | Moroto et al. ............. 180/65.2 | 5,895,333 A | 4/1999 | Morisawa |
| 5,698,905 A | 12/1997 | Ruthlein et al. | 5,898,282 A | 4/1999 | Drozdz et al. |
| 5,698,955 A | 12/1997 | Nii | 5,899,286 A | 5/1999 | Yamaguchi et al. |
| 5,704,440 A | 1/1998 | Urban et al. | 5,904,631 A | 5/1999 | Morisawa et al. |
| 5,705,859 A | 1/1998 | Karg et al. | 5,905,360 A | 5/1999 | Ukita |
| 5,713,425 A | 2/1998 | Buschhaus et al. | 5,907,191 A | 5/1999 | Sasaki et al. |
| 5,713,426 A | 2/1998 | Okamura | 5,908,077 A | 6/1999 | Moore |
| 5,713,427 A | 2/1998 | Lutz | 5,909,720 A | 6/1999 | Yamaoka |
| 5,713,814 A | 2/1998 | Hara et al. | 5,914,575 A | 6/1999 | Sasaki |
| 5,714,851 A | 2/1998 | Antony et al. | 5,915,488 A | 6/1999 | Fliege |
| 5,722,502 A | 3/1998 | Kubo | 5,915,489 A | 6/1999 | Yamaguchi |
| 5,722,911 A | 3/1998 | Ibaraki et al. | 5,923,093 A | 7/1999 | Tabata |
| 5,725,064 A | 3/1998 | Ibaraki et al. | 5,924,395 A | 7/1999 | Moriya et al. |
| 5,755,302 A | 5/1998 | Lutz | 5,927,415 A | 7/1999 | Ibaraki et al. |
| 5,755,303 A | 5/1998 | Yamamoto et al. | 5,927,417 A | 7/1999 | Brunner et al. ............ 180/65.6 |
| 5,757,151 A | 5/1998 | Donegan et al. | 5,928,301 A | 7/1999 | Soga et al. |
| 5,767,637 A | 6/1998 | Lansberry | 5,929,594 A | 7/1999 | Nonobe et al. |
| 5,771,478 A | 6/1998 | Tsukamoto | 5,931,271 A | 8/1999 | Haka |
| 5,773,904 A | 6/1998 | Schiebold et al. | 5,934,395 A | 8/1999 | Koide et al. ................ 180/65.2 |
| 5,775,449 A | 7/1998 | Moroto et al. | 5,935,040 A | 8/1999 | Tabata et al. |
| 5,778,326 A | 7/1998 | Moroto et al. | 5,943,918 A | 8/1999 | Reed, Jr. et al. |
| 5,778,997 A | 7/1998 | Setaka et al. | 5,944,630 A | 8/1999 | Omote |
| 5,785,136 A | 7/1998 | Falkenmayer et al. | 5,947,855 A | 9/1999 | Weiss |
| 5,785,137 A | 7/1998 | Reuyl | 5,951,115 A | 9/1999 | Sakai et al. |
| 5,785,138 A | 7/1998 | Yoshida | 5,951,118 A | 9/1999 | Soejima |
| 5,786,640 A | 7/1998 | Sakai et al. | 5,951,614 A | 9/1999 | Tabata |
| 5,788,003 A | 8/1998 | Spiers | 5,964,309 A | 10/1999 | Kimura et al. |
| 5,788,004 A | 8/1998 | Friedmann et al. | 5,967,940 A | 10/1999 | Yamaguchi et al. |
| 5,788,006 A | 8/1998 | Yamaguchi et al. | 5,969,624 A | 10/1999 | Sakai et al. ................. 340/636 |
| 5,788,597 A | 8/1998 | Boll et al. | 5,971,088 A | 10/1999 | Smith |
| 5,789,823 A | 8/1998 | Sherman | 5,971,092 A | 10/1999 | Walker |
| 5,789,877 A | 8/1998 | Yamada et al. | 5,973,460 A | 10/1999 | Taga et al. |
| 5,789,881 A | 8/1998 | Egami et al. | 5,973,463 A | 10/1999 | Okuda et al. |
| 5,789,882 A | 8/1998 | Ibaraki et al. | 5,979,158 A | 11/1999 | Kaiser |
| 5,789,935 A | 8/1998 | Suga et al. | 5,979,257 A | 11/1999 | Lawrie |
| 5,791,426 A | 8/1998 | Yamada | 5,982,045 A | 11/1999 | Tabata et al. |

| | | | | | | |
|---|---|---|---|---|---|---|
| 5,983,740 A | 11/1999 | Salecker et al. | | 6,281,660 B1 | 8/2001 | Abe |
| 5,984,034 A | 11/1999 | Morisawa | | 6,291,953 B1 | 9/2001 | Lovatt et al. |
| 5,984,432 A | 11/1999 | Otomo et al. | | 6,300,735 B1 | 10/2001 | Stemler |
| 5,986,376 A | 11/1999 | Werson | | 6,306,057 B1 | 10/2001 | Morisawa |
| 5,988,307 A | 11/1999 | Yamada et al. | | 6,307,276 B1 | 10/2001 | Bader |
| 5,991,683 A | 11/1999 | Takaoka et al. | | 6,315,068 B1 * | 11/2001 | Hoshiya et al. ............ 180/65.2 |
| 5,993,169 A | 11/1999 | Adachi et al. | | 6,317,665 B1 | 11/2001 | Tabata et al. |
| 5,993,350 A | 11/1999 | Lawrie et al. | | 6,318,487 B2 | 11/2001 | Yanase et al. |
| 5,993,351 A | 11/1999 | Deguchi et al. ............... 477/5 | | 6,321,150 B1 | 11/2001 | Nitta |
| 5,996,347 A | 12/1999 | Nagae et al. | | 6,328,122 B1 | 12/2001 | Yamada |
| 6,003,626 A | 12/1999 | Ibaraki et al. | | 6,328,670 B1 | 12/2001 | Minowa |
| 6,005,297 A | 12/1999 | Sasaki et al. | | 6,328,671 B1 | 12/2001 | Nakajima |
| 6,006,149 A | 12/1999 | Salecker et al. | | 6,330,498 B2 * | 12/2001 | Tamagawa et al. ........... 701/22 |
| 6,006,620 A | 12/1999 | Lawrie et al. | | 6,332,257 B1 | 12/2001 | Reed, Jr. et al. |
| 6,007,443 A | 12/1999 | Onimaru | | 6,334,498 B1 | 1/2002 | Morisawa |
| 6,007,451 A | 12/1999 | Matsui et al. | | 6,338,391 B1 | 1/2002 | Severinsky et al. |
| 6,009,365 A | 12/1999 | Takahara et al. | | 6,340,339 B1 | 1/2002 | Tabata |
| 6,018,198 A | 1/2000 | Tsuzuki et al. | | 6,344,008 B1 | 2/2002 | Nagano |
| 6,018,694 A | 1/2000 | Egami et al. ............... 701/102 | | 6,357,541 B1 | 3/2002 | Matsuda et al. |
| 6,019,698 A | 2/2000 | Lawrie et al. | | 6,359,404 B1 * | 3/2002 | Sugiyama et al. .......... 318/432 |
| 6,026,921 A | 2/2000 | Aoyama et al. ........... 180/65.2 | | 6,387,007 B1 | 5/2002 | Fini |
| 6,032,753 A | 3/2000 | Yamazaki et al. | | 6,394,209 B1 | 5/2002 | Goehring et al. |
| 6,041,877 A | 3/2000 | Yamada et al. | | 6,435,296 B1 | 8/2002 | Arai |
| 6,044,922 A | 4/2000 | Field | | 6,470,983 B1 * | 10/2002 | Amano et al. ............. 180/65.2 |
| 6,048,289 A | 4/2000 | Hattori et al. ................ 477/15 | | 6,481,516 B1 | 11/2002 | Field et al. |
| 6,053,841 A | 4/2000 | Koide et al. | | 6,563,230 B2 | 5/2003 | Nada |
| 6,053,842 A | 4/2000 | Kitada et al. .................. 477/5 | | 6,592,484 B1 | 7/2003 | Tsai |
| 6,054,844 A | 4/2000 | Frank .......................... 322/16 | | | | |
| RE36,678 E | 5/2000 | Moroto et al. | | | | |
| 6,059,059 A | 5/2000 | Schmidt-Brucken | | | | |
| 6,059,064 A | 5/2000 | Nagano et al. | | | | |
| 6,064,161 A | 5/2000 | Takahara | | | | |
| 6,067,801 A | 5/2000 | Harada et al. | | | | |
| 6,070,680 A | 6/2000 | Oyama | | | | |
| 6,074,321 A | 6/2000 | Maeda et al. | | | | |
| 6,077,186 A | 6/2000 | Kojima et al. | | | | |
| 6,081,042 A | 6/2000 | Tabata et al. | | | | |
| 6,087,734 A | 7/2000 | Maeda et al. | | | | |
| 6,090,007 A | 7/2000 | Nakajima | | | | |
| 6,098,733 A | 8/2000 | Ibaraki et al. | | | | |
| 6,109,025 A | 8/2000 | Murata et al. | | | | |
| 6,110,066 A | 8/2000 | Nedungadi et al. | | | | |
| 6,116,363 A | 9/2000 | Frank | | | | |
| 6,119,799 A | 9/2000 | Morisawa | | | | |
| 6,123,163 A | 9/2000 | Otsu et al. | | | | |
| 6,123,642 A | 9/2000 | Saito | | | | |
| 6,131,538 A | 10/2000 | Kanai | | | | |
| 6,131,680 A | 10/2000 | Nii et al. | | | | |
| 6,135,914 A | 10/2000 | Yamaguchi et al. | | | | |
| 6,142,907 A | 11/2000 | Minowa | | | | |
| 6,146,302 A | 11/2000 | Kashiwase | | | | |
| 6,155,364 A | 12/2000 | Nagano et al. | | | | |
| 6,158,541 A | 12/2000 | Tabata | | | | |
| 6,161,384 A | 12/2000 | Reinbold et al. | | | | |
| 6,166,499 A | 12/2000 | Kanamori et al. | | | | |
| 6,170,587 B1 | 1/2001 | Bullock | | | | |
| 6,176,807 B1 | 1/2001 | Oba et al. | | | | |
| 6,183,389 B1 | 2/2001 | Tabata et al. | | | | |
| 6,190,282 B1 | 2/2001 | Deguchi et al. | | | | |
| 6,203,468 B1 | 3/2001 | Nitta | | | | |
| 6,204,636 B1 | 3/2001 | Kinoshita et al. | | | | |
| 6,209,672 B1 | 4/2001 | Severinsky | | | | |
| 6,225,784 B1 | 5/2001 | Kinoshita et al. | | | | |
| 6,231,135 B1 | 5/2001 | Bower et al. | | | | |
| 6,232,733 B1 | 5/2001 | Obayashi et al. | | | | |
| 6,232,748 B1 | 5/2001 | Kinoshita et al. | | | | |
| 6,247,437 B1 | 6/2001 | Yamaguchi et al. | | | | |
| 6,253,865 B1 | 7/2001 | Suzuki | | | | |
| 6,258,001 B1 | 7/2001 | Wakuta | | | | |
| 6,260,644 B1 | 7/2001 | Otsu | | | | |
| 6,265,692 B1 | 7/2001 | Umebayahi et al. | | | | |
| 6,278,195 B1 | 8/2001 | Yamaguchi et al. | | | | |
| 6,278,915 B1 | 8/2001 | Deguchi et al. | | | | |

FOREIGN PATENT DOCUMENTS

| | | |
|---|---|---|
| DE | 1905641 | 6/1976 |
| DE | 19814402 | 3/1998 |
| DE | 19838853 | 8/1998 |
| EP | 136055 | 3/1985 |
| EP | 0136055 | 3/1985 |
| EP | 510582 | 10/1992 |
| EP | 0510582 | 12/1995 |
| EP | 0743211 | 5/1996 |
| EP | 0769403 | 4/1997 |
| EP | 0839683 | 10/1997 |
| FR | 2419832 | 3/1978 |
| JP | S 4849115 | 10/1971 |
| JP | S 5030223 | 7/1973 |
| JP | 4864626 | 9/1973 |
| JP | 4929642 | 8/1974 |
| JP | 51103220 | 8/1976 |
| JP | 5355105 | 5/1978 |
| JP | 55069724 | 11/1978 |
| JP | 55110328 | 8/1980 |
| JP | H 564531 | 9/1984 |
| JP | 62113956 | 5/1987 |
| JP | 6382283 | 6/1988 |
| JP | 3124201 | 10/1989 |
| JP | 04274926 | 2/1991 |
| JP | 3273933 | 5/1991 |
| JP | 467703 | 3/1992 |
| JP | 5319110 | 5/1992 |
| JP | 4244658 | 9/1992 |
| JP | 4297330 | 10/1992 |
| JP | 06080048 | 11/1992 |
| JP | 06144020 | 11/1992 |
| JP | 6245317 | 2/1993 |
| JP | 7172196 | 9/1994 |
| JP | 754983 | 2/1995 |
| JP | 7268922 | 10/1995 |
| JP | 9170533 | 5/1996 |
| JP | 8214592 | 8/1996 |
| JP | 1066383 | 3/1998 |
| JP | 11082260 | 3/1999 |
| JP | 11082261 | 3/1999 |
| JP | 11122712 | 4/1999 |
| WO | 8201170 | 4/1982 |
| WO | WO8201170 | 4/1982 |

WO          WO9924280        11/1997

OTHER PUBLICATIONS

Berman et al, IEEE VT-23, No. 3, pp. 61-72 "Propulsion Systems . . . " (1974).
Berman SPC-TUE-2 "Battery Powered Regenerative SCR Drive" (1970).
Gelb et al "Performance Analyses . . . " ACS pub (1972), pp. 997-988.
Berman SPC-TUE-1 "Design Considerations . . . " (1971).
Berman SPC-TUE-2"All Solid State Method . . . " (1971).
Minorikawa et al, "Current Status and Future Trends . . . " (Undated).
Baum et al "Semiconductor Technologies . . . " (Undated).
Chen "Automotive Electronics in the Year 2000 . . . " (Apparently 1992).
Brusaglino, SAE paper 910244 "Elecrtric Vehicle Development . . . " (1991).
Anderson et al, SAE paper 910246 "Integrated Electric . . . " (1991).
Burke, SAE paper 911914 "Battery Availability for Near-Term . . . " (1991).
Chang, IEEE AES Magazine (1993) "Recent Developments of Electric . . . ".
Kamiyama et al, IEEE 0-7803-0582-5 (1992) "Application Trends . . . ".
Sen, IEEE Trans. Ind. Elec. (1990) "Electric Motor Drives . . . ".
Wang et al, PCSC '71 Record, "Analysis of SCR Chopper Drive" (1971).
EPRI Report TR-101264 Assessment of Electric Motor Technology (1992).
Berman et al, SAE paper 720111 "Electric Car Drives . . . " (1972).
Gelb et al, "The Application of Solid Electrolyte Batteries . . . " (Undated).
Miller, "Integrated Power Module Requirements for Automotive . . . " (Undated).
Vukosavic et al, IEEE Trans. Ind. App. "SRM Inverter Topologies . . . " (1991).
Published application US 2001/0037905, Nogi et al., Nov. 2001.
Published patent application US 2003/0085577 of Takaoka et al, May 8, 2003.
Mayrhofer et al "A Hybrid Drive Based on a Structure Variable Arrangement" (1994).
"Diesel-Electric VW", Popular Science, Dec. 1990, p. 30.
"Electric Vehicles Only", Popular Science, May 1991, pp. 76-81 and 110.
"Lightweight, High-Energy Lead/Acid Battery" NASA Tech Briefs, Apr. 1991, 22-24.
Yamaguchi et al, "Dual System—Newly Developed Hybrid System" (incomplete).
Takaoka et al "A High-Expansion-Ratio Gasoline Engine for the Toyota Hybrid System", Toyota Technical Review vol. 47, No. 2, Apr. 1998.
Sasaki et al, "Toyota's Newly Developed Electric-Gasoline Hybrid Powertrain System" (publication data not available).
Ehsani et al "Propulsion System Design of Electric and Hybrid Vehicles", IEEE Trans. Ind. Elec., 44 1 (1997).
Ehsani et al, "Parametric Design of the Drive Train of an Electrically Peaking Hybrid (ELPH) Vehicle", SAE paper 970294 (1997).
Yamaguchi et al, "Development of a New Hybrid System—Dual System", SAE papers 960231 (1996).
Simanaitis, "Electric Vehicles", Road & Track, May 1992, pp. 126-136.
Reynolds, "AC Propulsion CRX", Road & Track, Oct. 1992, pp. 126-129.
Kalberlah, "Electric Hybrid Drive Systems . . . ", SAE Paper No. 910247, 1991.
Bullock, "The Technological Constraints of Mass,Volume, Dynamic Power Range and Energy Capacity . . . " SAE Paper No. 891659 1989.
Electric and Hybrid Vehicle Technology, vol. SP-915, SAE, Feb. 1992.

Wouk, "Hybrids: Then and Now", IEEE Spectrum, vol. 32, 7, Jul. 1995.
Bates, "Getting a Ford HEV on . . . ", IEEE Spectrum, vol. 32, 7, Jul. 1995.
King et al, "Transit Bus takes . . . ", IEEE Spectrum, vol. 32, 7, Jul. 1995.
Yamaguchi, "Toyota readies gasoline/electric hybrid system", Automotive Engineering, Jul. 1997, pp. 55-58.
Wilson, "Not Electric, Not Gasoline . . . " Autoweek, Jun. 2, 1997, pp. 17-18.
Bulgin, "The Future Works, Quietly", Autoweek, Feb. 23, 1998 pp. 12-13.
"Toyota Electric and Hybrid Vehicles", a Toyota brochure.
Trial and deposition transcripts of witnesses relied upon to assert inval-idity of parent patents in Civil Docket No. 2:04-CV-211-DF (E. D. Texas).
Claim construction order entered Sep. 28, 2005 in Civil Docket No. 2:04-CV-211-DF (E. D. Texas).
Toyota Hybrid System, Toyota Press Information, Tokyo, 1997.
Prius Hybrid EV, Toyota brochure, undated.
Miller et al, "Starter-Alternator for Hybrid Electric Vehicle . . . " 1996).
Johnston et al, "The Design and Development of the (UC Davis) . . . " (No date).
Johnston et al, "The Design and Development of the (UC Davis) . . . " 1997.
Alexander et al, "A Mid-Sized Sedan Designed for High Fuel . . . " (No date).
"PRIUS New Car Features", (Toyota manual) (1998).
TRW Systems Group, "Analysis and Advanced Design Study . . . " (1971).
Gelf, "An Electromechanical Transmission for Hybrid Vehicle . . . " (1971).
Hirose et al, "The New High Expansion Ratio Engine . . . " (1997).
Hong, "Toyota's Hybrid Program", Road & Track, Aug. 1997.
Law, "Toyota Tech", Car & Driver, Aug. 1997.
"Dual-Engine Fuel Saver", Popular Mechanics, Jul. 1997.
"Toyota Launches Break-Through Hybrid EV", Motor Trend, Sep. 1997.
"Toyota touts advances in safety, emissions", Automotive News, Apr. 28, 1997.
"'96 North Wind Performance", undated.
Wakefield, "History of the Electric Automobile—Hybrid Electric Vehicles" (1998).
"Escort 92-94", undated.
"Near-Term Hybrid Vehicle Program", General Electric Company (1979).
"Electric and Hybrid Vehicle Design Studies", SAE SP-1243 (1997).
Gleb, "The case for Constant Speed Accessory Drives", (1975).
Sasaki, "Toyota's Newly Developed Hybrid Powertrain", (1998).
"Near-Term Hybrid Vehicle Program, Phase 1", General Eelctric Co. (1979).
"Near-Term Hybrid Vehicle Program, Phase 1, App. A.", Gen'l Elec. (1979).
Joint Feasibility Study of Hybrid Vehicle, Final Report (1982).
North American Technology Seminar plans, Apr. 1997.
Hermance, THS Technical Explanation (undated).
"Toyota" brochure describing Prius (undated).
Hermance, "Toyota Hybrid System" (undated).
Cuddy et al, "Analysis of the Fuel Economy Benefit . . . " SAE 970289 (1997).
"Team Paradigm Shines in FutureCar Competition" (1996).
Takaoka et al, "Study of the Engine Optimized for Hybrid System" (undated).
Gelb et al, "Cost and Emission Studies of a Heat Engine/Battery . . . " (1972).
Gelb et al, "Design and Performance Characteristics . . . " SAE 690169 (1969).
"Electric/Hybrid Vehicles: Alternative Powerplants . . . " SAE SP-1284 (1997).

* cited by examiner

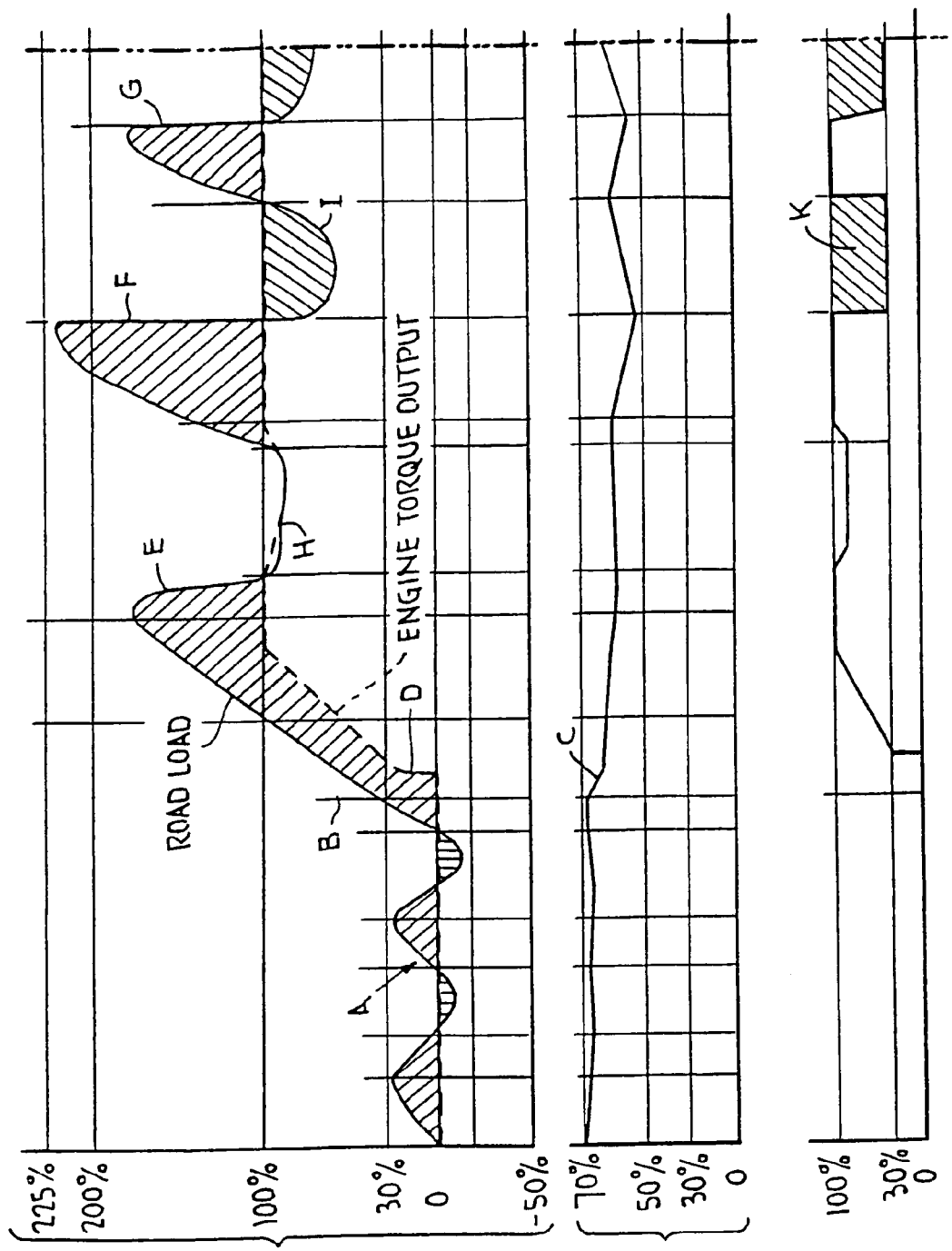

MODE I
ELECTRIC CAR
(+ MODE III,
EMERGENCY)

MODE II
LOW SPEED
OPERATION &
BATTERY
CHARGING

MODE IV
HIGHWAY
CRUISING

MODE V
ACCELERATION,
PASSING,
HILL CLIMBING

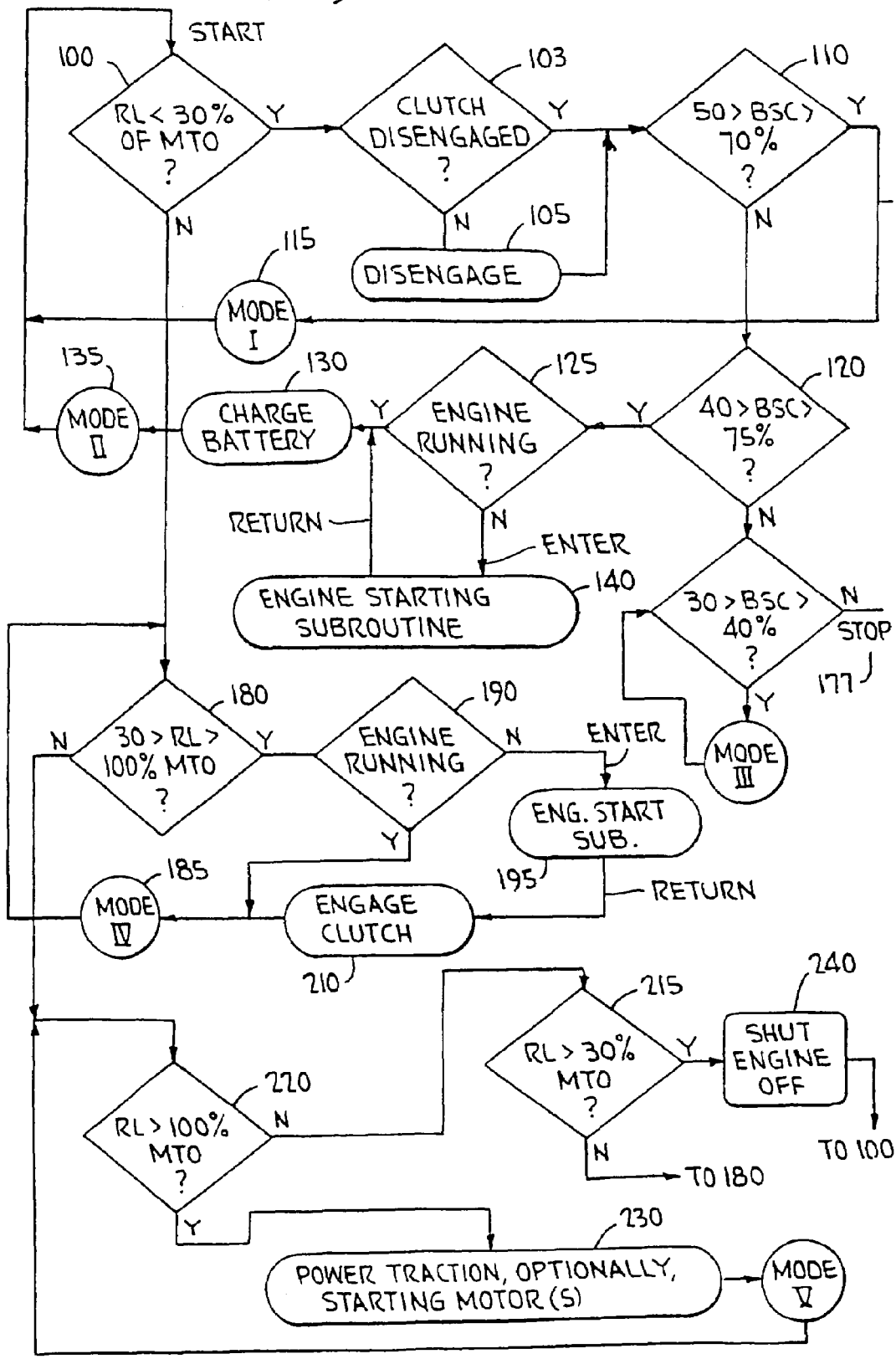

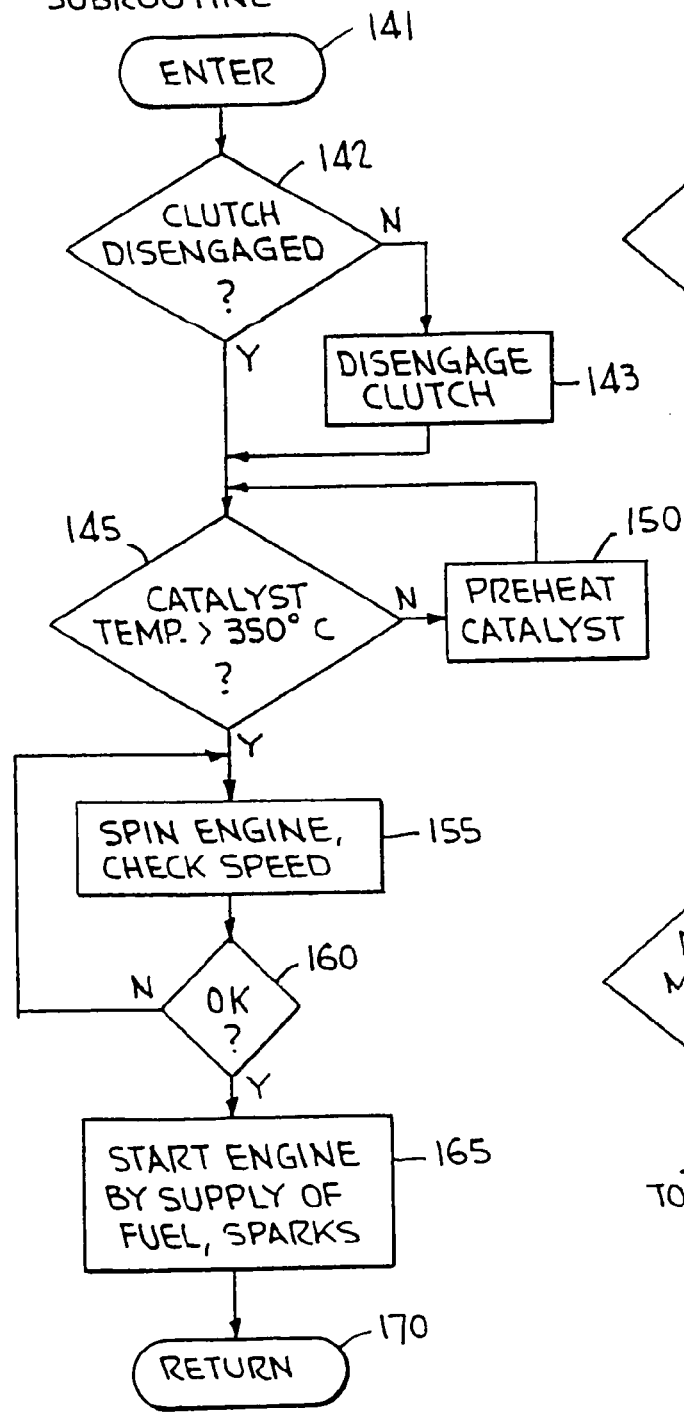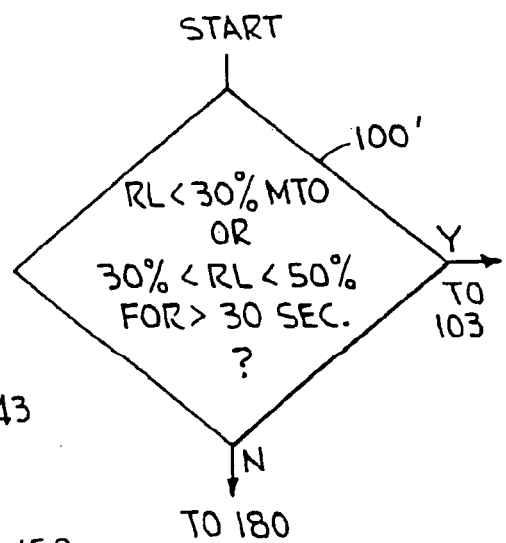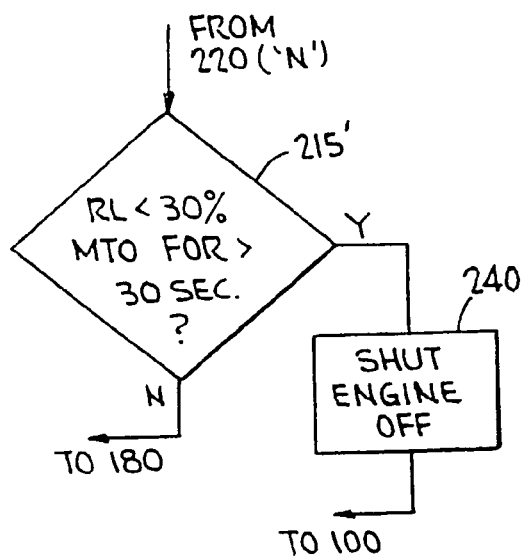

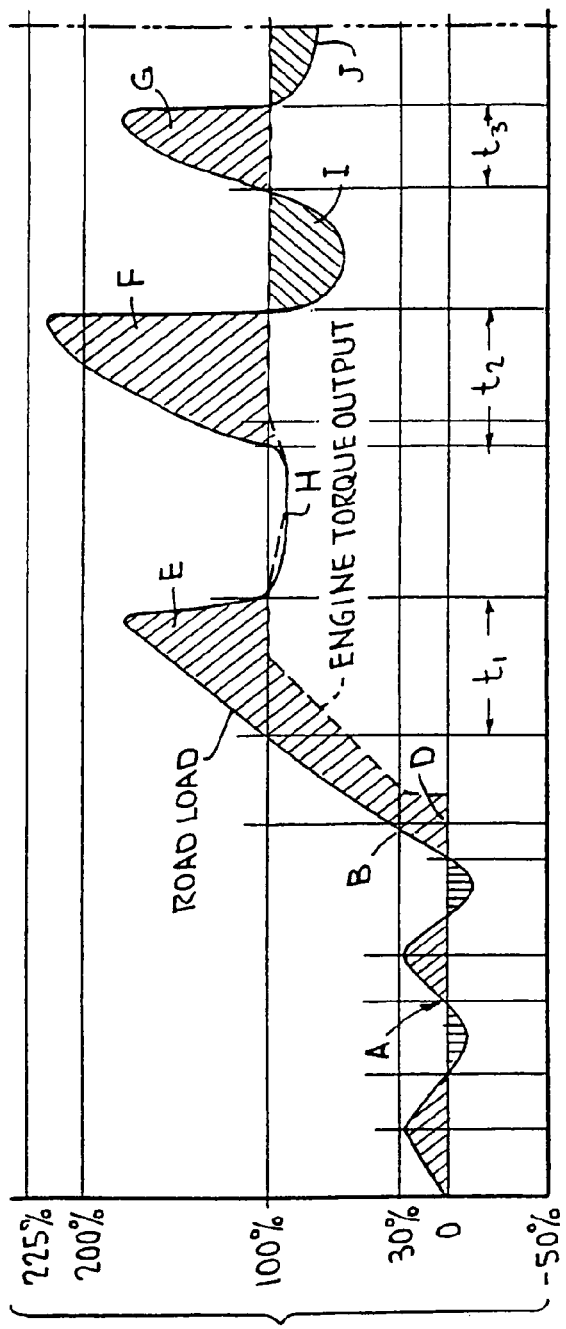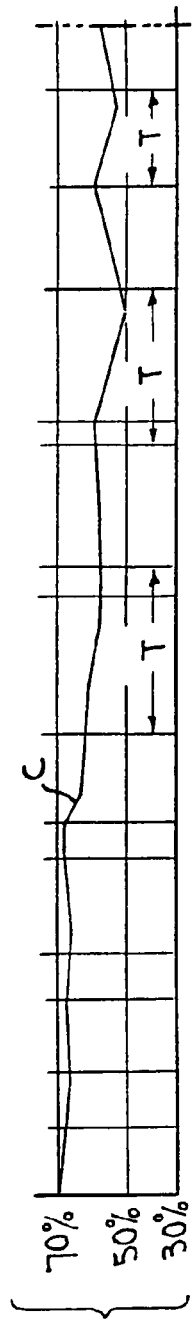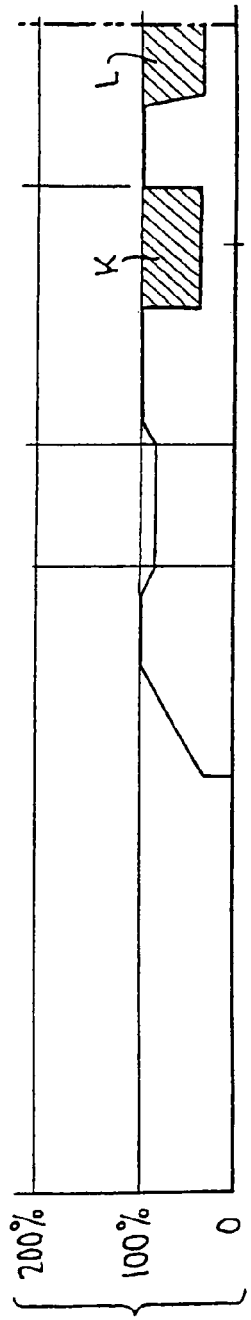
FIG. 13(a) ROAD LOAD AS % OF ENGINE'S MAX. TORQUE (NORMALLY ASPIRATED)
FIG. 13(b) BATTERY STATE OF CHARGE
FIG. 13(c) ENGINE + TURBO-CHARGER OPERATION

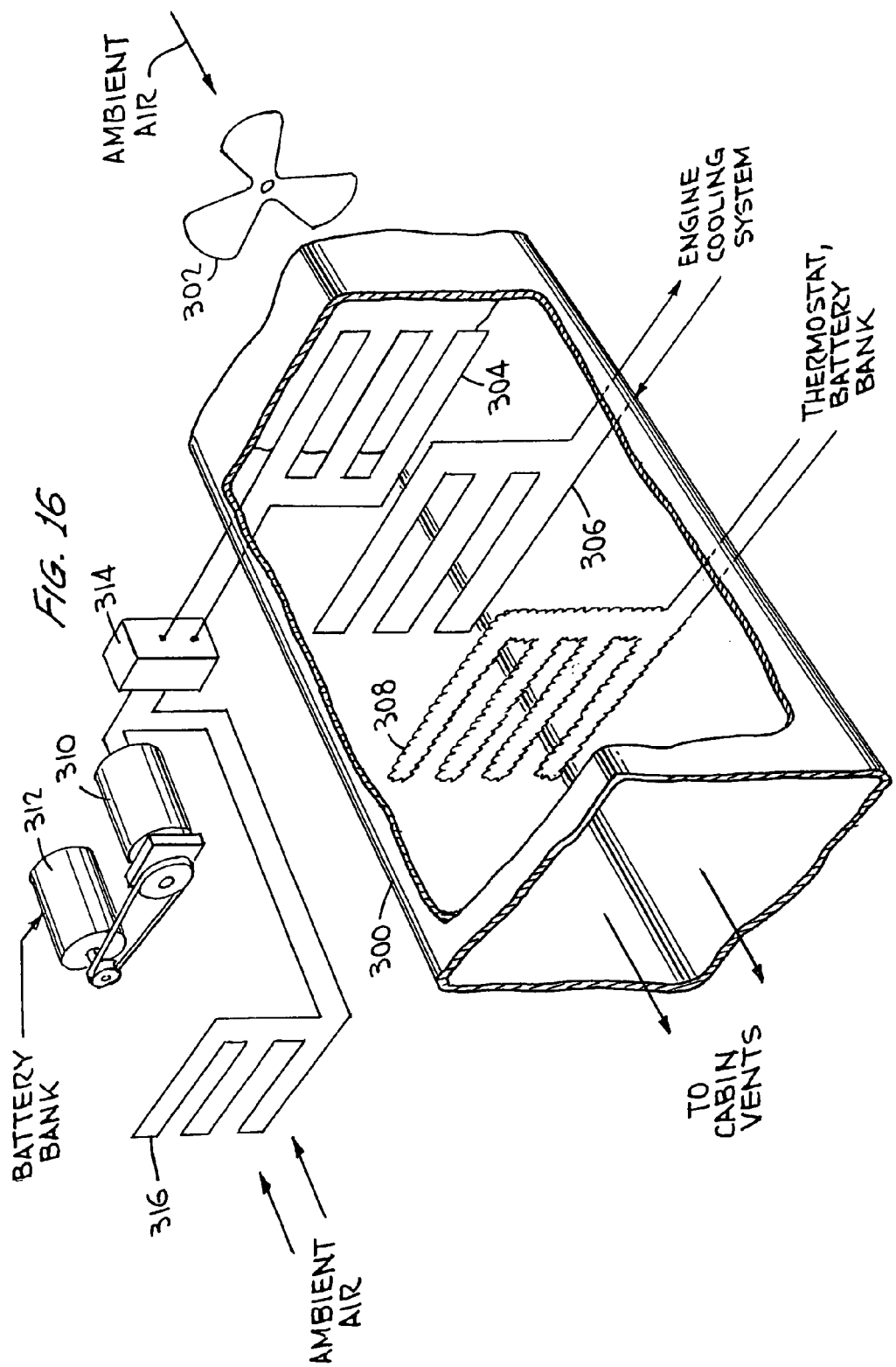

HYBRID VEHICLES

CROSS-REFERENCE TO RELATED APPLICATIONS

This is a divisional application of application Ser. No. 10/382,577 filed Mar. 7, 2003 now U.S. Pat. No. 7,104,347, which was a divisional application of Ser. No. 09/822,866 filed Apr. 2, 2001, now U.S. Pat. No. 6,554,088, which was a continuation-in-part of Ser. No. 09/264,817 filed Mar. 9, 1999, now U.S. Pat. No. 6,209,672, issued Apr. 3, 2001, which in turn claimed priority from provisional application Ser. No. 60/100,095, filed Sep. 14, 1998, and was also a continuation-in-part of Ser. No. 09/392,743, filed Sep. 9, 1999, now U.S. Pat. No. 6,338,391 issued Jan. 15, 2002, in turn claiming priority from provisional application Ser. No. 60/122,296, filed Mar. 1, 1999.

FIELD OF THE INVENTION

This application relates to improvements in hybrid vehicles, that is, vehicles in which both an internal combustion engine and one or more electric motors are provided to supply torque to the driving wheels of the vehicle. More particularly, this invention relates to a hybrid electric vehicle that is fully competitive with presently conventional vehicles as regards performance, operating convenience, and cost, while achieving substantially improved fuel economy and reduced pollutant emissions.

DISCUSSION OF THE PRIOR ART

For many years great attention has been given to the problem of reduction of fuel consumption of automobiles and other highway vehicles. Concomitantly very substantial attention has been paid to reduction of pollutants emitted by automobiles and other vehicles. To a degree, efforts to solve these problems conflict with one another. For example, increased thermodynamic efficiency and thus reduced fuel consumption can be realized if an engine is operated at higher temperatures. Thus there has been substantial interest in engines built of ceramic materials withstanding higher combustion temperatures than those now in use. However, higher combustion temperatures in gasoline-fueled engines lead to increase in certain undesirable pollutants, typically $NO_x$.

Another possibility for reducing emissions is to burn mixtures of gasoline and ethanol ("gasohol"), or straight ethanol. However, to date ethanol has not become economically competitive with gasoline, and consumers have not accepted ethanol to any great degree. Moreover, to make an alternate fuel such as ethanol available to the extent necessary to achieve appreciable improvements in nationwide air quality and fuel conservation would require immense costs for infrastructure improvements; not only the entire nation's motor fuel production and delivery system, but also the vehicle manufacture, distribution, and repair system, would have to be extensively revised or substantially duplicated.

One proposal for reducing pollution in cities is to limit the use of vehicles powered by internal combustion engines and instead employ electric vehicles powered by rechargeable batteries. To date, all such "straight electric" cars have had very limited range, typically no more than 150 miles, have insufficient power for acceleration and hill climbing except when the batteries are substantially fully charged, and require substantial time for battery recharging. Thus, while there are many circumstances in which the limited range and extended recharging time of the batteries would not be an inconvenience, such cars are not suitable for all the travel requirements of most individuals. Accordingly, an electric car would have to be an additional vehicle for most users, posing a substantial economic deterrent. Moreover, it will be appreciated that in the United States most electricity is generated in coal-fired power plants, so that using electric vehicles merely moves the source of the pollution, but does not eliminate it. Furthermore, comparing the respective net costs per mile of driving, electric vehicles are not competitive with ethanol-fueled vehicles, much less with conventional gasoline-fueled vehicles. See, generally, Simanaitis, "Electric Vehicles", Road & Track, May 1992, pp. 126-136; Reynolds, "AC Propulsion CRX", Road & Track, October 1992, pp. 126-129.

Brooks et al U.S. Pat. No. 5,492,192 shows such an electric vehicle; the invention appears to be directed to incorporation of antilock braking and traction control technologies into an otherwise conventional electric vehicle.

Much attention has also been paid over the years to development of electric vehicles including internal combustion engines powering generators, thus eliminating the defect of limited range exhibited by simple electric vehicles. The simplest such vehicles operate on the same general principle as diesel-electric locomotives used by most railroads. In such systems, an internal combustion engine drives a generator providing electric power to traction motors connected directly to the wheels of the vehicle. This system has the advantage that no variable gear ratio transmission is required between the engine and the wheels of the vehicle.

More particularly, an internal combustion engine produces zero torque at zero engine speed (RPM) and reaches its torque peak somewhere in the middle of its operating range. Accordingly, all vehicles driven directly by an internal combustion engine (other than certain single-speed vehicles using friction or centrifugal clutches, and not useful for normal driving) require a variable-ratio transmission between the engine and the wheels, so that the engine's torque can be matched to the road speeds and loads encountered. Further, some sort of clutch must be provided so that the engine can be mechanically decoupled from the wheels, allowing the vehicle to stop while the engine is still running, and to allow some slippage of the engine with respect to the drive train while starting from a stop. It would not be practical to provide a diesel locomotive, for example, with a multiple speed transmission, or a clutch. Accordingly, the additional complexity of the generator and electric traction motors is accepted. Electric traction motors produce full torque at zero RPM and thus can be connected directly to the wheels; when it is desired that the train should accelerate, the diesel engine is simply throttled to increase the generator output and the train begins to move.

The same drive system may be employed in a smaller vehicle such as an automobile or truck, but has several distinct disadvantages in this application. In particular, and as discussed in detail below in connection with FIGS. 1 and 2, it is well known that a gasoline or other internal combustion engine is most efficient when producing near its maximum output torque. Typically, the number of diesel locomotives on a train is selected in accordance with the total tonnage to be moved and the grades to be overcome, so that all the locomotives can be operated at nearly full torque production. Moreover, such locomotives tend to be run at steady speeds for long periods of time. Reasonably efficient fuel use is thus achieved. However, such a direct drive vehicle would not achieve good fuel efficiency in typical automotive use, involving many short trips, frequent stops in traffic, extended low-speed operation and the like.

So-called "series hybrid" electric vehicles have been proposed for automotive use, wherein batteries are used as energy storage devices, so that an internal combustion engine provided to power a generator can be operated in its most fuel-efficient output power range while still allowing the electric traction motor(s) powering the vehicle to be operated as required. Thus the engine may be loaded by supplying torque to a generator charging the batteries while supplying electrical power to the traction motor(s) as required, so as to operate efficiently. This system overcomes the limitations of electric vehicles noted above with respect to limited range and long recharge times. Thus, as compared to a conventional vehicle, wherein the internal combustion engine delivers torque directly to the wheels, in a series hybrid electric vehicle, torque is delivered from,the engine to the wheels via a serially connected generator used as a battery charger, the battery, and the traction motor. However, energy transfer between those components consumes at least approximately 25% of engine power. Further, such components add substantially to the cost and weight of the vehicle; in particular, an electric motor capable of providing sufficient torque to meet all expected demand, e.g., to allow reasonable performance under acceleration, during hill-climbing and the like, is rather heavy and expensive. Thus, series hybrid vehicles have not been immediately successful.

A more promising "parallel hybrid" approach is shown in U.S. Pat. Nos. 3,566,717 and 3,732,751 to Berman et al. In Berman et al an internal combustion engine and an electric motor are matched through a complex gear train so that both can provide torque directly to the wheels, the vehicle being operated in several different modes. Where the output of the internal combustion engine is more than necessary to drive the vehicle ("first mode operation") the engine is run at constant speed and excess power is converted by a first motor/generator ("speeder") to electrical energy for storage in a battery. In "second mode operation", the internal combustion engine drives the wheels directly, and is throttled. When more power is needed than the engine can provide, a second motor/generator or "torquer" provides additional torque as needed.

Berman et al thus show two separate electric motor/generators separately powered by the internal combustion engine; the "speeder" charges the batteries, while the "torquer" propels the vehicle forward in traffic. This arrangement is a source of additional complexity, cost and difficulty, as two separate modes of engine control are required. Moreover, the operator must control the transition between the several modes of operation. Such a complex vehicle is unsuited for the automotive market. Automobiles intended for mass production can be no more complicated to operate than conventional vehicles, and must be essentially "foolproof", that is, resistant to damage that might be caused by operator error. Further, the gear train shown by Berman et al appears to be quite complex and difficult to manufacture economically. Berman et al also indicate that one or even two variable-speed transmissions may be required; see, e.g., col. 3, lines 19-22 and 36-38 of U.S. Pat. No. 3,566,717, and col. 2, lines 53-55 of U.S. Pat. No. 3,732,751.

Lynch et al U.S. Pat. No. 4,165,795 also shows an early parallel hybrid drive. Lynch argues that maximum fuel efficiency can be realized when a relatively small internal combustion engine is provided, such that when the engine is operated at an efficient speed, it produces approximately the average power required over a typical mission. The example given is of an engine producing 25 hp maximum and 17 hp at its most efficient speed, about 2500 rpm. This is to be combined with an electric motor-generator of about 30 peak hp. This vehicle requires a variable-ratio transmission to achieve reasonable performance. It appears that the engine is to be run continuously, at a steady speed, with additional torque provided by the motor when needed and excess torque produced by the engine being used to charge the batteries. In a first embodiment, torque provided by the motor is transmitted to the drive wheels through the engine, while in a second embodiment their respective positions are reversed.

Nishida U.S. Pat. No. 5,117,931 shows a parallel hybrid vehicle where torque from an electric motor may be combined with torque from an internal combustion engine in a "torque transmission unit" comprising paired bevel gears and means for controlling the relative rates of rotation of the motor and engine, so that the motor can be used to start the engine, absorb excess torque from the engine (by charging a battery), or provide additional propulsive torque. A variable-speed transmission is coupled between the torque transmission unit and the propelling wheels. Both the torque transmission unit and the variable-speed transmission are complex, heavy, and expensive components, the use of which would preferably be avoided.

Helling U.S. Pat. No. 3,923,115 also shows a hybrid vehicle having a torque transmission unit for combining torque from an electric motor and an internal combustion engine. However, in Helling the relative rates of rotation of the motor and engine input shafts are fixed; a flywheel is provided to store excess mechanical energy as well as a battery to store excess electrical energy. Albright, Jr. et al U.S. Pat. No. 4,588,040 shows another hybrid drive scheme using a flywheel in addition to batteries to store excess energy; various complicated mechanical connections are provided between the various components. Capacitors have also been proposed for energy storage; see Bates et al U.S. Pat. No. 5,318,142.

Fjällström U.S. Pat. No. 5,120,282 shows a parallel hybrid drive train wherein torque from two electric motors is combined with torque produced by an internal combustion engine; the combination is performed by a complex arrangement of paired planetary gearsets, and unspecified control means are alleged to be able to allow variation of road speed without a variable-ratio transmission.

Hunt U.S. Pat. Nos. 4,405,029 and 4,470,476 also disclose parallel hybrids requiring complex gearing arrangements, including multiple speed transmissions. More specifically, the Hunt patents disclose several embodiments of parallel hybrid vehicles. Hunt indicates (see col. 4, lines 6-20 of the '476 patent) that an electric motor may drive the vehicle at low speeds up to 20 mph, and an internal combustion engine used for speeds above 20 mph, while "in certain speed ranges, such as from 15-30 mph, both power sources may be energized . . . Additionally, both power sources could be utilized under heavy load conditions." Hunt also indicates that "the vehicle could be provided with an automatic changeover device which automatically shifts from the electrical power source to the internal combustion power source, depending on the speed of the vehicle" (col. 4, lines 12-16).

However, the Hunt vehicle does not meet the objects of the present invention, as discussed in detail below. Hunt's vehicle in each embodiment requires a conventional manual or automatic transmission. See col. 2, lines 6-7. Moreover, the internal combustion engine is connected to the transfer case (wherein torque from the internal combustion engine and electric motor is combined) by a "fluid coupling or torque converter of conventional construction". Col. 2, lines 16-17. Such transmissions and fluid couplings or torque converters are very inefficient, are heavy, bulky, and costly, and are to be eliminated according to one object of the present invention, again as discussed in detail below.

Furthermore, the primary means of battery charging disclosed by Hunt involves a further undesirable complexity, namely a turbine driving the electric motor in generator configuration. The turbine is fueled by waste heat from the internal combustion engine. See col. 3, lines 10-60. Hunt's internal combustion engine is also fitted with an alternator, for additional battery charging capability, adding yet further complexity. Thus it is clear that Hunt fails to teach a hybrid vehicle meeting the objects of the present invention—that is, a hybrid vehicle competitive with conventional vehicles with respect to performance, cost and complexity, while achieving substantially improved fuel efficiency.

Kawakatsu U.S. Pat. Nos. 4,305,254 and 4,407,132 show a parallel hybrid involving a single internal combustion engine coupled to the drive wheels through a conventional variable-ratio transmission, an electric motor, and an alternator, to allow efficient use of the internal combustion engine. As in the Hunt disclosure, the engine is intended to be operated in a relatively efficient range of engine speeds; when it produces more torque than is needed to propel the vehicle, the excess is used to charge the batteries; where the engine provides insufficient torque, the motor is energized as well.

A further Kawakatsu U.S. Pat. No. 4,335,429, shows a hybrid vehicle, in this case comprising an internal combustion engine and two motor/generator units. A first larger motor/generator, powered by a battery, is used to provide additional torque when that provided by the engine is insufficient; the larger motor-generator also converts excess torque provided by the engine into electrical energy, to be stored by the battery, and is used in a regenerative braking mode. The second smaller motor/generator is similarly used to provide additional torque and additional regenerative braking as needed.

More particularly, the latter Kawakatsu patent asserts that a single electric motor sized to provide sufficient torque to propel the vehicle would not be capable of providing sufficient regenerative braking force; see col. 1, line 50-col. 2 line 8. Accordingly, Kawakatsu provides two separate motor/generators, as noted; a separate engine starting motor is also provided. See col. 6, lines 22-23. In the embodiment shown, the larger motor/generator is connected to the wheel drive shaft, while the engine and the smaller motor/generator are connected to the wheels through a complex mechanism comprising three separately-controllable clutches. See col. 5, lines 50-62.

Numerous patents disclose hybrid vehicle drives tending to fall into one or more of the categories discussed above. A number of patents disclose systems wherein an operator is required to select between electric and internal combustion operation; for example, an electric motor is provided for operation inside buildings where exhaust fumes would be dangerous, and an internal combustion engine provided for operation outdoors. It is also known to propose a hybrid vehicle comprising an electric motor for use at low speeds, and an internal combustion engine for use at higher speed. The art also suggests using both when maximum torque is required. In several cases the electric motor drives one set of wheels and the internal combustion engine drives a different set. See generally Shea (U.S. Pat. No. 4,180,138); Fields et al (U.S. Pat. No. 4,351,405); Kenyon (U.S. Pat. No. 4,438,342); Krohling (U.S. Pat. No. 4,593,779); and Ellers (U.S. Pat. No. 4,923,025).

Many of these patents show hybrid vehicle drives wherein a variable speed transmission is required, as do numerous additional references. A transmission as noted above is typically required where the internal combustion engine and/or the electric motor are not capable of supplying sufficient torque at low speeds. See Rosen (U.S. Pat. No. 3,791,473); Rosen (U.S. Pat. No. 4,269,280); Fiala (U.S. Pat. No. 4,400,997); and Wu et al (U.S. Pat. No. 4,697,660). Kinoshita (U.S. Pat. No. 3,970,163) shows a vehicle of this general type wherein a gas turbine engine is coupled to the road wheels through a three-speed transmission; an electric motor is provided to supply additional torque at low speeds.

For further examples of series hybrid vehicles generally as discussed above, see Bray (U.S. Pat. No. 4,095,664); Cummings (U.S. Pat. No. 4,148,192); Monaco et al (U.S. Pat. No. 4,306,156); Park (U.S. Pat. No. 4,313,080); McCarthy (U.S. Pat. No. 4,354,144); Heidemeyer (U.S. Pat. No. 4,533,011); Kawamura (U.S. Pat. No. 4,951,769); and Suzuki et al (U.S. Pat. No. 5,053,632). Various of these address specific problems arising in the manufacture or use of hybrid vehicles, or specific alleged design improvements. For example, Park addresses certain specifics of battery charging and discharge characteristics, while McCarthy shows a complex drive system involving an internal combustion engine driving two electric motors; the torque generated by the latter is combined in a complex differential providing continuously variable gear ratios. Heidemeyer shows connecting an internal combustion engine to an electric motor by a first friction clutch, and connecting the motor to a transmission by a second friction clutch.

Other patents of general relevance to this subject matter include Toy (U.S. Pat. No. 3,525,874), showing a series hybrid using a gas turbine as internal combustion engine; Yardney (U.S. Pat. No. 3,650,345), showing use of a compressed-air or similar mechanical starter for the internal combustion engine of a series hybrid, such that batteries of limited current capacity could be used; and Nakamura (U.S. Pat. No. 3,837,419), addressing improvements in thyristor battery-charging and motor drive circuitry. Somewhat further afield but of general interest are the disclosures of Deane (U.S. Pat. No. 3,874,472); Horwinski (U.S. Pat. No. 4,042,056); Yang (U.S. Pat. No. 4,562,894); Keedy (U.S. Pat. No. 4,611,466); and Lexen (U.S. Pat. No. 4,815,334); Mori (U.S. Pat. No. 3,623,568); Grady, Jr. (U.S. Pat. No. 3,454,122); Papst (U.S. Pat. No. 3,211,249); Nims et al (U.S. Pat. No. 2,666,492); and Matsukata (U.S. Pat. No. 3,502,165). Additional references showing parallel hybrid vehicle drive systems include Froelich (U.S. Pat. No. 1,824,014) and Reinbeck (U.S. Pat. No. 3,888,325). U.S. Pat. No. 4,578,955 to Medina shows a hybrid system wherein a gas turbine is used to drive a generator as needed to charge batteries. Of particular interest to certain aspects of the present invention is that Medina discloses that the battery pack should have a voltage in the range of 144, 168 or 216 volts and the generator should deliver current in the range of 400 to 500 amperes. Those of skill in the art will recognize that these high currents involve substantial resistance heating losses, and additionally require that all electrical connections be made by positive mechanical means such as bolts and nuts, or by welding. More specifically, for reasons of safety and in accordance with industry practice, currents in excess of about 50 amperes cannot be carried by the conventional plug-in connectors preferred for reasons of convenience and economy, but must be carried by much heavier, more expensive and less convenient fixed connectors (as used on conventional starter and battery cable connections). Accordingly, it would be desirable to operate the electric motor of a hybrid vehicle at lower currents.

U.S. Pat. No. 5,765,656 to Weaver also shows a series hybrid wherein a gas turbine is used as the internal combustion engine; hydrogen is the preferred fuel.

U.S. Pat. No. 4,439,989 to Yamakawa shows a system wherein two different internal combustion engines are provided, so that only one need be run when the load is low. This arrangement would be complex and expensive to manufacture.

Detailed discussion of various aspects of hybrid vehicle drives may be found in Kalberlah, "Electric Hybrid Drive Systems for Passenger Cars and Taxis", SAE Paper No. 910247 (1991). Kalberlah first compares "straight" electric, series hybrid, and parallel hybrid drive trains, and concludes that parallel hybrids are preferable, at least when intended for general use (that is, straight electric vehicles may be useful under certain narrow conditions of low-speed, limited range urban driving). Kalberlah then compares various forms of parallel hybrids, with respect to his FIG. 4, and concludes that the most practical arrangement is one in which an internal combustion engine drives a first pair of wheels, and an electric motor the second; more particularly, Kalberlah indicates that mechanical combination of the torque from an internal combustion engine and an electric motor is impractical.

Gardner U.S. Pat. Nos. 5,301,764 and 5,346,031 follow Kalberlah's teachings, in that Gardner shows separately driving at least two pairs of wheels; one pair is driven by a first electric motor, and the second by a second electric motor or alternatively by a small internal combustion engine. Three different clutches are provided to allow various sources of drive torque to be connected to the wheels, and to a generator, depending on the vehicle's operation mode. The internal combustion engine is run continuously, and provides the driving torque when the vehicle is in a cruise mode; at other times it is used to charge the batteries powering the electric motors.

Bullock, "The Technological Constraints of Mass, Volume, Dynamic Power Range and Energy Capacity on the Viability of Hybrid and Electric Vehicles", SAE Paper No. 891659 (1989) provides a detailed theoretical analysis of electric vehicles in terms of the loads thereon, and a careful analysis of the various battery types then available. Bullock concludes that a vehicle having two electric motors of differing characteristics, driving the wheels through a variable-speed transmission, would be optimal for automotive use; see the discussion of FIG. 8. Bullock also suggests the use of an internal combustion engine to drive battery charging, but does not address combining the engine's torque with that from the motors; see pp. 24-25.

Further related papers are collected in *Electric and Hybrid Vehicle Technology*, volume SP-915, published by SAE in February 1992. See also Wouk, "Hybrids: Then and Now"; Bates, "On the road with a Ford HEV", and King et al, "Transit Bus takes the Hybrid Route", all in *IEEE Spectrum*, Vol. 32, 7, (July 1995).

Urban et al U.S. Pat. No. 5,667,029 shows two embodiments of parallel hybrids; a first embodiment is shown in FIGS. 1-9 and 11, and a second in FIGS. 12-17. Both embodiments have numerous common features, including similar operating modes. Referring to the first embodiment, an internal combustion engine provides torque to the road wheels or to a generator; two electric motors can provide torque to the road wheels, or charge batteries during regenerative braking. Torque from the engine and motors is combined at the input shaft to a variable-ratio transmission. Overrunning clutches are provided, e.g., to allow the engine's torque to be applied to the road wheels without also rotating the motors.

As indicated at col. 6, lines 25-54, certain transitions between various operating modes are made automatically, responsive to the position of the accelerator pedal; for example, if the operator does not depress the pedal beyond a given point, only the internal combustion engine is employed to propel the vehicle; if the operator depresses the pedal more fully, the electric motors are also energized. Other changes in the operational mode must be made by the operator directly; for example, the vehicle may be operated as a "straight electric" vehicle, e.g. for short duration trips, by the operator's making an appropriate control action. See col. 7, lines 49-56.

The Urban et al design appears to suffer from a number of significant defects. First, the internal combustion engine is stated to provide all torque needed to accelerate the vehicle to cruising speed under normal circumstances (see col. 5, lines 3-10), and also to propel the vehicle during cruising (see col. 6, lines 48-54). The electric motors are to be used only during rapid acceleration and hill-climbing; col. 5, lines 10-13. A 20 horsepower engine, operated through a continuously variable-ratio transmission and a torque converter, is stated to be adequate for this purpose. Such components are clearly complex and expensive; further, torque converters are notoriously inefficient. Moreover, using the internal combustion engine as the sole source of power for low-speed running would require it to be run at low speeds, e.g., at traffic lights, which is very inefficient and highly polluting. (Various additional references suggest that excess torque can be used to charge batteries; if this were incorporated in the Urban system, the engine might be run at a reasonably efficient output level while the vehicle was stationary, but this would lead to high levels of noise and vibration. In any event Urban does not appear to consider this possibility.)

On the other hand, Urban does suggest that the vehicle can be operated as a "straight electric" under low-speed conditions, but this requires the operator to provide an explicit control input; this complexity is unacceptable in a vehicle intended to be sold in quantity, as would be required in order to reach Urban's stated goals of reduction of atmospheric pollution and reduced energy consumption. As noted, hybrid vehicle operation must be essentially "foolproof", or "transparent" to the user, to have any chance of commercial success.

Urban's second embodiment is mechanically simpler, employing but a single "dynamotor", through which torque is transmitted from the engine to the variable-ratio transmission, but suffers from the same operational deficiencies.

A second Urban et al patent, U.S. Pat. No. 5,704,440, is directed to the method of operation of the vehicle of the '029 patent and suffers the same inadequacies.

Various articles describe several generations of Toyota Motor Company hybrid vehicles, believed to correspond to that available commercially as the "Prius". See, for example, Yamaguchi, "Toyota readies gasoline/electric hybrid system", *Automotive Engineering*, July 1997, pp. 55-58; Wilson, "Not Electric, Not Gasoline, But Both", *Autoweek*, Jun. 2, 1997, pp. 17-18; Bulgin, "The Future Works, Quietly", *Autoweek* Feb. 23, 1998, pp. 12 and 13; and "Toyota Electric and Hybrid Vehicles", a Toyota brochure. A more detailed discussion of the Toyota vehicle's powertrain is found in Nagasaka et al, "Development of the Hybrid/Battery ECU for the Toyota Hybrid System", SAE paper 981122 (1998), pp. 19-27. According to the Wilson article, Toyota describes this vehicle as a "series-parallel hybrid"; regardless of the label applied, its powertrain appears to be similar to that of the Berman patents described above, that is, torque from either or both of an internal combustion engine and an electric motor are controllably combined in a "power-split mechanism" and transmitted to the drive wheels through a planetary gearset providing the functionality of a variable-ratio transmission. See the Nagasaka article at pp. 19-20.

Furutani U.S. Pat. No. 5,495,906 describes a vehicle having an internal combustion engine driving a first set of wheels through a variable-ratio transmission and an electric motor driving a second set of wheels. The engine is apparently intended to be run continuously; at low speeds, it drives a generator to charge batteries providing energy to the motor, and at higher speeds the engine or both engine and motor propel the vehicle. In some circumstances the transmission may not be required; compare, for example, col. 3, lines 4-8 with col. 5, lines 59-64.

U.S. Pat. No. 5,842,534 to Frank shows a "charge depletion" control method for hybrid vehicles; in this scheme, the internal combustion engine is essentially used only when the state of the batteries is such that the vehicle cannot otherwise reach a recharging point. See col. 3, lines 50-55. In normal operation, the batteries are recharged from an external power source. Frank also discusses two-mode brake pedal operation, wherein mechanical brakes are engaged in addition to regenerative braking when the pedal is depressed beyond a preset point.

U.S. Pat. No. 5,823,280 to Lateur et al shows a parallel hybrid wherein the shafts of an internal combustion engine and first and second electric motors are all coaxial; the engine is connected to the first motor by a clutch, and the first motor to the second by a planetary gearset, allowing the speeds of the motors to be varied so as to operate them in their most efficient range. See col. 4, line 57-col. 5, line 60.

U.S. Pat. No. 5,826,671 to Nakae et al shows a parallel hybrid wherein torque from an internal combustion engine is combined with that from a motor in a planetary gearset; a clutch is provided therebetween. The specific invention relates to sensing of engine warmup conditions, so as to limit emission of unburnt fuel and thus lower emissions.

U.S. Pat. No. 5,846,155 to Taniguchi et al shows a parallel hybrid wherein torque from an internal combustion engine and a motor is again combined in a planetary gearset; the specific improvement appears to be the use of a continuously-variable transmission.

It will be appreciated by those of skill in the art that there are significant limitations inherent in the use of planetary gearsets as a means for connecting different sources, e.g., an internal combustion engine and an electric motor, to the drive wheels of a vehicle, namely, that unless the planetary gearset is effectively locked (anathematic to its use as a continuously-variable transmission, e.g., in the Toyota vehicle) it is capable of additive combination of shaft speeds, but not of output torque. Hence, the principal advantage of the parallel hybrid drivetrain, additive combination of the output torque of both the electric motor and the internal combustion engine, is only available when the planetary gearset is locked. This fact is acknowledged by Lateur, for example, at col. 6, line 27.

Additional disclosures of possible interest include U.S. Pat. No. 5,845,731 to Buglione et al; this patent issued Dec. 8, 1998, and therefore is not necessarily available as a reference against the claims of the present application. The basic powertrain shown by Buglione et al includes an internal combustion engine 12, coupled through a first clutch 18 to a first electric motor 20, coupled to a second electric motor 26 through a second clutch 24; the wheels are (apparently; see col. 3, line 8) driven by the second motor 26. The overall hybrid operational scheme provided by Buglione et al is illustrated in FIG. 4. At low speeds one or both motors may be used to propel the vehicle, with the engine off, idling, or running to drive one motor as a generator. During low-speed cruising the second motor propels the vehicle, while during high-speed cruising, the engine propels the vehicle. When acceleration is required at high speed, the engine and both motors may be used to propel the vehicle. Buglione et al also indicates that a variable-ratio transmission may be unnecessary, col. 3, line 9, and that the first motor can be used to start the engine, col. 4, lines 8-15.

U.S. Pat. No. 5,586,613 to Ehsani, showing an "electrically peaking hybrid" vehicle is also of interest Ehsani's vehicle is shown in several embodiments; in each, an engine is apparently to be run continuously, with excess torque used to charge the batteries, and one or more motors used to provide additional propulsive torque when the engine's output torque is inadequate. A transmission is provided in some embodiments of the Ehsani vehicle. An embodiment involving two motors is shown in FIG. 7, and can be modified as discussed in the text at col. 9, lines 4-5. FIG. 7 itself shows driving a first set of wheels by a first "electric machine", i.e., a motor capable of operation as a generator. This drive arrangement is independent of a second drive arrangement, whereby a second set of wheels is driven by an engine connected through a first clutch to a second electric machine, connected to the second set of wheels by a second clutch. Ehsani suggests at col. 9, lines 4-5 that the drive shaft otherwise coupled to the first electric machine could also be driven by the engine. Although it is not made explicit that the first electric machine is to be retained, this seems likely; otherwise, the modified FIG. 7 embodiment would be the same as Ehsani's FIG. 1, modified to have all four wheels driven by a common driveshaft.

This application discloses a number of improvements over and enhancements to the hybrid vehicles disclosed in U.S. Pat. No. 5,343,970 (the "'970 patent"), to one of the present inventors, which is incorporated herein by this reference. Where differences are not mentioned, it is to be understood that the specifics of the vehicle design shown in the '970 patent are applicable to the vehicles shown herein as well. Discussion of the '970 patent herein is not to be construed to limit the scope of its claims.

Generally speaking, the '970 patent discloses hybrid vehicles wherein a controllable torque transfer unit is provided capable of transferring torque between an internal combustion engine, an electric motor, and the drive wheels of the vehicle. The direction of torque transfer is controlled by a microprocessor responsive to the mode of operation of the vehicle, to provide highly efficient operation over a wide variety of operating conditions, and while providing good performance. The flow of energy—either electrical energy stored in a substantial battery bank, or chemical energy stored as combustible fuel—is similarly controlled by the microprocessor.

For example, according to the operating scheme of the hybrid vehicle disclosed in the '970 patent, in low-speed city driving, the electric motor provides all torque needed responsive to energy flowing from the battery. In high-speed highway driving, where the internal-combustion engine can be operated efficiently, it typically provides all torque; additional torque may be provided by the electric motor as needed for acceleration, hill-climbing, or passing. The electric motor is also used to start the internal-combustion engine, and can be operated as a generator by appropriate connection of its windings by a solid-state, microprocessor-controlled inverter. For example, when the state of charge of the battery bank is relatively depleted, e.g., after a lengthy period of battery-only operation in city traffic, the internal combustion engine is started and drives the motor at between 50 and 100% of its maximum torque output, for efficient charging of the battery bank. Similarly, during braking or hill descent, the kinetic energy of the vehicle can be turned into stored electrical energy by regenerative braking.

The hybrid drive train shown in the '970 patent has many advantages with respect to the prior art which are retained by the present invention. For example, the electric drive motor is selected to be of relatively high power, specifically, equal to or greater than that of the internal combustion engine, and to have high torque output characteristics at low speeds; this allows the conventional multi-speed vehicle transmission to be eliminated. As compared to the prior art, the battery bank, motor/generator, and associated power circuitry are operated at relatively high voltage and relatively low current, reducing losses due to resistive heating and simplifying component selection and connection.

It can thus be seen that while the prior art, including the '970 patent, clearly discloses the desirability of operating an internal combustion engine in its most efficient operating range, and that a battery may be provided to store energy to be supplied to an electric motor in order to even out the load on the internal combustion engine, there remains substantial room for improvement. In particular, it is desired to obtain the operational flexibility of a parallel hybrid system, while optimizing the system's operational parameters and providing a substantially simplified parallel hybrid system as compared to those shown in the prior art, again as including the '970 patent.

As noted above, the present application is a continuation-in-part of Ser. No. 09/264,817, filed Mar. 9, 1999 (the '817 application), which discloses and claims several distinct improvements over the hybrid vehicles shown in the '970 patent, as discussed in further detail below. Similarly, the present application is a continuation-in-part of Ser. No. 09/392,743, filed Sep. 9, 1999 (the '743 application), which discloses and claims several distinct improvements over the hybrid vehicles shown in the '970 patent and the '817 application, as discussed in further detail below. The present application discloses and claims further improvements over the vehicles of the '817 and '743 applications.

As discussed in detail below, the '817 and '743 applications (which are not to be limited by this brief summary) disclose a new "topology" for a hybrid vehicle, wherein an internal combustion engine and a first electric "starting" motor, which can be operated as a starter, to start the engine, a generator, to charge the battery bank responsive to torque from the engine or the wheels (i.e., during regenerative braking) or as a source of torque, to propel the vehicle, are connected to the road wheels of the vehicle through a clutch, so that the engine can be decoupled from the wheels during starting and battery charging, but can be connected to the wheels to propel the vehicle. A second "traction" motor is directly connected to the road wheels to propel the vehicle. The vehicle operating mode is determined by a microprocessor responsive to the "road load", that is, the vehicle's instantaneous torque demands. The '743 application further discloses that a turbocharger may be provided, and operated when needed to increase the torque output of the engine when torque in excess of its normally-aspirated capacity is required for more than a minimum time. The present application builds further on these concepts.

Koide U.S. Pat. No. 5,934,395 and Schmidt-Brücken U.S. Pat. No. 6,059,059 were addressed during the prosecution of the '817 application. Tsuzuki U.S. Pat. No. 6,018,198 and Werson U.S. Pat. No. 5,986,376 were also each applied against one claim. As indicated, the '817 application discloses a hybrid vehicle comprising a controller, a battery bank, an internal combustion engine, and two electric motors, a starting motor and a traction motor. The starting motor and engine are connected to the road wheels through a clutch, while the traction motor is connected directly and permanently to the road wheels for torque transmission therebetween, i.e., without a clutch therebetween. Koide does not show this "topology" for a hybrid vehicle; although Koide does show a hybrid vehicle having first and second motors along with an engine, the components are not connected as described. Specifically, in Koide, both motors and the engine are connected to the road wheels by way of a variable-ratio transmission and a clutch, while, as noted, in the '817 application only the combination of the engine and starting motor is connected to the wheels through a clutch, while the traction motor is connected directly to the wheels for torque transmission therebetween, that is, without a clutch or variable-ratio transmission. More specifically, Koide's entire disclosure is premised on being able to vary the ratios between the torque-producing components of his system and the road wheels, in order that the engine can be smoothly started when needed. According to the '817 application, only the starter motor and engine need to be disconnectible from the wheels for smooth starting, while the traction motor can be connected to the road wheels at all times. This represents a substantial simplification with respect to the system shown by Koide.

The Schmidt-Brücken patent also fails to show the topology shown in the '817 application. Schmidt-Brücken shows an engine 1 in combination with a starting motor 7, connected to the road wheels through a first clutch 11, and a traction motor 19 connected to the road wheels through a second clutch 23.

The '817 and '743 applications also disclose that the vehicle operating mode is determined by a microprocessor responsive to the "road load", that is, the vehicle's instantaneous torque demands, i.e., that amount of torque required to propel the vehicle at a desired speed. The operator's input, by way of the accelerator or brake pedals, or a "cruise control" device, indicates that continuing at steady speed is desired, or that a change in vehicle speed is called for. For example, the operator's depressing the accelerator pedal signifies an increase in desired speed, i.e., an increase in road load, while reducing the pressure on the accelerator or depressing the brake pedal signifies a desired reduction in vehicle speed, indicating that the torque being supplied is to be reduced or should be negative. More particularly, it is important to note that the road load can vary between wide limits, independent of vehicle speed, and can be positive or negative, i.e., when decelerating or descending a hill, in which case the negative road load (that is, torque available at the wheels in excess of that required to propel the vehicle) is usually employed to charge the battery bank.

More particularly, it is important to recognize that road load is not the same thing as vehicle velocity. Indeed, as noted, road load can be negative while vehicle velocity is positive, as during deceleration or descent. Moreover, widely differing road loads may be encountered during operation at the same velocity; for example, operation at 50 mph on a flat road may involve a road load of only 30-40% of the engine's maximum output torque (MTO), while accelerating from the same speed while climbing a hill may involve a road load of well over 100% of MTO.

By the same token, control of the vehicle's operating mode in response to monitoring of road load is not the same as controlling its operating mode in response to vehicle speed. Numerous prior art references, including the Koide and Schmidt-Brücken patents, teach. the latter, i.e., indicate the vehicle operating mode should be controlled in response to vehicle speed. See Koide at col. 12, lines 45-48, and Schmidt-Brücken at col. 5, line 56-col. 6 line 29. Neither Koide nor Schmidt-Brücken, nor any other reference of which the inventors are aware, recognizes that the desired vehicle operational mode should preferably be controlled in response to the vehicle's actual torque requirements, i.e., the road load. Doing so according to the invention provides superior performance, in terms of both vehicle response to operator commands and fuel efficiency, under the widely-varying conditions encountered in "real world" driving situations, than is possible according to the prior art.

Moreover, as set forth in the '817 and '743 applications, in order to provide maximum efficiency in use of fuel, it is essential to operate the internal combustion engine of a hybrid vehicle only under circumstances where the engine will be loaded so as to require at least 30% of its maximum torque output ("MTO") (it being understood throughout this specification and the appended claims that this 30% figure is arbitrary and can be varied). If the vehicle is controlled to shift into an engine-only mode whenever it exceeds some arbitrary road speed, as in Koide and Schmidt-Brücken, it is apparent that the engine will be operated at various times when the road load is less than 30% of MTO, for example, during deceleration or during descents. Moreover, as noted above, the torque actually required can vary widely irrespective of vehicle speed. For example, 30% of MTO may be sufficient to maintain steady speed on a flat road, but 150% of MTO may be required for acceleration from the same speed. If the vehicle's operational mode is selected based solely on speed, as taught by Koide and Schmidt-Brücken, it will be incapable of responding to the operator's commands, and will ultimately be unsatisfactory.

By comparison, according to the invention of the '817 and '743 applications, and as further disclosed and claimed herein, the vehicle's operating mode—that is, the selection of the source of torque needed to propel the vehicle—is determined based on the amount of torque actually required. In this way the proper combination of engine, traction motor, and starting motor is always available. This apparently-simple point has evidently been missed entirely by the art.

Moreover, according to this aspect of the invention, the engine is used to propel the vehicle only when it is efficient to do so. This is in accordance with another aspect of the invention, wherein the engine is operated only at high efficiency, leading directly to improved fuel economy. For example, the engine is also used as needed to charge the battery bank, e.g., in low-speed city driving, where the battery bank may become depleted. The starter motor, which is operated as a generator in these circumstances, is accordingly sized so as be able to accept at least 30% of MTO as input torque; the battery bank is likewise sized so as to be able to accept a corresponding amount of charging current. Therefore the engine is never operated at less than 30% of MTO, and is thus never operated inefficiently. Koide and Schmidt-Brücken, because they teach switching the vehicle's operational mode based on vehicle speed and not its torque requirements, would inherently operate the engine under less efficient conditions.

Furutani U.S. Pat. No. 5,495,906 discloses selection of operating mode based on a combination of vehicle speed and "vehicle load"; see, e.g., col. 2, lines 39-47: "It is preferable that the running state detection means detects vehicle speed and vehicle load . . . [and] that the control means transfers the driving force generated by the engine to the power generator and changes the electric power generated by the power generator [i.e., more of the engine power is used to charge the batteries] in accordance with the vehicle load if the vehicle speed is the predetermined value or less. Moreover, it is preferable to change the predetermined value of the vehicle speed in accordance with the vehicle load." It thus appears that Furutani determines the vehicle operating state based on vehicle speed, although the change-over speed can be varied responsive to the vehicle load. Furutani's "vehicle load" thus apparently includes the torque required to charge the battery, as distinguished from applicants' "road load", i.e., the torque required to propel the vehicle. Even assuming that Furutani's "vehicle load", which is not defined, were suggestive of "road load" as used by applicants, Furutani clearly does not suggest determining the operating mode based on road load. More specifically, although Furutani recognizes a distinction between differing vehicle loads, and that the vehicle load can vary independent of vehicle speed, the vehicle operating mode is nonetheless selected based on vehicle speed; see col. 3, line 62-col. 4, line 32. Instead of varying the operating mode of the vehicle based on road load, Furutani directs more or less of the engine's torque to battery charging; see col. 4, lines 24-32.

Frank U.S. Pat. No. 6,054,844 shows several embodiments of hybrid vehicles. In those where an engine is used to provide torque to the vehicle wheels, a continuously-variable transmission is employed, and the ratio R is considered in determining the response to be made to operator input, e.g., accelerator and brake pedal positions. Frank's control strategy is to operate the engine along a line of optimal efficiency and use an electric motor to add to or subtract from the engine's output torque as appropriate. See col. 6, line 49-col. 7, line 7 and col. 10, line 33-col. 11, line 22. Frank thus does not suggest control of the vehicle operating mode responsive to road load.

U.S. Pat. No. 6,018,694 to Egami et al shows a controller for a hybrid vehicle comprising an internal combustion engine and first and second "rotary electric units". Although the question is not free from doubt, it appears from a detailed review of Egami's disclosure that torque from the engine is not supplied directly to the road wheels, but instead is used to drive one of the rotary electric units as a generator, in turn supplying the second with current to provide torque for propelling the vehicle. Hence Egami does not show selection of the operational mode of the vehicle (that is, the determination whether propulsive torque is to be provided from the engine, one or both of the motors, or all three) in response to the road load, since it does not appear that propulsive torque is ever supplied from the engine to the wheels. Moreover, despite making reference to a "vehicle driving torque demand Mv*", which might be misunderstood to be equivalent to applicant's road load, Egami in fact does not determine the road load. More specifically, Mv* is determined by consulting a "map", using "the vehicle speed V, the accelerator lift ACC, the brake state BRK, and the shift position SFT as the input parameters". See col. 22, lines 23-26. The same point, i.e., that the "vehicle driving torque demand Mv*" is not equivalent to applicant's claimed road load, is made throughout Egami's extensive specification; see, for example, col. 10, lines 28-32 and col. 27, lines 58-65.

Deguchi U.S. Pat. No. 5,993,351 refers to decision-making regarding the vehicle mode of operation "based on the vehicle speed detected value and the required motive force detected value" (Abstract; see also col. 1, line 41); the latter might be misunderstood to be equivalent to the road load. Deguchi also states (col. 2, lines 7-9) that the vehicle "runs on the motor at times of low load and runs on the internal combustion engine at times of high load". However, Deguchi makes it clear that in fact the operational-mode decision is made "based on the accelerator aperture detected value θ which represents the required driving force of the vehicle and the detected vehicle speed" (col. 5, lines 19-21). The accelerator position and vehicle speed signals are the only relevant inputs to the vehicle controller shown in FIG. 2. Hence Deguchi does not show controlling the vehicle operating mode responsive to road load as defined by applicants.

Along generally similar lines, Boll U.S. Pat. No. 5,327,992 teaches a hybrid vehicle comprising a diesel engine and a motor on a common shaft, and intended to be operated such that the engine is only operated efficiently, i.e., under relatively high load. The torque required to overcome the "instantaneous tractive resistance" is determined responsive to the deflection of the accelerator pedal, i.e., in response to operator command (see col. 3, line 13 and line 35); when this is less than the minimum amount of torque that can be produced efficently by the engine, the excess torque is used to power the motor as a generator. Boll also suggests that both the motor and engine can be used to propel the vehicle when needed, e.g., during acceleration, and that the vehicle can be operated in four different modes: (a) engine alone powering the vehicle; (b) motor only powering the vehicle, with the engine "generally switched off"; (c) engine and motor both powering the vehicle; and (d) engine powering vehicle, with excess torque powering motor in generator mode. Boll also teaches that a second motor can be provided, operable as a generator and then driven either by the engine directly or by exhaust gas, and that the resulting current can be used to charge the battery or to power the other motor.

Other references of interest are directed to the braking systems of hybrid vehicles, see for example German patent 19 05 641 to Strifler, discussing a method of control of a braking system providing both regenerative and mechanical braking, and the powering of ancillary systems, such as power steering pumps, see U.S. Pat. No. 5,249,637 to Heidl. These references are discussed in further detail below with reference to improvements provided in these areas by the present application.

OBJECTS OF THE INVENTION

It is an object of the invention to provide an improved hybrid electric vehicle realizing substantially increased fuel economy and reduced pollutant emissions as compared to present day internal combustion and hybrid vehicles while suffering no significant penalty in performance, operating convenience, cost, complexity, or weight, which can be operated efficiently by an operator accustomed to conventional vehicles without special training, and which does not require modification of the existing infrastructure developed over the years to support conventional vehicles.

More specifically, it is an object of the invention to provide such an improved vehicle that operates on fuel now widely available and uses batteries already well understood and widely available, so that the operator need not learn new driving techniques, deal with new fuel supply arrangements, nor be obliged to be attentive to maintenance of batteries employing complex new technologies.

It is a more particular object of the present invention to provide an improved series-parallel hybrid electric vehicle wherein an internal combustion engine and two separately-controlled electric motors can separately or simultaneously apply torque to the driving wheels of the vehicle, controlled to realize maximum fuel efficiency at no penalty in convenience, performance, or cost.

It is a further object of the invention to provide a series-parallel hybrid electric vehicle comprising two electric motors together providing output power equal to at least 100 percent of the rated output power of the internal combustion engine, and more preferably up to about 150-200 percent thereof, so that the engine operates under substantially optimum conditions in order to realize substantial fuel economy and reduced emission of undesirable pollutants in operation.

More particularly, it is an object of the invention to provide a series-parallel hybrid electric vehicle wherein the internal combustion engine is sized to efficiently provide the average power required for operation at moderate and highway speeds, with two) or more) separately-controlled electric motors together sized to deliver the additional power needed for acceleration and hill climbing.

Still another object of the invention is to provide a series-parallel hybrid electric vehicle wherein the electric motor and battery charging circuits operate at no more than about 30-50 amperes continuous current (although significantly greater currents may flow for short periods, under peak load conditions), whereby resistance heating losses are greatly reduced, and whereby inexpensive and simple electrical manufacturing and connection techniques can be employed.

It is a more specific object of the present invention to provide a hybrid drive system for vehicles that does not require the controllable torque-transfer unit shown in the '970 patent, while providing the functional advantages of the hybrid vehicle shown in the '970 patent.

It is a more specific object of the invention to employ the control flexibility provided by the improved hybrid drive train of the invention to allow starting of the engine at comparatively high RPM, while controlling the fuel/air mixture supplied during starting, throttling the engine, and providing a preheated catalytic converter, minimizing emission of unburned fuel and further improving fuel economy.

It is a more specific object of the invention to employ the control flexibility provided by the improved hybrid drive train of the invention to allow employment of a motor producing substantially constant torque up to a base speed, and substantially constant power thereafter, as the engine starting motor, so that torque produced thereby can also be used to propel the vehicle.

In addition to the above objects of the invention, which are similar to those listed in the '817 and '743 applications, the invention of the present continuation-in-part application has as objects the broadening of the useful ranges of loading of vehicles according to the invention, e.g., to provide highly efficient hybrid operation for a vehicle that may weigh 7,000 pounds empty but which can be loaded to weigh 10,000 pounds or more, and may be expected to pull a trailer also weighing 10,000 pounds or more.

A further object of the present invention is to provide further improvements in methods of control of internal combustion engines for hybrid vehicles, to obtain very efficient use of fuel.

Another object of the present invention is to provide an optimal HVAC system for hybrid vehicles.

Still a further object of the invention is to provide a braking system for hybrid vehicles including regenerative braking that provides optimal operator feedback despite changes in operation responsive to the state of charge of the battery bank.

Other aspects and objects of the invention will become clear as the discussion below proceeds.

SUMMARY OF THE INVENTION

As discussed above, the '970 patent discloses hybrid vehicles wherein a controllable torque transfer unit is provided capable of transferring torque between an internal combustion engine, an electric motor, and the drive wheels of the vehicle. See FIGS. 3-11 thereof. The direction of torque transfer is controlled by a microprocessor responsive to the mode of operation of the vehicle, to provide highly efficient operation over a wide variety of operating conditions, and while providing good performance. The flow of energy—either electrical energy stored in a substantial battery bank, or chemical energy stored as combustible fuel—is similarly controlled by the microprocessor.

According to one aspect of the invention of the '817 and '743 applications, which is also employed according to the present continuation-in-part application, the controllable torque-transfer unit shown in the '970 patent is eliminated by replacing the single electric motor shown therein by two separate motors, both operable as generators and as traction motors when appropriate. See FIGS. 3 and 4 hereof. As in the '970 patent, an internal combustion engine is provided, sized to provide sufficient torque to be adequate for the range of cruising speeds desired, and is used for battery charging as needed. The internal combustion engine is connected to the drive wheels by a clutch operated by the microprocessor responsive to its selection of the vehicle's mode of operation in response to evaluation of the road load, that is, the vehicle's instantaneous torque demands and input commands provided by the operator of the vehicle. A relatively high-powered "traction" motor is connected directly to the output shaft of the vehicle; the traction motor provides torque to propel the vehicle in low-speed situations, and provides additional torque when required, e.g., for acceleration, passing, or hill-climbing during high-speed driving.

According to the invention of the '817 and '743 applications, a relatively low-powered starting motor is also provided, and can be used to provide torque propelling the vehicle when needed. This second motor is connected directly to the internal combustion engine for starting the engine. Unlike a conventional starter motor, which rotates an internal combustion engine at low speed (e.g., 60-200 rpm) for starting, necessitating provision of a rich fuel/air mixture for starting, the starter motor according to the invention spins the engine at relatively high speeds, e.g., 300-600 rpm, for starting; this allows starting the engine with a much less fuel-rich fuel/air mixture than is conventional, significantly reducing undesirable emissions and improving fuel economy at start-up. A catalytic converter provided to catalytically combust unburnt fuel in the engine exhaust is preheated to an effective working temperature before starting the engine, further reducing emissions.

In the embodiment discussed in detail, the starting motor is connected directly to the engine, and this combination is connected to the traction motor by a clutch for transfer of torque; the output shaft of the traction motor is then connected to the road wheels of the vehicle. In other embodiments, the engine/starting motor combination may be connected to a first set of road wheels through a clutch, with the traction motor connected to another set of road wheels directly; in a further embodiment, plural traction motors may be provided. In each case, the engine is controllably disconnected from the road wheels by control of the clutch. Engagement of the clutch is controlled by the microprocessor, e.g., controlling an electrical or hydraulic actuator as part of controlling the state of operation of the vehicle in response to the road load.

For example, during low-speed operation, the clutch will be disengaged, so that the engine is disconnected from the wheels; the vehicle is then operated as a "straight" electric car, i.e., power is drawn from the battery bank and supplied to the traction motor. Should the batteries become relatively depleted (e.g., become discharged to 50% of full charge), the starter motor is used to start the internal combustion engine, which then runs at relatively high torque output (e.g., at least about 30% of its maximum torque), for efficient use of fuel, and the starting motor is operated as a high-output generator to recharge the battery bank.

Similarly, when the operator calls for more power than available from the traction motor alone, e.g., in accelerating onto a highway, the starter motor starts the internal combustion engine; when it reaches an engine speed at which it produces useful torque, the clutch is engaged, so that the engine and starter motor can provide additional torque. As noted above, the engine is rotated at relatively high speed for starting, so that the engine rapidly reaches a useful speed.

As in the '970 patent, the engine is sized so that it provides sufficient power to maintain the vehicle in a range of suitable highway cruising speeds, while being operated in a torque range providing good fuel efficiency; if additional power is then needed, e.g., for hill-climbing or passing, the traction and/or starter motors can be engaged as needed. Both motors can be operated as generators, e.g., to transform the vehicle's kinetic energy into electrical power during descent or deceleration. Also as in the '970 patent, the peak power of the two motors together at least equals the rated power of the engine, as is necessary to provide good performance without employment of a variable-speed transmission or the equivalent.

In each of these aspects of the operation of the vehicle, and as in the '970 patent, the operator of the vehicle need not consider the hybrid nature of the vehicle during its operation, but simply provides control inputs by operation of the accelerator and brake pedals. The microprocessor determines the appropriate state of operation of the vehicle based on these and other inputs and controls the various components of the hybrid drive train accordingly.

It is also within the scope of the invention to operate one or both of the motors at differing rotational speeds than the engine, so that each can be optimized for the demands thereon. More specifically, motors can in general be made smaller if they can be operated at relatively high RPM. Motors operating at up to 9000-18,000 RPM appear appropriate for the present application. However, operating the internal combustion engine at this speed would likely lead to undesirable levels of noise and vibration, and might constrain its performance characteristics in an undesirable manner. Accordingly, for example, the starter motor might drive the engine through a pinion geared to a larger toothed flywheel, as conventional. Similarly, it might be desirable to provide the traction motor as a relatively high-speed unit, driving the road wheels through a chain, belt, or gear reduction unit. The starter motor may be configured as a "faceplate" or "pancake" motor, essentially forming the flywheel of the engine, and rotating at engine speed, while the traction motor is a much higher speed induction motor connected to the vehicle driveshaft by a chain drive reduction unit. It is also within the scope of the invention, as noted above, to operate the engine and the two motors at the same speed when the clutch is engaged, avoiding intermediate gear trains or like mechanical components and the attendant cost, complexity, weight, audible noise, and frictional losses occasioned by their use.

Other improvements provided according to the invention include providing the batteries in two series-connected battery banks, with the vehicle chassis connected to the batteries at a central point, between the banks. This "center-point-chassis" connection reduces the voltage between various circuit components and the vehicle chassis by half, significantly reducing the electrical insulation required and simplifying such issues as heat-sinking of power semiconductors used in the inverter circuitry. Providing dual battery banks and dual electric motors, as above, also provides a degree of redundancy, permitting certain component failures without loss of vehicle function.

In the preferred embodiment, both the traction and starting motors are AC induction motors of four or more phases and the accompanying power circuitry provides current of more than three, preferably five, phases, allowing the vehicle to function even after failure of one or more components. These motors, and the inverter/chargers driving them, should be chosen and operated such that the motors have torque output characteristics varying as a function of rpm as illustrated in FIG. 14 of the '970 patent; that is, the motors should produce substantially constant torque up to a base speed and should produce substantially constant power at higher speeds. The ratio of the base to maximum speed can vary between about 3 to 1 and about 6 to 1. By comparison, the series-wound DC motors conventionally used as engine starting motors provide very high torque, but only at very low speeds; their torque output drops precipitously at higher speeds. Such conventional starter motors would be unsatisfactory in the present system.

During substantially steady-state operation, e.g., during highway cruising, the control system operates the engine at varying torque output levels, responsive to the operator's commands. The range of permissible engine torque output levels is constrained to the range in which the engine provides good fuel efficiency. Where the vehicle's torque requirements exceed the engine's maximum efficient torque output, e.g., during passing or hill-climbing, one or both of the electric motors are energized to provide additional torque; where the vehicle's torque requirements are less than the minimum torque efficiently provided by the engine, e.g., during coasting, on downhills or during braking, the excess engine torque is used to charge the batteries. Regenerative charging may be performed simultaneously, as torque from the engine and the vehicle's kinetic energy both drive either or both motors in generator mode. The rate of change of torque output by the engine may be controlled in accordance with the batteries' state of charge.

The vehicle is operated in different modes, depending on its instantaneous torque requirements, and the state of charge of the battery, and other operating parameters. The mode of operation is selected by the microprocessor in response to a control strategy discussed in detail below; the values of the sensed parameters in response to which the operating mode is selected may vary depending on recent history, or upon analysis by the microprocessor of trips repeated daily, and may also exhibit hysteresis, so that the operating mode is not repetitively switched simply because one of the sensed parameters fluctuates around a defined setpoint.

None of the implementations of the invention shown in the '970 patent or the '817 and '743 applications include a conventional multi-speed transmission between the motors and engine and the road wheels, and it was stated that a desirable aspect of the invention was to avoid such transmissions, so that the rotational speeds of the two motors and the engine were fixed with respect to one another, and to the speed of the road wheels. However, it now appears that in some circumstances a two-speed transmission may be desired in some cases to broaden the range of utility of the vehicles of the invention (principally to extend their load-carrying capabilities) while still providing highly efficient operation, and to include such a two-speed transmission is accordingly part of the invention of the present continuation-in-part application. Such a two-speed transmission could be operated infrequently as a two-speed "range selector", or could be operated essentially as a conventional automatic transmission, that is, be repetitively shifted during acceleration, upon "kick-down" and the like.

More specifically, it is of great present interest to optimize the hybrid power train of the invention for use with relatively heavy vehicles, such as vans, pickup trucks and "sport-utility vehicles" (SUVs). Such vehicles have become increasingly popular in recent years, despite their generally poor fuel mileage; it would be highly desirable to provide vehicles with generally similar load-carrying abilities and performance with better fuel economy. Still more particularly, heretofore large classes of such vehicles have not been subject to certain emission regulations; however, such regulations are expected to take effect shortly. Accordingly, it would be very desirable to provide such vehicles with hybrid power trains that will allow their owners to enjoy the load-carrying and performance abilities of the existing vehicles with improved fuel economy and reduced emissions.

One of the aspect of SUVs and similar vehicles that must be considered in design of a suitable hybrid powertrain is that their owners use them to carry and tow widely-varying loads. That is, a conventional SUV might weigh 5,500 pounds, and might typically be used during the week to transport a 140 pound person, up to 300 pounds of children, and 50 pounds of groceries. However, on the weekend the family might load the vehicle with half a ton of camping gear and the like and set off for the mountains towing a 7,500 pound trailer. The vehicle must provide adequate acceleration, passing, and hill-climbing performance in both uses. In order to have sufficient power at times of maximum loading, the vehicle is grossly overpowered under all different circumstances; that is, only when the vehicle is laden to near-maximum capacity and pulling up a long hill does the engine deliver near maximum torque for any length of time. Under all other circumstances, it is run very inefficiently, as noted in connection with FIGS. 1 and 2 (reproduced herein from the '970 patent).

An important aspect of the invention as described by the present continuation-in-part application as well as the predecessor applications and the '970 patent lies in controlling the operation of the internal combustion engine of a hybrid vehicle so that it is only operated at high efficiency, that is, only when is it loaded to require a substantial fraction e.g., 30% of its maximum torque output. That is, the engine is never run at less than 30% of maximum torque output ("MTO"). As discussed in the '970 patent and the '817 application, this can be accomplished by sizing the engine so that it can efficiently propel the vehicle unassisted at highway speeds; if additional torque is required for passing or hill-climbing, the traction motor is operated. application Ser. No. 392,743 further adds the idea of providing a turbocharger, controlled by the microprocessor only to operate when torque in excess of the engine's rated normally-aspirated maximum torque output (MTO) is needed for an extended period of time, for example in towing a trailer. By employing the turbocharger only when actually needed, many of the drawbacks inherent in conventional turbocharger uses are eliminated. Typically the turbocharger may be sized such that the engine provides up to 150% of MTO when turbocharged.

According to one aspect of the invention of the present continuation-in-part application, the range of efficient use of the hybrid vehicle of the invention is further broadened by providing a two-speed transmission between the engine and road wheels, so as to allow variation in the overall gear ratio and therefore vary the amount of torque available at the wheels. As noted above, this could be a manually- or automatically-operated "range shifting" gearbox akin to those presently provided on SUVs and the like, to allow shifting into a "low range", for example, when a heavy trailer is be towed, or could be operated similarly to a conventional multispeed transmission, that is, to provide a sequence of effective overall gear ratios each time the vehicle is accelerated.

A further improvement made according to the present continuation-in-part application has to do with the braking system. As noted above, the '970 patent (as well as numerous other prior art references) disclose regenerative braking, that is, employing the microprocessor to control the operation of inverter/chargers connected between the motor and battery bank so that when the operator desires to slow the vehicle, its momentum is used to drive the motor in generator mode, charging the battery. There are certain limitations on this as a method of vehicle braking, which must be addressed by any useful vehicle. In particular, a hydraulic braking system of generally conventional design must be provided for several reasons: first, for safety, in the event that the regenerative system fails for any reason; second, to provide braking in the event the battery bank is fully charged and cannot accept further charge (since overcharging is highly detrimental to battery life); and to provide braking when regenerative braking is not available, e.g., when at a standstill. The present application discloses certain improvements in hydraulic braking systems desired to optimize their design for use with hybrid vehicles, as well as a mechanism providing optimized brake "feel" to the driver, regardless whether conventional, regenerative, or both braking systems are in use.

The present application also discloses certain problems inherent in application of conventional vehicles' heating, ventilation and air conditioning systems to hybrid vehicles, and describes preferred solutions to these problems.

A further improvement according to the present invention includes the provision of an auxiliary 12 volt supply system, allowing the hybrid vehicle of the invention to "jumpstart" another vehicle, or likewise to be jumpstarted as might be necessary after a long hiatus, and to allow use of conventional 12 volt accessories, such as radios and other electronic items.

The present application also discloses further useful modifications and enhancements to the hybrid vehicles of the predecessor applications.

The above and still further objects, features and advantages of the present invention will become apparent upon consideration of the following detailed description of a specific embodiment thereof, especially when taken in conjunction with the accompanying drawings, wherein like reference numerals in the various figures are utilized to designate like components.

BRIEF DESCRIPTION OF THE DRAWINGS

The invention will be better understood if reference is made to the accompanying drawings, in which:

FIG. 8, comprising

FIG. 9 is a simplified flow chart of the algorithm employed by the microprocessor to implement the control strategies provided by the vehicle according to the invention;

FIG. 9(a) is a flow chart of an engine starting subroutine employed in the flowchart of FIG. 9;

FIG. 9(b) is an alternate version of one of the steps of the flowchart of FIG. 9, implementing a modification to the vehicle control strategy;

FIG. 9(c) is an alternate version of another of the steps of the flowchart of FIG. 9, similarly implementing a modification to the vehicle control strategy;

FIG. 16 is a is a schematic diagram of the preferred heating, ventilation and air conditioning system of a hybrid vehicle according to the invention.

DESCRIPTION OF THE PREFERRED EMBODIMENTS

Figure 1:
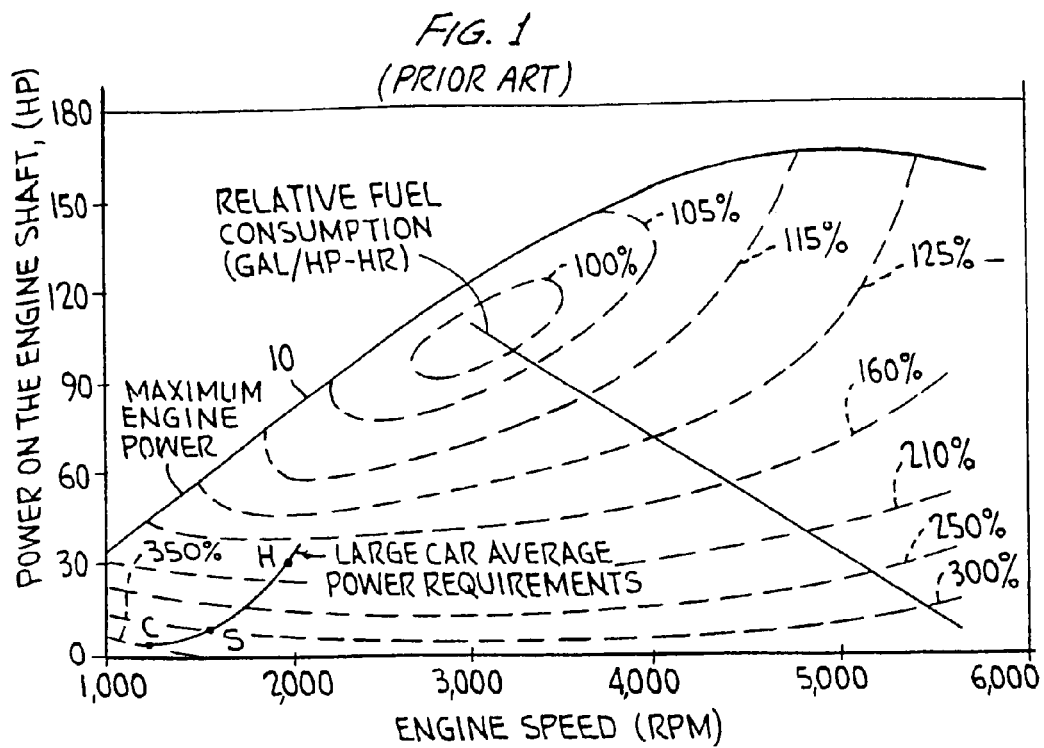
FIG. 1 is a plot of output power versus rotational speed (RPM) for a typical internal combustion engine, illustrating the relative fuel consumption of the engine as used in a conventional automobile in gallons/horsepower-hour.

Referring specifically to FIG. 1, which is reproduced here from the '970 patent for convenience, curve 10 represents the output power versus engine speed (RPM) of a typical spark ignition gasoline-fueled internal combustion engine as used with an automatic transmission in a typical sedan of 3,300 pounds. As can be seen, the maximum engine power available is about 165 horsepower at about 5,000 RPM. Also shown in FIG. 1 by the curve labeled "Large Car Average Power Requirements" are the average power requirements of such a vehicle. Points C, S, and H on this curve show average fuel consumption in city, suburban, and highway driving, respectively; in particular, point C shows that the average power required in typical city driving is less than 5 hp. Point S shows that the average power consumed in suburban driving is 10 hp, and point H shows that the power needed for steady-speed highway driving is only about 30 hp. Thus, the vehicle is vastly overpowered at all times except during acceleration or hill-climbing.

FIG. 1 also includes dashed-line curves indicating the relative fuel consumption of the engine. As can be seen, reasonable fuel efficiency, that is, at least about 105 percent relative fuel consumption (100% being ideal), is reached only when the engine is operated at between about 2,000 and 4,000 RPM, and when producing between about 75 and 150 horsepower. FIG. 1 thus indicates that the typical internal combustion engine is operated with reasonable efficiency only when producing between about 50 and about 90% of its maximum output power. The typical automobile only requires such substantial power under conditions of extreme acceleration or hill climbing.

Accordingly, it will be appreciated that the typical engine is operated efficiently only during relatively brief intervals; more specifically, at lower power outputs, losses due to friction and pumping consume larger fractions of the engine's total torque, so that a lower fraction is available to propel the vehicle. As can be seen, during typical highway driving, shown by point H, the relative fuel consumption is on the order of 190 percent of that required during the most efficient operation of the engine. The situation is even worse in suburban driving, where the relative fuel consumption is nearly 300 percent of the most efficient value, and in city driving, where the relative fuel consumption is almost 350 percent of that required at most efficient operation.

FIG. 1 thus demonstrates that an internal combustion engine having sufficient horsepower for adequate acceleration and hill climbing capability must be so oversized with respect to the loads encountered during most normal driving that the engine is grossly inefficient in its consumption of fuel. As noted, FIG. 1 further shows that only about 30 horsepower is needed to cruise on the highway even in a relatively large car.

Figure 2:
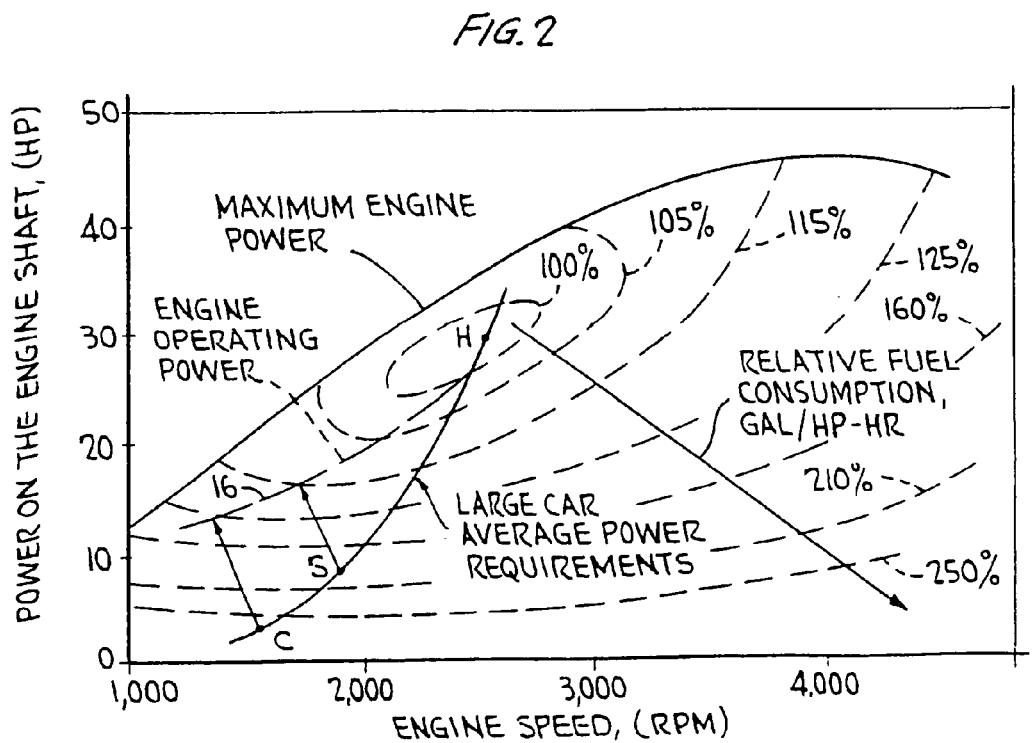
FIG. 2 is a similar plot describing operation of a relatively small internal combustion engine used in the present invention under circumstances similar to those depicted in FIG. 1.

FIG. 2 (again reproduced from the '970 patent for convenience) is similar to FIG. 1, and illustrates the operational characteristics of the same 3,300 pound car if driven by a relatively small engine having a maximum horsepower rating of about 45 horsepower at 4,000 RPM. The power requirement of the vehicle during highway cruising, shown by point H on the curve marked "Large Car Average Power Requirements", is in the center of the most efficient region of operation of the engine. However, even with this small engine thus optimized for highway cruising, there is a substantial gap between the "Engine Operating Power" curve and the Average Power Requirement curve 14. That is, even this small engine produces substantially more power at low RPM than needed for city driving (point C) or for suburban driving (point S). Accordingly, even with a small engine sized appropriately for highway cruising, substantial inefficiencies persist at lower speeds. Moreover, of course, such a vehicle would have unsatisfactory acceleration and hill climbing ability. Therefore, the answer is not simply to replace large internal combustion engines with smaller internal combustion engines.

The prior art recognizes that there are substantial advantages to be gained by combining the virtues of a gasoline or other internal combustion engine with those of an electric motor running from a battery charged by the internal combustion engine. However, the prior art has failed to provide a solution which is directly price- and performance-competitive with vehicles now on the market; moreover, in order that such a vehicle can be commercially successful, it must also be no more complex to operate than existing vehicles.

As indicated above, "straight" electric vehicles, that is, vehicles having electric traction motors and batteries requiring recharge at the end of each day's use, do not have sufficient range and require too much time to recharge to fully replace conventional automobiles. Further, the operational costs of such vehicles are not competitive with internal combustion vehicles operated on fuels derived from renewable resources such as ethanol, and are even less competitive with gasoline-fueled automobiles.

A first type of series hybrid vehicles, involving a gasoline engine driving a generator charging a battery powering an electric traction motor, are limited in acceleration and hill climbing ability unless the electric motor is made very large, costly, and bulky. The alternative series hybrid approach, involving a transmission between a relatively smaller electric motor and the wheels to provide the torque needed to accelerate quickly, loses the virtue of simplicity obtained by elimination of a multi-speed transmission. These vehicles fail to realize the advantages provided by the parallel hybrid system in which both an internal combustion engine and an electric motor provide torque to the wheels as appropriate.

However (apart from the '970 patent) the prior art relating to parallel hybrid vehicles fails to disclose a system sufficiently simple for economical manufacture. The art further has failed to teach the optimum method of operation of a parallel hybrid vehicle. Moreover, the art relating to parallel hybrids (again, apart from the '970 patent) does not teach the appropriate operational parameters to be employed, relating to the relative power outputs of the internal combustion engine and the electric motor; the type of electric motor to be employed; the frequency, voltage, and current characteristics of the motor/battery system; the proper control strategy to be employed under various conditions of use; and combinations of these.

As shown in the '970 patent with reference to FIGS. 1 and 2 thereof, and again above, typical modern automobiles operate at very low efficiency, due principally to the fact that internal combustion engines are very inefficient except when operating at near peak torque output; this condition is only rarely met. (The same is true, to greater or lesser degree, of other road vehicles powered by internal combustion engines.) According to an important aspect of the invention of the '970 patent, substantially improved efficiency is afforded by operating the internal combustion engine only at relatively high torque output levels, typically at least 35% and preferably at least 50% of peak torque. When the vehicle operating conditions require torque of this approximate magnitude, the engine is used to propel the vehicle; when less torque is required, an electric motor powered by electrical energy stored in a substantial battery bank drives the vehicle; when more power is required than provided by either the engine or the motor, both are operated simultaneously. The same advantages are provided by the system of the present invention, with further improvements and enhancements described in detail below.

According to one aspect of the invention of the '970 patent, the internal combustion engine of a hybrid vehicle is sized to supply adequate power for highway cruising, preferably with some additional power in reserve, so that the internal combustion engine operates only in its most efficient operating range. The electric motor, which is substantially equally efficient at all operating speeds, is used to supply additional power as needed for acceleration and hill climbing, and is used to supply all power at low speeds, where the internal combustion engine is particularly inefficient, e.g., in traffic.

As indicated above, this application discloses certain modifications, improvements, and enhancements of the hybrid vehicles shown in U.S. Pat. No. 5,343,970; where not otherwise stated, the design of the vehicle of the present invention is similar to that shown in the '970 patent. Components commonly numbered in this application and the '970 patent are functionally similar, with detail differences as noted. The advantages of the system shown in the '970 patent with respect to the prior art are provided by that of the present invention, with further improvements provided by the latter, as detailed herein.

In the system of the '970 patent, torque from either or both the engine and motor is transferred to the drive wheels of the vehicle by a controllable torque-transfer unit. This unit also allows torque to be transferred between the motor and engine, for starting the engine, and between the wheels and motor, for regenerative battery charging during deceleration of the vehicle. This unit, while entirely practical, comprises gears for power transfer, which are inevitably a source of audible noise and frictional losses. According to one aspect of the present invention, the controllable torque-transfer unit is eliminated. Instead, two electric motors are provided, each separately controlled by a microprocessor controller responsive to operator commands and sensed operating conditions.

In this connection, it will be understood that the terms "microprocessor" and "microprocessor controller" are used interchangeably throughout the present application, and it is to be further understood that these terms as used herein include various types of computerized control devices not always referred to as "microprocessors" per se, such as computers themselves incorporating microprocessors, digital signal processors, fuzzy logic controllers, analog computers, and combinations of these. In short, any controller capable of examining input parameters and signals and controlling the mode of operation of the vehicle according to a stored program, as discussed below in detail, is considered to be a "microprocessor" or "microprocessor controller" as used herein. Furthermore, the electronic fuel injection and electronic engine management devices shown in FIGS. 3 and 4 as separate elements might also be integrated within the "microprocessor" or "microprocessor controller" as described herein.

Figure 3:
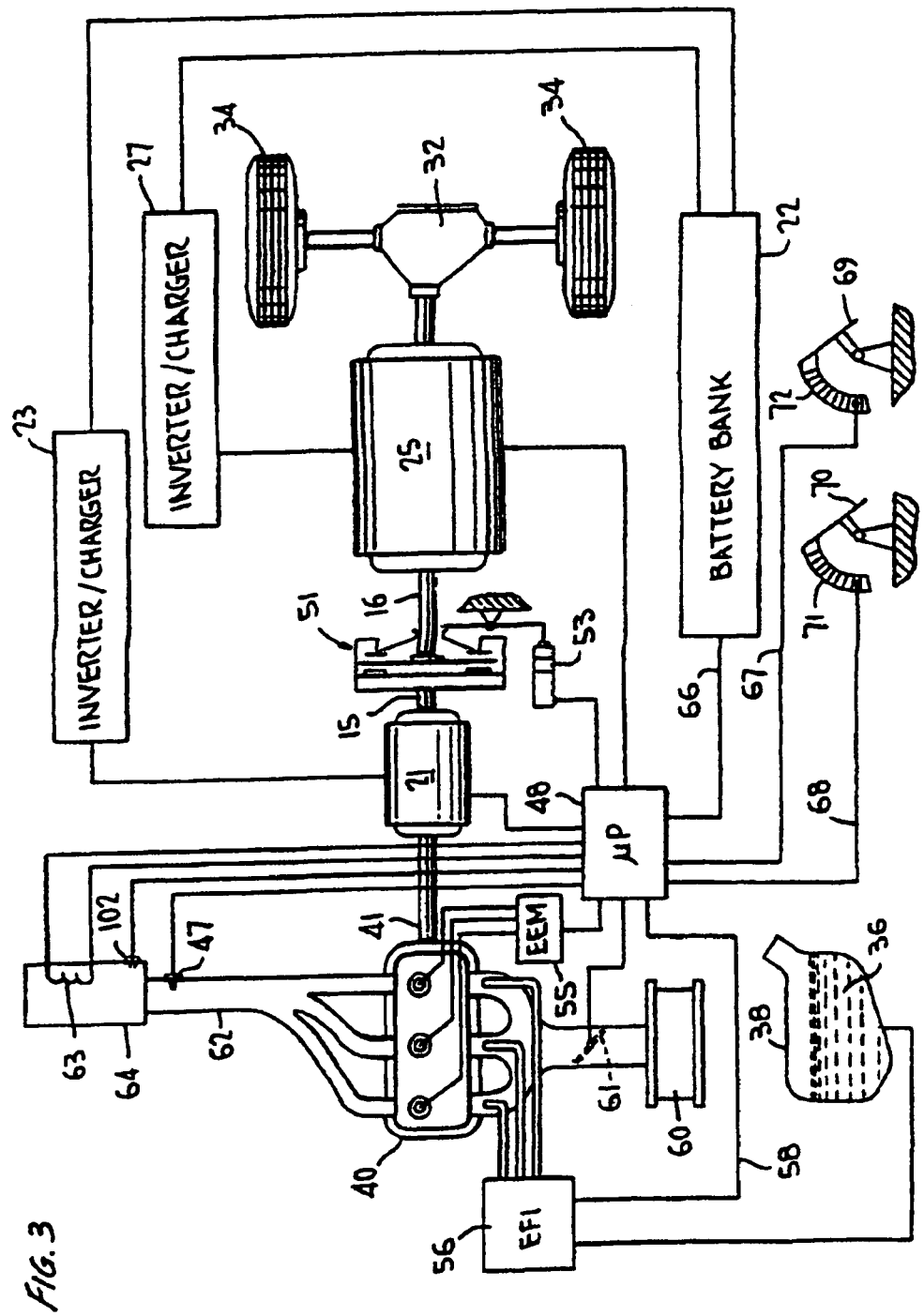
FIG. 3 shows a schematic diagram of the principal components of a first embodiment of the hybrid vehicle drive system according to the invention.
Figure 11:
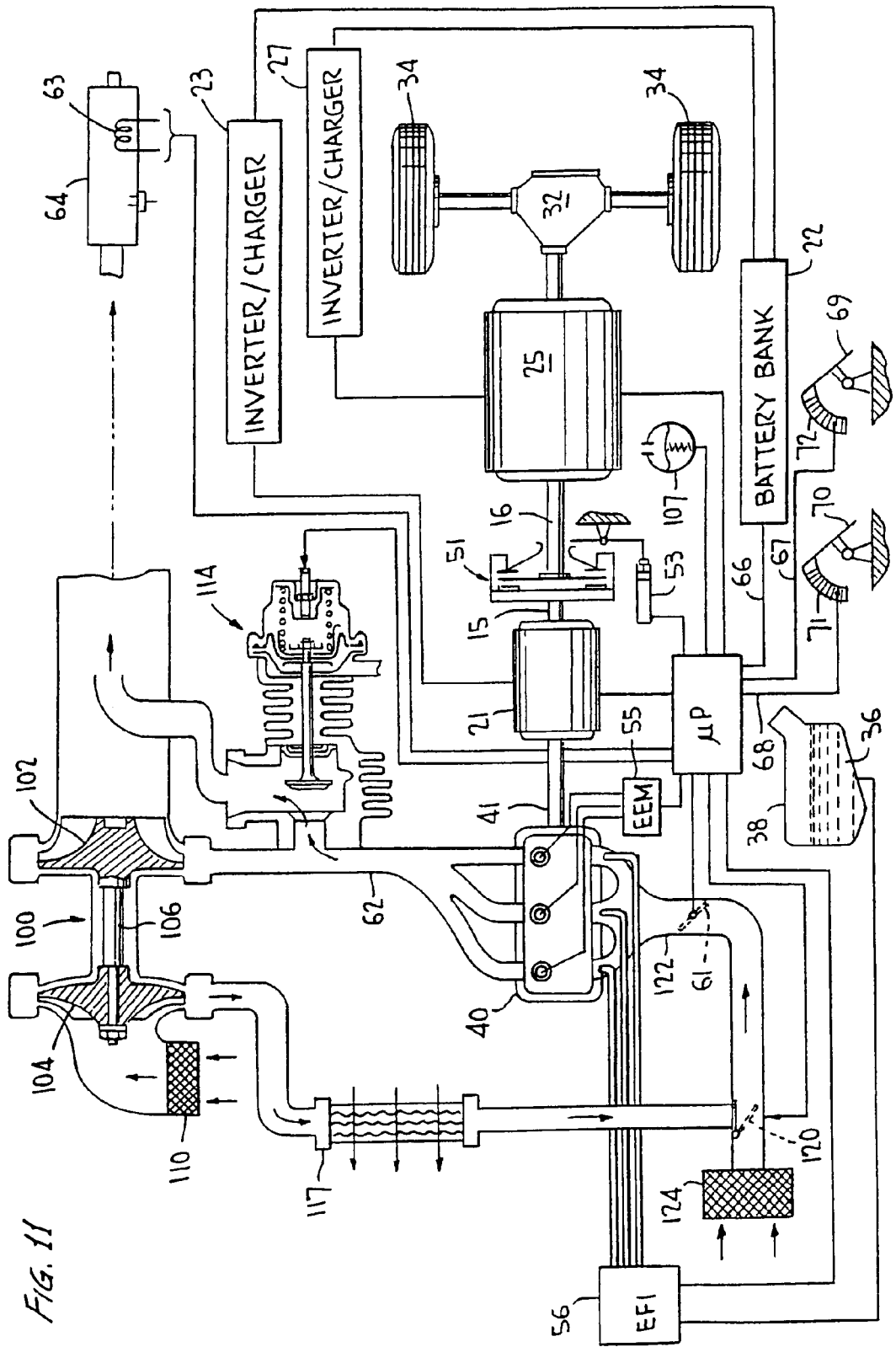
FIG. 11 is a schematic diagram similar to FIG. 3, illustrating an alternative embodiment of the hybrid vehicle powertrain according to the invention, wherein the engine is provided with a turbocharger which is controllably operable, so as to be employed only when needed.

FIG. 3 of the present application shows a first embodiment of the present invention, while FIG. 4, discussed below, shows a second embodiment illustrating certain alternative mechanical arrangements; overall the two embodiments are very similar, and functionally they are substantially identical. FIG. 11, also discussed below, illustrates a further embodiment, and FIG. 14 incorporates still further improvements.

In the FIG. 3 embodiment, a traction motor 25 is connected directly to the vehicle differential 32, and thence to the road wheels 34. A starting motor 21 is connected directly to the internal combustion engine 40. The motors 21 and 25 are functional as motors or generators by appropriate operation of corresponding inverter/charger units 23 and 27, respectively, connected between the motors and battery bank 22. At present, essentially conventional lead-acid batteries are preferred for battery bank 22, since these are widely available and well understood. More advanced batteries may be used if and when they become widely available and economically competitive.

Motors 21 and 25 are controllably connected for torque transfer by a clutch 51, mechanically interlocking the shafts 15 and 16 of motors 21 and 25 respectively. As discussed further below in connection with FIG. 4, microprocessor ("µP") 48 is provided with signals indicative of the rotational speeds of shafts 15 and 16, and controls operation of engine 40, motor 21, and motor 25 as necessary to ensure that the shafts are rotating at substantially the same speed before engaging clutch 51. Accordingly, clutch 51 need not necessarily be an ordinary automotive friction clutch (as illustrated schematically in FIG. 1), as conventionally provided to allow extensive relative slipping before the shafts are fully engaged. More particularly, as slipping of clutch 51 is not required to propel the vehicle initially from rest, as is the case in conventional vehicles, clutch 51 need not allow for extensive slipping when being engaged. In some cases it may be satisfactory to provide clutch 51 as a simple self-aligning mechanical interlock (as shown in FIG. 4), wherein positive mechanical connection is made between the shafts 15 and 16 upon engagement. Such a mechanical interlock is much simpler and less expensive than a friction clutch. In either case, clutch 51 is operated by microprocessor 48, e.g., through a known electric or hydraulic actuator 53, together with the other components of the system, in accordance with the operational state of the vehicle and the operator's input commands.

Figure 4:
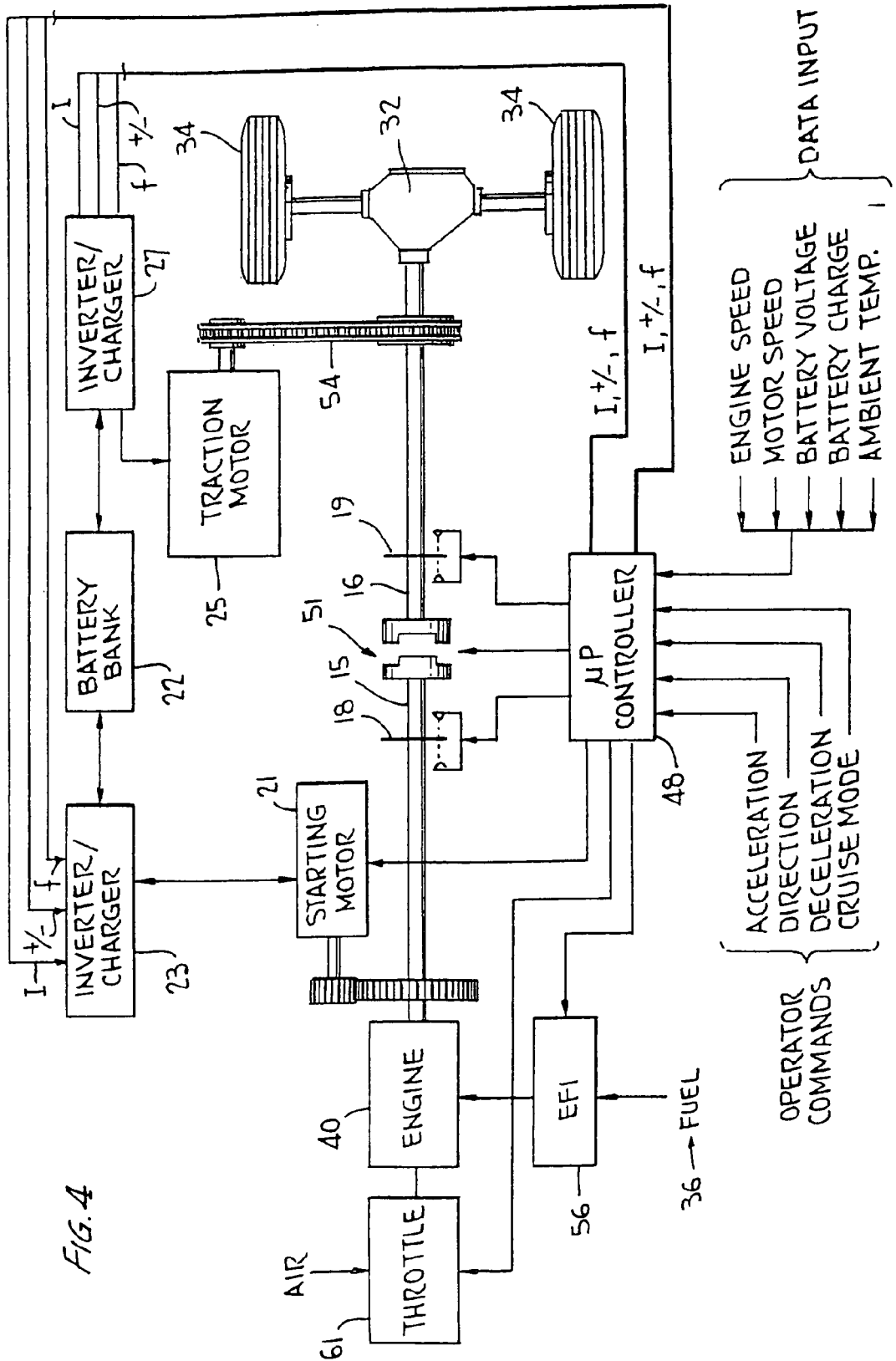
FIG. 4 shows a block diagram of the principal components of the drive system of the invention in a second embodiment, differing in certain mechanical arrangements from that of FIG. 3, and illustrating various control signals provided in both embodiments.

The respective positions of motor 21 and engine 40 with respect to clutch 51, motor 25, and wheels 34 could be reversed as compared to their positions in FIGS. 3 and 4 without affecting the function of the system, although as engine 40 would then require torque transmitting connection at both ends of its crankshaft, some additional complexity would result.

As shown in FIG. 4, shaft encoders 18 and 19 may be mounted on the shafts 15 and 16 of starting motor 21 and traction motor 25, respectively, to provide signals to microprocessor 48 indicative of the relative rotational speeds of the shafts, and their respective rotational positions. Such shaft encoders are well-known and commercially available. Alternatively, signals indicative of the rotational speeds of the shafts may be derived from the inverter control signals, in accordance with well-known principles of control of "sensorless" motor drives (see, for example, Bose, "Power Electronics and Variable Frequency Drives", IEEE, 1996). However, provision of encoders 18 and 19 will allow better low-speed torque characteristics of motor 21 and 25, and thus reduction in cost.

Thus being provided with signals indicative of the rotational speeds of shafts 15 and 16, microprocessor 48 controls operation of engine 40, motor 21, and motor 25 as necessary to ensure that the shafts are rotating at substantially the same speed before engaging clutch 51; therefore, clutch 51 need not be an ordinary automotive friction clutch (as illustrated schematically in FIG. 3), as conventionally provided to allow extensive slipping before the shafts are fully engaged. According to this aspect of the invention, and particularly if microprocessor 48 is made capable of ensuring that shafts 15 and 16 bear a desired relative angular relationship, clutch 51 instead may be a simple, relatively inexpensive self-aligning mechanical interlock (as illustrated schematically in FIG. 4), wherein positive mechanical connection is made between the shafts 15 and 16 upon engagement.

FIG. 4 also shows additional signals provided to microprocessor 48 in both the FIG. 3 and the FIG. 4 embodiments. These include operator input commands, typically acceleration, direction, deceleration, and "cruise mode" commands, as shown. The acceleration and deceleration commands may be provided by position-sensing encoders 71 and 72 (FIG. 3) (which could be configured as rheostats, Hall-effect sensors, or otherwise) connected to microprocessor 48 by lines 67 and 68, to inform the microprocessor of the operator's commands responsive to motion of accelerator and brake pedals 69 and 70 respectively. The microprocessor monitors the rate at which the operator depresses pedals 69 and 70 as well as the degree to which pedals 69 and 70 are depressed. The operator may also provide a "cruise mode" signal, as indicated, when a desired cruising speed has been reached. The microprocessor uses this information, and other signals provided as discussed herein, in accordance with the operational strategy discussed in detail below in connection with FIGS. 6-9, to properly control operation of the vehicle according to the invention by appropriate control signals provided to its various components.

For example, suppose the vehicle has been operated in city traffic for some time, that is, under battery power only. Typically the operator will only depress the accelerator pedal 69 slightly to drive in traffic. If the operator then depresses accelerator pedal 69 significantly farther than he or she had, for example, the prior few times acceleration was required, this may be taken as an indication that an amount of torque that can efficiently be provided by engine 40 will shortly be required; microprocessor will then initiate the sequence whereby starting motor 21 will be used to start engine 40.

Upon initiation of the engine starting sequence, a heater 63 (FIG. 3) will first be used to preheat a catalytic converter 64 provided in the engine exhaust system 62, so that any fuel that is not combusted during starting and subsequent running of the engine 40 will be catalytically combusted, reducing emission of undesirable pollutants. A temperature sensor 102 is preferably provided, so as to ensure the engine is not started until the catalytic material is heated to effective working temperature. As noted above, engine starting is preferably performed with the engine turning at a higher speed than is conventional, so that a the fuel/air ratio need only be slightly (e.g., 20%) richer than stoichiometric. As a result, only very limited amounts of pollutants are emitted during engine starting. By comparison, in conventional vehicles, a very significant fraction of the total pollutants emitted during any given trip are emitted during the first 30-60 seconds of operation, due to the extremely rich mixtures normally supplied during starting, and to the ineffectiveness of the catalyst until it has been heated by the exhaust.

If the operator depresses the pedal 69 rapidly, indicating an immediate need for full acceleration, the preheating step may be omitted; however, a preferable alternative may be to allow the traction and starting motors to be driven at or slightly beyond their rated power, providing adequate torque, for a short time sufficient to allow the catalyst to be warmed and the engine started.

Similarly, if the operator depresses the brake pedal 70 relatively gently, all braking may be provided by regenerative charging of the batteries; if the operator instead presses aggressively on brake pedal 70, and/or presses brake pedal 70 beyond a predetermined point, both mechanical and regenerative braking will be provided. Mechanical braking is also provided on long downhills when the batteries are fully charged, and in case of emergency. Further aspects of the preferred brake system of the hybrid vehicles of the invention are added by the present continuation-in-part application, and are discussed below.

In addition to engine and starting motor speed and traction motor speed, monitored by shaft encoders 18 and 19 as discussed above, battery voltage, battery charge level, and ambient temperature are also either monitored directly or derived from monitored variables. In response to these inputs, and the operator inputs, microprocessor controller 48 operates a control program (see the high-level flowchart of an exemplary control program provided as FIG. 9), and provides output control signals to engine 40, by commands provided to its electronic fuel injection unit (EFI) 56 and electronic engine management system (EEM) 55, and to starting motor 21, clutch 51, traction motor 25, inverter/charger units 23 and 27, and other components.

As indicated in FIG. 4, the control signals provided to inverter/chargers 23 and 27 by microprocessor 48 allow control of the current (represented as I), of the direction of rotation of the motor 25 (represented as +/−), allowing reversing of the vehicle, and of the frequency of switching (represented as f), as well as is control of operation of the motors 21 and 25 in motor or generator mode. Inverter/chargers 23 and 27 are separately controlled to allow independent operation of motors 21 and 25. Inverter/charger operation is discussed further below in connection with FIG. 5.

As noted above, the FIGS. 3 and 4 embodiments of the system of the invention differ in certain mechanical arrangements, intended to illustrate variations within the scope of the invention, and FIG. 4 also provides more detail concerning the specific control signals passing between various elements of the system.

Referring to the differing mechanical arrangements, it will be observed that in FIG. 3 the shafts of motors 21 and 25 are illustrated as coaxial with that of engine 40; this is the simplest arrangement, of course, but would require the engine 40 and starter motor 21 to rotate at the same speed at all times, and at the same speed as traction motor 25 when clutch 51 is engaged. As noted above, it may be preferable to design motors 21 and 25 to have maximum speeds of 9000-15,000 rpm, so that they could be made smaller, lighter, and less costly than slower-rotating motors. However, it is envisioned that a preferred maximum speed for engine 40 is 6000 rpm, as internal combustion engines running at substantially higher speeds wear rapidly and tend to have limited torque at low speed, and because higher frequency engine noise and vibration can also be difficult to absorb. It is within the scope of the invention to provide the motors coaxial with the engine shaft, as illustrated in FIG. 3, but to provide a planetary gearset(s) between the shafts of either or both of traction motor 25 and starting motor 21 and the output shaft to permit differing engine and motor speeds. Further alternatives to this aspect of the invention are again added by the present continuation-in-part application, and are discussed below.

FIG. 4 illustrates an alternative construction, also permitting differing engine and motor speeds. In this case, the output shaft of starting motor 21 is shown connected to that of engine 40 by spur gears 52, and traction motor 25 is connected to the output shaft 55 by chain drive indicated at 54. Numerous other arrangements will occur to those of skill in the art. However, in each case there is no variable-ratio transmission between the sources of torque—that is, the motors 21 and 25, and the engine 40—and the road wheels 34. Again, further alternatives to this aspect of the invention are added by the present continuation-in-part application, and are discussed below.

It is also within the scope of the invention to connect the traction motor to one set of wheels, and to connect the combination of the engine 40 and starting motor 21 to another set of wheels through clutch 51, thus providing a four-wheel drive vehicle with differing power sources for the alternate pairs of wheels. In this embodiment, the torque from the traction motor 25 is effectively combined with that from engine 40 (and from starting motor 21, when used as a source of propulsive torque) by the road surface, rather than by mechanical connection, as in the FIGS. 3 and 4 embodiment. A further alternative would be to provide a complete system as in FIG. 3 driving one pair of road wheels, and a separate traction motor driving a second pair of road wheels. Both embodiments are within the scope of the invention, and the control strategy is essentially the same as to both. See FIG. 14 and the related text below for further discussion.

Other elements of the system as illustrated in FIGS. 3 and 4 are generally as discussed in the '970 patent, including supply of fuel 36 from tank 38, air filter 60, and throttle 61.

Control of engine 40 by microprocessor 48 is accomplished by way of control signals provided to electronic fuel injection (EFI) unit 56 and electronic engine management (EEM) unit 55, responsive to throttle operation; preferably, the throttle in turn is operated electronically responsive to the opertor's depression of the accelerator pedal. Control of starting of engine 40, and using either or both of starting motor 21 and traction motor 25 as motors, providing propulsive torque, or as generators, providing recharging current to battery bank 22, is accomplished by microprocessor 48 by way of control signals provided to inverter/charger units 23 and 27.

Under deceleration, for example, during descents, or as needed for braking, or when the engine's instantaneous torque output exceeds the vehicle's current torque requirements, either or both of motors 21 and 25 are operated as generators, providing regenerative recharging of battery bank 22. FIG. 7, discussed below, illustrates this aspect of the operation of the vehicle of the invention in further detail.

Thus, as indicated above, when microprocessor 48 detects a continued operator requirement for additional power, such as during transition from slow-speed to highway operation, or by measuring the rate at which the operator depresses accelerator pedal 69, engine 40 is started using starter motor 21 and brought up to speed before clutch 51 is engaged, to ensure a smooth transition. As cruising speed is reached (as determined by monitoring the operator's commands), power to traction motor 25 (and to starter motor 21, if also used to accelerate the vehicle) is gradually reduced. Provision of the clutch 51 and separate starter motor 21, as compared to using the single traction motor to start engine 40 while simultaneously accelerating the vehicle, that is, as in the '970 patent, simplifies the control arrangements somewhat.

In one possibly preferred embodiment, both motors 21 and 25 and clutch 51 may be provided in a single sealed housing, possibly bathed in oil for cooling and protection from dust and the like. It is also known to control auxiliary motors, such as conventional starter motors, to absorb or add torque to that provided by an associated internal combustion engine, to damp out vibration caused by fluctuation or the torque provided by the engine; doing so herein using either or both of motors 21 and 25 is within the scope of the invention, and is simplified by virtue of the direct connection of the engine 40 to the drive wheels through motors 21 and 25 according to the invention.

Provision of the clutch 51 and separate starter motor 21 also allows another important improvement to be provided according to the present invention, namely starting engine 40 at high speed, e.g., about 300-600 rpm, as compared to the 60-200 rpm starts conventionally provided. As is generally known in the art (see Simanaitis, "What goes around comes around", *Road & Track*, November 1998, p. 201) high-rpm starting allows substantial elimination of the usual necessity of providing a fuel-rich air/fuel mixture to start engine 40, reducing emission of unburned fuel and improving fuel economy at start-up, particularly from cold.

More particularly, in conventional low-rpm starts, a rich mixture comprising up to on the order of 6 to 7 times the stoichiometric amount of fuel is provided, to ensure that some fraction of the fuel is in the vapor phase, as only fuel in the vapor phase can be ignited by a spark. Most of the excess fuel condenses as liquid on the cold cylinder walls, and thus does not burn efficiently, if at all, and is immediately emitted unburned. By comparison, at high starting speeds according to the invention, turbulence in the combustion chamber is sufficient to ensure the presence of vapor, so that a near-stoichiometric mixture, typically including only 1.2 times the stoichiometric amount of fuel, can be provided to engine 40 during the starting phase. The avoidance of rich mixtures at starting significantly reduces emission of unburned fuel—since most of the fuel provided to a conventional engine at starting is immediately exhausted unburnt—and provides some improvement in overall fuel efficiency.

Furthermore, as noted above, whenever possible—that is, whenever the engine is started except when immediate full torque is required by the operator—a catalytic converter 64 is preheated to an effective working temperature of at least about 350° C. before starting the engine, to prevent even this relatively small emission of unburned fuel.

Thus, the primary consideration in selecting the torque of starting motor 21 is that it be capable of rotating the engine 40 at about 300-600 rpm for starting, and that it be capable of accepting at least about 30% of the engine's maximum torque output when operated as a generator, so that the engine can be efficiently employed when charging the battery bank during extended low-speed operation; the main consideration in specification of the torque of engine 40 is that it provides sufficient power for highway cruising while being operated at high efficiency, i.e., that its maximum power output be sufficent to cruise in a range of desired cruising speeds; and the principal consideration defining the power required of the traction motor 25 is that it be sufficiently powerful to provide adequate acceleration in combination with the engine 40 and starting motor 21. Stated differently, the total power available provided by all of these torque-producing components should be at least equal to and preferably exceeds the peak power provided by the internal combustion engines of conventional vehicles of similar intended use, both as measured at the wheels. Moreover, as set forth in the '970 patent, the total torque provided by motors 21 and 25 should be at least equal to that produced by engine 40, in order to provide adequate low-speed performance under motor alone, and without necessity of a variable-ratio transmission.

At the same time, motors 21 and 25 are also sized to be capable of recovering almost all of the vehicle's kinetic energy when operated as generators in the regenerative braking mode. A particularly high fraction of the vehicle's kinetic energy can be recovered during low-speed operation; as compared to high-speed operation, where air resistance and road friction consume a relatively large fraction of the total energy required, in low speed operation much energy is lost by conventional vehicles as neat released during braking.

Given the above considerations, the following are typical power specifications for the engine 40, starting motor 21 and traction motor 25 of a 3000 pound vehicle having performance approximately equivalent to that of a "mid-size" sedan of United States manufacture. It should be understood that in these specifications, reference is made to the rated power produced continuously by the engine, not to the rated peak power of the motors, as is generally conventional in the art. Further, the motors are specified assuming the direct-drive embodiment of FIG. 3; if the motors run at higher speeds, their ratings would be determined accordingly.

Engine 40: 40 to 50 horsepower at 6000 rpm

Starting motor 21: 10-15 horsepower at approximately 1500 rpm and higher speeds Traction motor 25: 50-75 horsepower from 1500 to 6000 rpm.

The same starting motor would be satisfactory for a larger, 4000 pound sedan, but the engine would typically provide 70-90 horsepower at 6000 rpm and the traction motor 75-100 horsepower.

In both cases, the total power available from the electric motors together should equal, and preferably exceeds, the maximum power available from the engine.

In the hybrid vehicle of the invention, which as noted does not require a complex, heavy, and costly variable-ratio transmission, these components would provide acceleration much superior to that of typical similarly-sized automobiles of United States manufacture, together with far better fuel economy and substantially reduced emission of pollutants. It will be apparent that these specifications may vary over relatively wide ranges depending on the intended use of the vehicle of the invention, and should not be construed to limit the scope of the invention.

As indicated above, in the preferred embodiment, both the starting and traction motors are AC induction motors, although other types may also be employed. These motors, and the inverter/chargers controlling them in response to control signals from the microprocessor (as discussed further below), should be chosen and operated such that the motors have torque output characteristics varying as a function of rpm as illustrated by curve A in FIG. 10. That is, the motors are operated by the inverter/chargers, in response to control signals from the microprocessor, so as produce constant torque up to a base speed C, typically 1500 rpm for a motor having a top speed of 6000 rpm, as employed in the direct-drive embodiment of FIG. 3, and should produce constant power at higher speeds; accordingly, the torque drops off at speeds above the base speed C, as shown. The ratio of the base to maximum speed, 4:1 in this example, can vary between about 3 to 1 and about 6 to 1. This torque output characteristic essentially allows the vehicle of the invention to provide quite acceptable performance, especially acceleration, without the weight, complexity and cost of a variable-ratio transmission.

By comparison, the series-wound DC motors conventionally used as automotive engine starting motors provide very high torque, but only at very low speeds; their torque output drops precipitously at higher speeds. Such conventional starter motors would be unsatisfactory in the present system.

Figure 10:
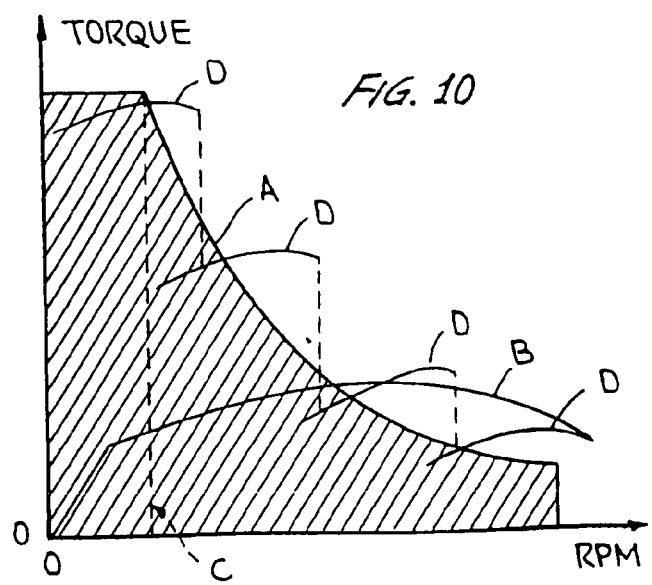
FIG. 10 illustrates the preferred torque versus speed characteristics of the electric starting and traction motors, and of the internal combustion engine.

FIG. 10 also shows the torque curve of a typical internal combustion engine at B; as noted, the torque is zero at zero rpm, so that a clutch allowing slippage is required to allow the engine to move the vehicle from rest. FIG. 10 shows at D typical curves for torque as measured at the wheels of a vehicle propelled by a typical internal combustion engine driving the vehicle through a four-speed transmission, used to provide additional torque at low speeds; the vertical spaces between sections of curve D represent changes in gear ratio, that is, the vehicle will be shifted to move between the sections of curve D. As shown by FIG. 10, the desired torque characteristics of the starting and traction motors discussed above allow the vehicle of the invention to provide low-speed performance comparable to or better than a conventional vehicle, while eliminating the necessity of a variable-ratio transmission. However, as discussed further below, it is within the invention of the present continuation-in-part application to extend the load-carrying capabilities of the hybrid vehicle of the invention by also providing a variable-ratio, e.g., two-speed, transmission, where not excluded by the appended claims. This should not be necessary with respect to passenger cars.

The ratio between the base speed and maximum speed of the motors as used according to the invention is thus comparable to the ratio between the lowest and highest gears of a conventional transmission; for passenger cars, the latter ratio is typically between 3 and 4:1, so that the engine's torque is relatively well matched to the road load over a reasonable range of road speeds.

As discussed above, while it is within the scope of the invention to operate the motors 21 and 25 and the internal combustion engine 40 at the same maximum speed, so that no gearing is required to couple these elements, it is presently preferred that at least traction motor 25 have a maximum speed substantially higher than that of the internal combustion engine 40; the output shaft of motor 25 can be connected to the road wheels by a chain-drive reduction unit, as indicated in FIG. 4. The maximum speed of the internal combustion engine is preferably limited to on the order of 6000 rpm to limit wear, noise and vibration, which increase with higher operating speeds, and because engines capable of higher-rpm operation tend to have narrow ranges of rpm within which they produce substantial torque; the latter characteristic would be undesirable in a vehicle not having a variable-ratio transmission and intended to cruise powered solely by the internal combustion engine, according to the invention.

By comparison, operating the motors 21 and 25 at maximum speeds of 9000-18,000 rpm allows them to be made smaller, lighter, and less costly; whether this advantage overcomes the added complexity of chain, gear, or belt drives, or other mechanical means allowing combination of torque from the motors with that from the engine, is a matter of engineering choice that may vary from one model of vehicle to the next. Both are accordingly within the present invention. If each of the torque-producing components (that is, engine 40 and starting and traction motors 21 and 25) is to be operated at the same speed, a maximum speed of approximately 6000 rpm is preferred, as this represents a good compromise between cost, weight, and size of the key components.

Figure 5:
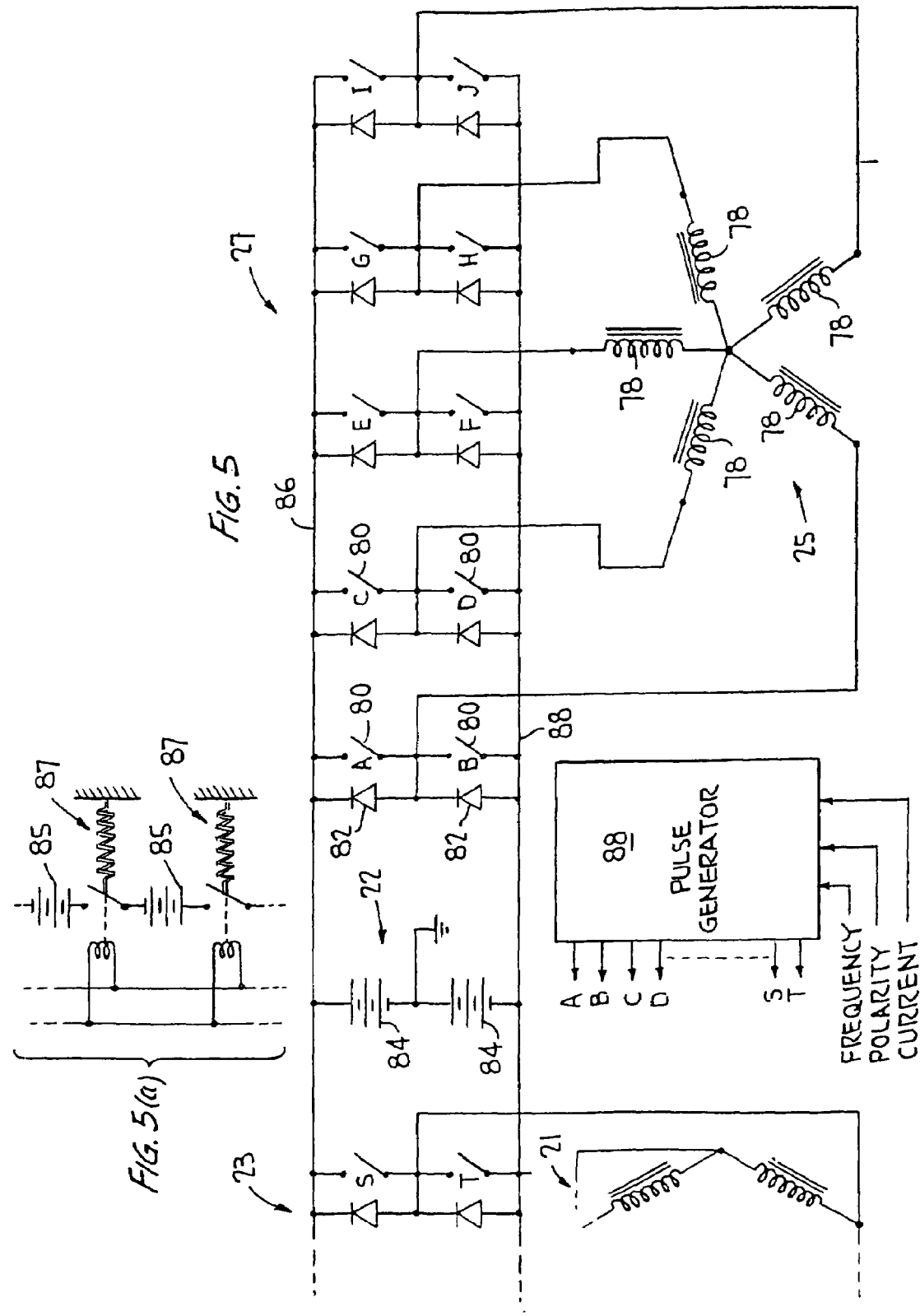
FIG. 5 shows a partial schematic diagram of the battery bank, inverter, and motor circuitry.

As discussed above, it is preferred that motors 21 and 25 have more than two poles, and be operated by current applied over more than three phases, so that failure of some components—such as the power semiconductors used in the inverter/charger units, as discussed below—can be tolerated without total failure of the vehicle. It is also desired that the battery bank be divided into two, with the vehicle chassis connected between them, halving the voltage between given components and the vehicle chassis, and thus simplifying their construction, insulation, and connection. FIG. 5 shows a partial schematic diagram of a circuit providing these attributes.

The functions of the inverter/chargers 23 and 27 (separate inverter/chargers being required to allow independent operation of motors 21 and 25) include control of motors 21 and 25 to operate as motors or as generators; operation of traction motor 25 in the opposite direction for reversing the vehicle; conversion of DC stored by the battery bank to AC for motor operation; and conversion of AC induced in the motors when operated as generators to DC for battery charging. Essentially similar functions were provided by the solid-state switching AC/DC converter 44 in the '970 patent; where not specified to the contrary, the discussion thereof is applicable to the inverter design shown in FIG. 5 hereof.

As illustrated in FIG. 5, traction motor 25 is embodied as a five-phase AC induction motor; starting motor 21, which is not fully illustrated, as indicated, can be but is not necessarily generally similar Other motor types, such as permanent magnet brushless DC motors or synchronous motors, might also be employed. The motors are operated as multiphase devices, having three phases or more, permitting employment of smaller and overall less costly semiconductors, and allowing operation even if some of the semiconductors fail. Use of motors operated at relatively high frequency, e.g., more than 60 Hz, also permits motors of a given power output to be smaller. As shown in FIG. 5, it is currently preferred that at least traction motor 25 be wired in the "wye" arrangement shown, rather than the known "delta" arrangement; it is found that certain undesirable harmonics are reduced by the "wye" arrangement. Both are well known in the art, and within the scope of the invention.

As illustrated in FIG. 5, each of the windings 78 of motor 25 is connected to a pair of semiconductor switching elements 80 collectively making up inverter/charger 27. Inverter/charger 27 is correspondingly configured as a set of ten power semiconductors 80 controlled by switching signals A through J provided by a pulse generator 88 responsive to frequency, polarity and current signals received from microprocessor 48 (FIGS. 3 and 4). Typical operating frequencies can be up to 200, 400 or 600 Hz; the transfer of power between the battery bank 22 and motors 21 and 25 is then controlled by pulse-width modulation, that is, by controlling the semiconductors 80 to conduct during portions of the power waveform, the duration of the conducting portions varying in accordance with the power required. Semiconductors 80 may be any type suitable for handling relatively high voltages and currents; satisfactory insulated-gate bipolar transistors (IGBTS) are currently available and are presently preferred. As conventional, each of the semiconductors 80 is paralleled by a freewheeling rectifier diode 82.

Design of the inverter/chargers 23 and 27 and of pulse generator 88 to provide suitable control signals A through T so that the inverter/chargers perform the functions listed above is within the skill of the art; again, see, for example, Bose, "Power Electronics and Variable Frequency Drives", IEEE, 1996.

The current drawn from the battery bank 22 during long-term operation of the traction and starting motor(s) to propel the vehicle should be limited to 30-50 amperes, to reduce the size of the conductors and other components required, as discussed in the '970 patent; these components are satisfactory to carry currents of up to 200 amperes, as may be encountered during full-power acceleration, as this condition will not persist for more than about 30 seconds.

As indicated, the battery bank 22 comprises two substantially similar battery assemblies 84; in one embodiment, each battery assembly will comprise eight 48-volt batteries, such that 384 volts is provided by each. The battery assemblies 84 are connected in series, so that 768 volts are provided across the circuit "rails" 86, 88. However, the vehicle chassis connection is taken from between the series-connected battery assemblies, so that only 384 volts is present between any given circuit component and the vehicle chassis; this "center-point-chassis" connection significantly reduces various insulation and heat-sinking requirements. More specifically, the conductors, connectors, relays, switches and like elements can be as approved by the National Electrical Manufacturers' Association (NEMA) for 600 volt service; such elements are widely available, and are much more easily employed and much less expensive than those needed for continuously carrying current at, for example, 300 volts and 300 amperes.

Preferably, as indicated by FIG. 5(*a*), illustrating a detail of a portion of one of the battery assemblies 84, the 48-volt batteries 85 are connected by normally-open relays 87, so that the batteries 85 are isolated from one another under fail-safe conditions; for example, if the vehicle is involved in an accident, power to the relays is cut off, so that the maximum open voltage anywhere in the vehicle is 48 volts, reducing the danger of fire. Similarly, the relays open when the vehicle's "ignition" is shut off by the operator.

The present continuation-in-part application adds to the above from the '817 application that an auxiliary 12-volt system may also be provided, as shown at 223 in FIG. 14, discussed further below. This would be a DC-to-DC converter, allowing the vehicle to provide "jumping" current to start other vehicles having conventional 12-volt electrical systems, and would also allow the vehicle of the invention to be jumpstarted similarly, if necessary. Provision of a 12-volt system also allows convenient employment of conventional automotive accessories, such as radios and the like. The 12-volt system could perhaps most conveniently be implemented by a separate semiconductor-implemented voltage conversion circuit, transforming the 48 volts from one of the batteries to 12 volts for jumping others, and providing the inverse 12 to 48 volt transformation as needed. It should also be understood that the individual batteries could be 42 volt units, conforming to the apparent trend toward 42 volt systems for new vehicles. Further preferably, the entire battery bank assembly, including the relays, is enclosed in a rugged container, significantly reducing the danger of electrical shock and the like.

Turning now to detailed discussion of the inventive control strategy according to which the hybrid vehicles of the invention are operated: as in the case of the hybrid vehicle system shown in the '970 patent, and as discussed in further detail below, the vehicle of the invention is operated in different modes depending on the torque required, the state of charge of the batteries, and other variables Throughout, the object is to operate the internal combustion engine only under circumstances providing a significant load, thus ensuring efficient operation. In the following, the relationships between these modes are illustrated using several different techniques, to ensure the reader's full understanding of various aspects of the vehicle control strategy; some of these are seen more clearly in one form of illustration than another.

Figure 6:
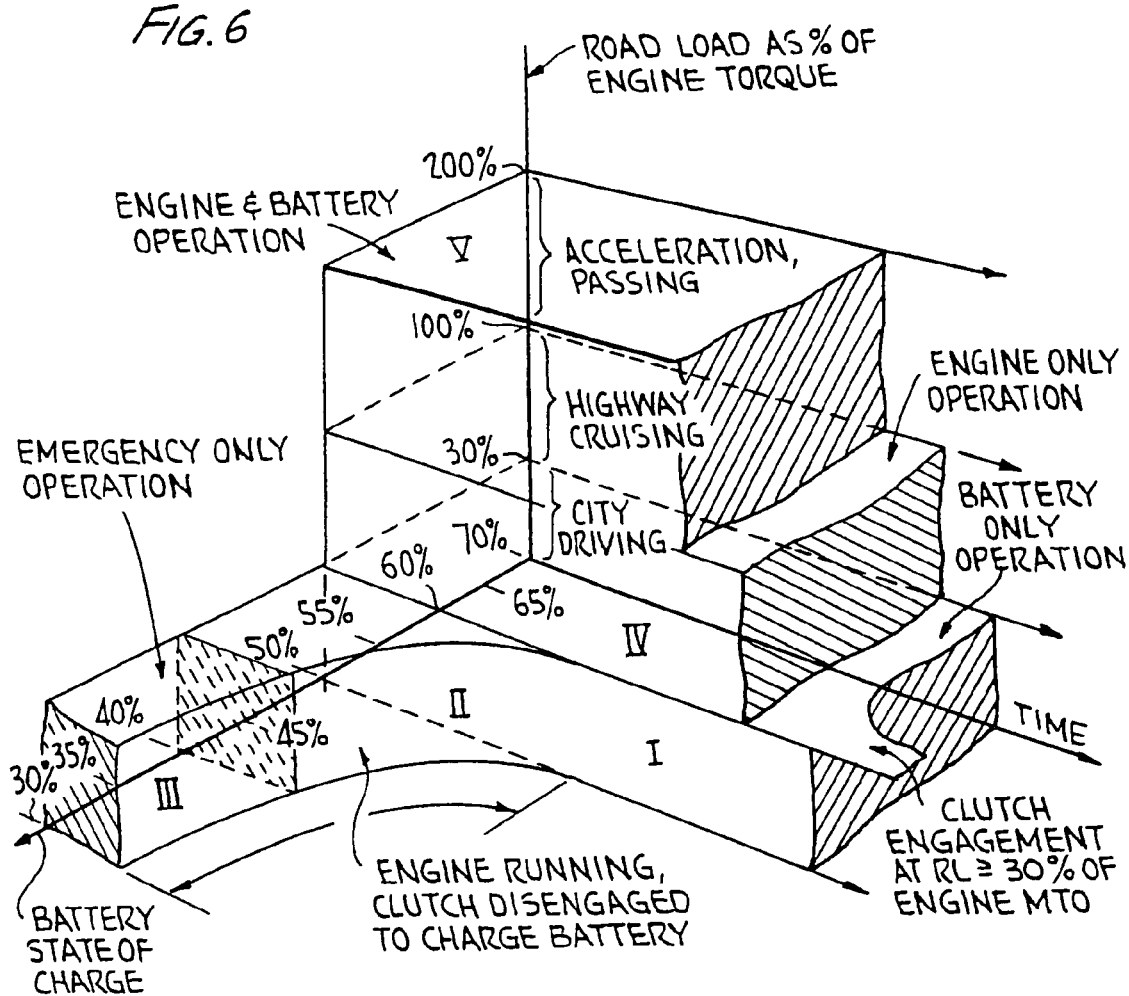
FIG. 6 is a diagram illustrating differing modes of vehicle powertrain operation, plotted on a three dimensional chart, illustrating that the mode of vehicle operation is a function of the state of charge of the battery bank, the instantaneous road load, and time.

FIG. 6 illustrates the several modes of vehicle operation with respect to the relationship between the vehicle's instantaneous torque requirements or "road load", the state of charge of the battery bank 22, and time, while FIG. 7 shows variation in, and the relationship between, road load, engine torque output, and the state of charge of the battery bank over time, that is, during an exemplary trip. FIGS. 8($a$)-($d$) show simplified schematic diagrams of the vehicle of the invention in its principal modes of operation, showing the flow of energy, in the form of electricity or combustible fuel, by dot-dash lines, and the flow of torque by dashed lines. Finally, FIG. 9 provides a high-level flowchart, showing the principal decision points in the algorithm according to which the microprocessor operates the various components of the hybrid vehicle drivetrain according to the invention, and FIGS. 9($a$)-($c$) show details and modifications thereof.

As noted, the preferred control strategy of the invention is illustrated in several different ways by FIGS. 6-9. The same specific numerical examples for various significant control variables, data items, and the like are used throughout for clarity. It will be understood that these examples would normally be expressed as ranges; although ranges are not used in the following, to simplify the discussion, it should be understood throughout that these numerical examples are exemplary only, and that the invention is not to be limited to the exact values of the control variables mentioned herein.

Further, it should be realized that certain of these control variables need not be restricted to specific numbers; in some cases, the decision points may be "fuzzy", i.e., so-called "fuzzy logic" may be employed, so that while the operating scheme retains its overall characteristics, the specific values against which the control variables and data items are tested in implementation of the control strategy according to the invention may vary from time to time. Examples of this practice—amounting in many circumstances to modifying certain specific values depending on other data items not discussed in detail, or by monitoring the vehicle's actual usage patterns over time—are given below.

Given these several different explanations of the relationship between the various operating modes of the vehicle of the invention, and specifically these different illustrations of the combinations of conditions in response to which the microprocessor controls mode selection, one of ordinary skill in the art would have no difficulty in implementing the invention.

As noted, during low-speed operation, such as in city traffic, the vehicle is operated as a simple electric car, where all torque is provided to road wheels 34 by traction motor 25 operating on electrical energy supplied from battery bank 22. This is referred to as "mode I" operation (see FIG. 6), and is illustrated in FIG. 8($a$). The same paths of energy and torque may also be employed under emergency circumstances, referred to as mode III operation, as discussed below.

While operating at low speeds, e.g., when the vehicle's torque requirements ("road load", or "RL") are less than 30% of the engine's maximum torque output ("MTO"), engine 40 is run only as needed to charge battery bank 22. Starting motor 21 is first used to start engine 40, and is then operated as a generator by appropriate operation of inverter/charger 23, so that charging current flows to battery bank 22. Accordingly, clutch 51 is disengaged, so that the road speed of the vehicle is independent of the speed of engine 40; engine 40 can thus be operated at relatively high output torque level, for fuel efficiency. This "mode II" operation is illustrated in FIG. 8($b$); as indicated, clutch 51 is disengaged, so that engine operation to charge battery bank 22 through starting motor 21, and propulsion of the vehicle by traction motor 25, are completely independent of one another.

As in the '970 patent, engine 40 is sized so that its maximum torque is sufficient to drive the vehicle in a range of desired cruising speeds; this requirement ensures that the engine is operated at high efficiency during normal highway cruising. Therefore, when a sensed increase in the road load (e.g., by a continued operator request for more power) indicates that the preferred operating mode is changing from low-speed to highway cruising operation, the microprocessor controls starting motor 21 by way of inverter/charger 23 to start engine 40. When engine 40 is essentially up to speed, clutch 51 is engaged, so that engine 40 drives road wheels 34 through the shafts of motors 21 and 25. When the operator releases pressure on the accelerator pedal, indicating that a desired cruising speed has been reached, traction motor 25 is accordingly depowered. The highway cruising mode is referred to as "mode IV" operation, and the flow of energy and torque are as illustrated in FIG. 8($c$).

If extra torque is needed during highway cruising, e.g., for acceleration or hill-climbing, either or both of motors 21 and 25 can be powered. This "mode V" operation is illustrated in FIG. 8($d$); energy flows from tank 38 to engine 40, and from battery bank 22 to traction motor 25, and possibly also to starting motor 21; torque flows from either or both motors and engine to wheels 34.

The flow of energy during battery charging is not illustrated per se in FIG. 8, but will be understood by those of skill in the art, and is further described below. For example, when the engine's instantaneous output torque exceeds the road load, the starter motor 21 is operated as a charger, supplying recharging current to the battery bank. Similarly, when the road load is trending downwardly or is negative, either the traction motor or the starter motor, or both, can be operated as a regenerative battery charger, supplying recharging current to the battery bank; braking can be accomplished similarly in response to an appropriate operator command.

FIG. 6, as indicated above, is a diagram illustrating differing modes of operation of the hybrid vehicle powertrain of the invention; the modes of operation, indicated by numerals I-V, are plotted on a three dimensional chart, illustrating that the mode of vehicle operation as controlled by microprocessor 48 is a function of the state of charge of the battery bank, the instantaneous road load, and time. FIG. 7, discussed below, further illustrates the inventive mode of vehicle operation.

FIG. 6 shows on one axis the state of battery charge extending from 70% at the origin outwardly to a minimum value shown of 30%. Normally the batteries are maintained at least 30% of full charge. Preferably, the battery bank is not charged to more than 70% of its theoretical full capacity; if a number of series-connected batteries were all charged to 100% of their nominal full charge, some would likely be overcharged due to manufacturing variation, local temperature variation and the like, which would significantly shorten their service life. Moreover, frequently recharging any individual battery to 100% of its theoretical capacity is deleterious to battery life as well.

The road load is shown in FIG. 6 on a second axis as varying from 0 at the origin to 200% of the engine's maximum torque output. (Negative road load, occurring during descents or under braking, is not shown in FIG. 6 due to the difficulty of illustration. This circumstance is discussed in connection with FIG. 7, below.) Time is shown on the third axis extending from an arbitrary point at the origin; that is, FIG. 6 shows the mode of the vehicle's operation over the next short period of time (on the order of 30-60 seconds) from a present instant at the origin. Stated differently, according to one aspect of the invention, the microprocessor 48 controls the vehicle's mode of operation at any given time in dependence on "recent history," as well as on the instantaneous road load and battery charge state.

More specifically, FIG. 6 shows that during city driving (mode I), defined in this example as driving where the vehicle's instantaneous torque requirements, or "road load", is up to 30% of the engine's maximum torque, the vehicle is operated as a "straight electric" car, the clutch being disengaged and energy from the battery bank 22 being used to power traction motor 25 to propel the vehicle, as long as the battery remains charged to between 50 and 70% of its full charge. If the charge falls to below a given value, which may vary over time as indicated by the curved line defining the extent of mode II, mode II is entered as indicated, the engine is started, and the starter motor 21 is operated as a generator to charge the battery to substantially full charge. As indicated in mode III, operation of the vehicle as an electric car may also be permitted when the battery falls to below 40% of full charge, for example, if there is a fault in the engine or charging system, but only on an emergency basis; such deep discharge is harmful to battery life.

During highway cruising, region IV, where the road load is between about 30% and 100% of the engine's maximum torque output, the engine alone is used to propel the vehicle. Accordingly, when the microprocessor detects that transition between regions I and IV is required (e.g., the microprocessor can effectively determine the road load by monitoring the response of the vehicle to the operator's command for more power), it causes the starting motor 21 to spin the engine 40 to relatively high speed; when a desired starting speed, typically 300 rpm, is reached, the electronic engine management unit 55 and electronic fuel injection unit 56 are controlled to fire the spark plugs and supply fuel, respectively, starting the engine. Thus starting the engine at relatively high rpm allows a near-stoichiometric fuel/air mixture to be used, as compared to the much richer mixtures normally used for starting. Emissions of unburned hydrocarbons are thus substantially reduced, and fuel economy improved.

When the speed of the engine output shaft substantially matches that of traction motor 25, clutch 51 is engaged; the power produced by motor 25 is reduced as that produced by engine 40 is increased, so that the transition between modes I and IV is smooth and essentially undetected by the operator. When the operator reduces pressure on the accelerator pedal 69, indicating that the desired cruising speed has been reached, power to motor 25 is reduced to zero.

If the operator then calls for additional power, e.g. for acceleration or passing, region V is entered; that is, when the microprocessor detects that the road load exceeds 100% of the engine's maximum torque output, it controls inverter/charger 27 so that energy flows from battery bank 22 to traction motor 25, providing torque propelling the vehicle in addition to that provided by engine 40. Starting motor 21 can similarly be controlled to provide propulsive torque.

As indicated above, during highway cruising, where the torque required to propel the vehicle varies as indicated by the operator's commands, the control system operates the engine at correspondingly varying torque output levels. The range of permissible engine torque output levels is constrained to the range in which the engine provides good fuel efficiency. Where the vehicle's instantaneous torque requirement exceeds the engine's maximum efficient torque output, e.g., during passing or hill-climbing, one or both of the electric motors are energized to provide additional torque; where the vehicle's torque requirements are less than the torque then being produced by the engine, e.g., during coasting, on downhills or during braking, the excess engine torque is used to charge the batteries. Regenerative charging may occur simultaneously, as torque from the engine and recovery of the vehicle's kinetic energy both drive one or both motors operated in generator mode. The rate of change of torque output by the engine may be controlled to reduce emissions, and in accordance with the state of charge of the battery bank. FIG. 7 illustrates these relationships.

Figures 7A, 7B, 7C:
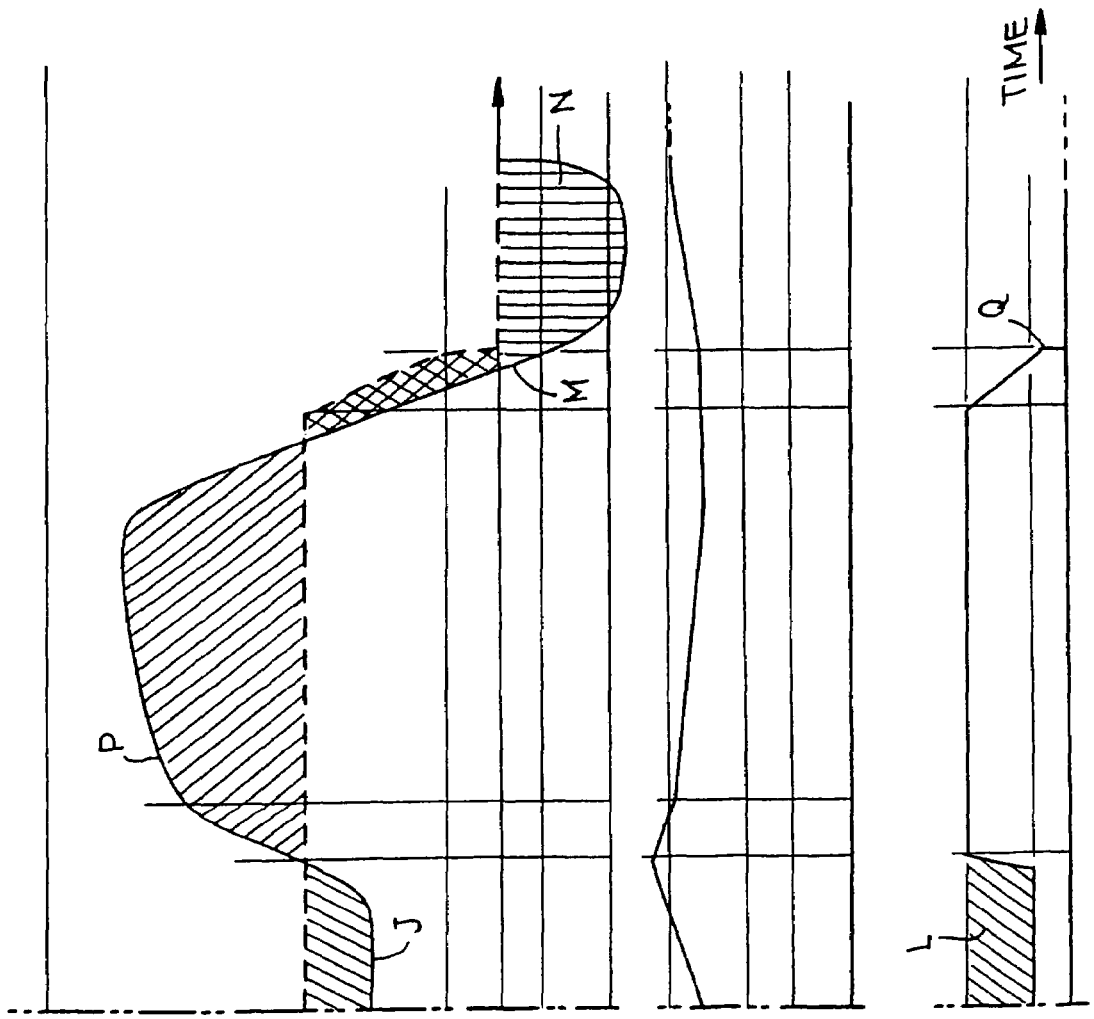
FIG. 7, comprising FIGS. 7(a)-(c), and extending over two sheets, is a timing diagram showing road load, engine torque output, the state of charge of the battery bank, and engine operation as functions of time, thus illustrating a typical control strategy employed during low-speed city driving, highway cruising, and extended high-load driving.
Figure 8A:
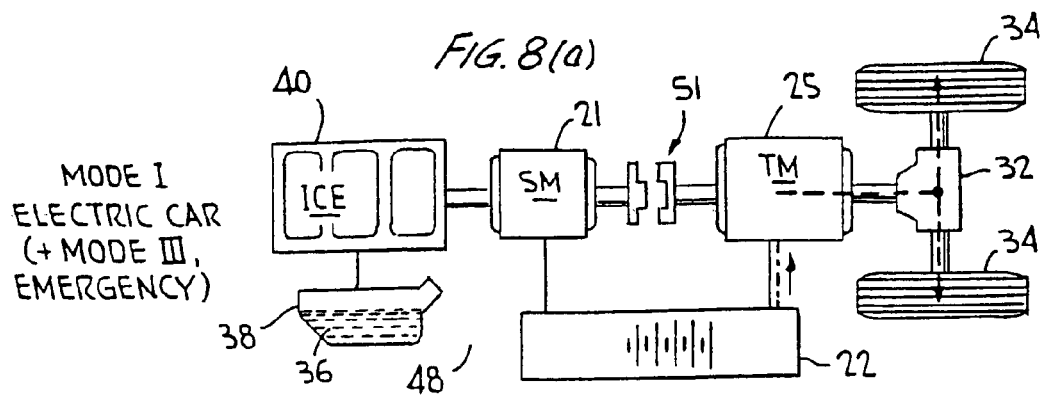
FIGS. 8(a)-(d), are diagrams indicating the flow of torque and of energy among the components of the hybrid powertrain of the invention, in various modes of operation.
Figure 8B:
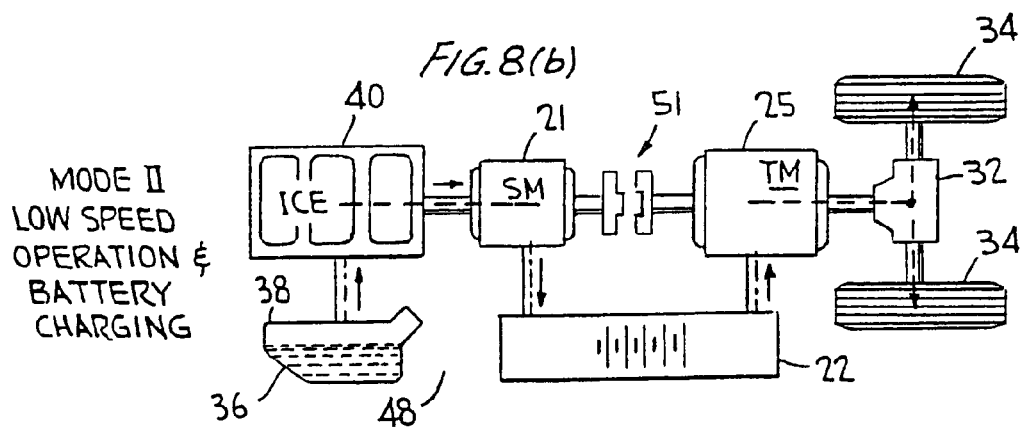
Figure 8C:
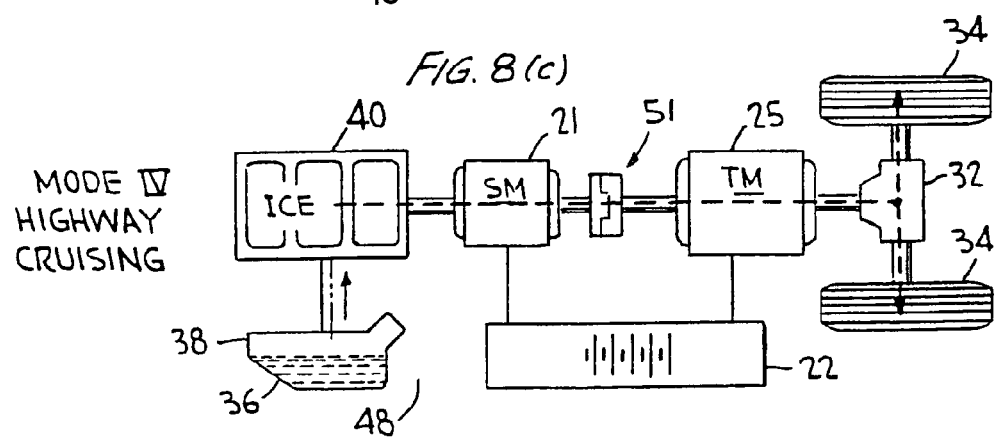
Figure 8D:
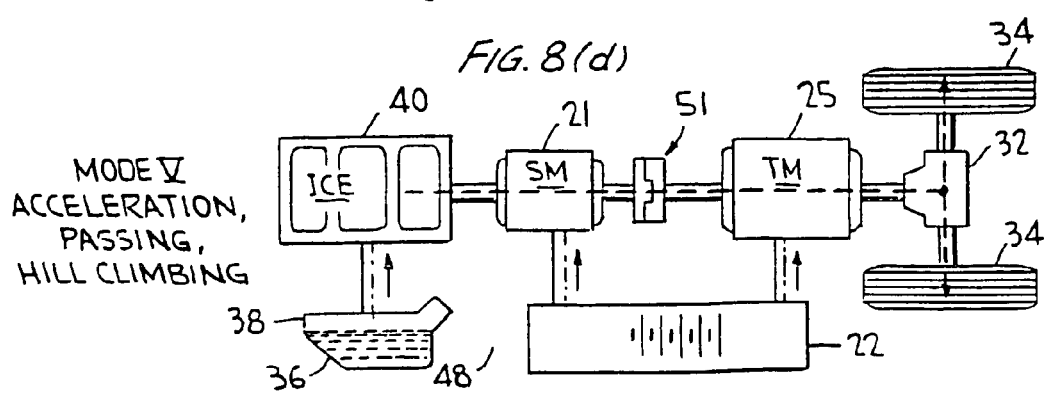

As mentioned above, FIG. 7, comprising FIGS. 7(a)-(c), and extending over two sheets, is a timing diagram showing the relationship between road load, engine torque output, the state of charge of the battery bank, and operation of the engine as these vary over time, during low-speed city driving, highway cruising, and extended high-load driving, thus further illustrating the control strategy employed according to the invention.

FIG. 7(a) shows the vehicle's instantaneous torque requirement, that is, the "road load", by a solid line, and the engine's instantaneous output torque by a dashed line, as these vary over time. (The engine's instantaneous output torque is repeated in FIG. 7(c), for clarity, and in order to clearly show certain additional aspects of the inventive control strategy.) The road load is expressed as a function of the engine's maximum torque output. Where the road load exceeds the engine's instantaneous output torque, the cross-hatched areas between these two lines represent torque provided by the traction and or starting motor(s); where the road load is less than the engine's instantaneous output torque, the cross-hatched areas represent charging of the batteries.

It will be appreciated that positive vehicle torque demands correspond to steady-state cruising, acceleration, hill-climbing, or the like, while negative vehicle torque requirements correspond to deceleration or descent. The engine's output torque is constrained to the range of efficient operation; as illustrated in FIGS. 7(a) and (c), this range is controlled to be between 30% and 100% of the engine's maximum torque output ("MTO"). As mentioned above, it will be appreciated that the 30% figure, as well as similar figures mentioned herein, may vary without departure from the scope of the invention.

In the example of vehicle operation shown in FIG. 7, initially the vehicle is operated only at road loads below 30% of MTO, that is, in traffic, as indicated at A. Accordingly, all the torque required is provided by the traction motor 25, and the state of charge of the battery bank 22 ("BSC"), as illustrated by FIG. 7(b), corresponds directly to the road load; when the road load is negative, BSC increases as the battery bank is charged by regenerative braking. (Changes in BSC are significantly exaggerated in order to clearly explain the events shown.)

At point B, the road load exceeds 30% of MTO for the first time on this particular trip. When this is detected by microprocessor 48, starting motor 21 spins the engine 40 at relatively high speed, and the catalytic converter 64 is preheated, causing a short drain on BSC, as shown at C. When the engine reaches the desired starting speed, e.g. 300 RPM, and the catalyst reaches a minimum effective operating temperature, e.g. at least about 350° C., the engine is started by supply of fuel and firing of its spark plugs, and the clutch is then engaged. As the engine is already rotating at relatively high speed, and will have been warmed by compression of air in its cylinders during the starting process, it begins to produce useful torque almost immediately, as indicated at D.

Thereafter, when the vehicle's torque requirement exceeds the instantaneous engine output torque, as at points E-G and P, one or both of the traction and starting motors 25 and 21 are powered to provide additional torque to the road wheels, that is, the vehicle is operated in mode V. While the road load RL remains within the engine's efficient operating range, e.g., while 30% MTO>RL>100% of MTO, the vehicle is operated in mode IV. During mode IV operation, if the engine's instantaneous torque output exceeds the vehicle's torque requirement, but the battery is relatively fully charged, as at point H, the engine's torque output is reduced to match the road load; when MTO exceeds the road load, and BSC falls below a predetermined level (see FIG. 7(b)), as at I and J, the excess torque available from engine 40 is used to charge the batteries, as indicated at K and L (FIG. 7(c)). When the vehicle's torque requirement is less than the minimum permissible engine torque output, as at M, the engine is again used to charge the batteries, and regenerative braking is also performed, further charging the batteries. If the batteries become substantially fully charged, e.g., during a long descent, as at N, the engine may be shut off entirely, as seen at Q in FIG. 7(c).

More particularly, during deceleration or "coast-down", the engine may be "motored", that is, driven by torque from the wheels, with the clutch engaged, but with at least the fuel supply shut off. In addition to using no fuel, this has the advantage that when the operator next requires torque, e.g., when reaching the point at the bottom of a hill, the engine is rotating and can be immediately restarted by supply of fuel. The exhaust valves might be opened during the motoring of the engine to reduce pumping losses.

The rate of change of the engine's torque output is limited, e.g., to 2% or less per revolution, as indicated by noting that the dashed line in FIG. 7(a), indicating the instantaneous engine output torque, lags the solid line indicating the vehicle's instantaneous torque requirement. Thus limiting the rate of change of engine output torque is preferred to limit undesirable emissions and improve fuel economy; that is, as the stoichiometric fuel/air ratio varies somewhat as the load changes, simply opening the throttle and causing additional fuel to be injected (as is typically practiced) upon the operator's depressing the accelerator pedal would result in non-stoichiometric, inefficient combustion. According to this aspect of the invention, the rate of change of engine torque is limited; this provides sufficient time for the essentially conventional electronic engine management and electronic fuel injection systems, which comprise a "lambda sensor" 47 (FIG. 3) for monitoring the oxygen content of the exhaust gas stream as an indication of stoichiometric combustion, to respond as the load changes, preserving stoichiometric combustion and reducing emission of unburned fuel.

The maximum permissible rate of change of engine output torque also may be varied in accordance with the state of charge of the batteries; more specifically, if the batteries are relatively discharged, it may be preferable to allow the engine's output torque to ramp-up more quickly than otherwise, in order to limit the amount of electrical power drawn from the batteries in response to an acceleration command. More generally, it is preferred to operate the engine so as to limit the amount of power drawn from the batteries, as there are unavoidable losses attendant on conversion of energy stored in the batteries to motor output torque, and during the corresponding recharging period.

As mentioned above, FIG. 9 is a high-level flowchart of the principal decision points in the control program used to control the mode of vehicle operation. Broadly speaking, the microprocessor tests sensed and calculated values for system variables, such as the vehicle's instantaneous torque requirement, i.e., the "road load" RL, the engine's instantaneous torque output ITO, both being expressed as a percentage of the engine's maximum torque output MTO, and the state of charge of the battery bank BSC, expressed as a percentage of its full charge, against setpoints, and uses the results of the comparisons to control the mode of vehicle operation.

As noted above, certain control decisions involved in the inventive control strategy illustrated in FIG. 9, and described therein as being determined in response to precise criteria (in order to clearly present the main features of the inventive operating strategy), may instead be usefully somewhat "fuzzy"; in the present application, this term is intended to indicate that the value of a setpoint (for example) may vary somewhat in response to recent history, or in response to monitored variables not discussed above. As mentioned above, it is also to be understood that the values given above for various numerical quantities may vary somewhat without departing from the invention. Specific alternatives are provided below for steps set forth in FIG. 9 that implement certain of these alternatives.

For example, in the example of the inventive control strategy discussed above, it is repeatedly stated that the transition from low-speed operation to highway cruising occurs when road load is equal to 30% of MTO. This setpoint, referred to in the appended claims as "SP", and sometimes hereinafter as the transition point (i.e., between operation in modes I and IV) is obviously arbitrary and can vary substantially, e.g., between 30-50% of MTO, within the scope of the invention.

It is also within the scope of the invention for the microprocessor to monitor the vehicle's operation over a period of days or weeks and reset this important setpoint in response to a repetitive driving pattern. For example, suppose the operator drives the same route from a congested suburban development to a workplace about the same time every morning; typically the road load might remain under 20% of MTO for the first few minutes of each day, then vary between 0 and 50% of MTO for another few minutes as the operator passes through a few traffic lights, and then suddenly increase to 150% of MTO as the operator accelerates onto a highway. It is within the skill of the art to program a microprocessor to record and analyze such daily patterns, and to adapt the control strategy accordingly. For example, in response to recognition of a regular pattern as above, the transition point might be adjusted to 60% of MTO; this would prevent repetitive engine starts as the road load exceeded 30% of MTO for a few hundred yards at a time, as might often occur in suburban traffic. Similarly, the engine starting routine might be initiated after the same total distance had been covered each day.

It is also within the scope of the invention to make the setpoint SP to which the road load is compared to control the transition from mode I to mode IV somewhat "fuzzy", so that SP may vary from one comparison of road load to MTO to the next depending on other variables. For example, as discussed above, if during low-speed operation the operator depresses the accelerator pedal rapidly, this can be treated as an indication that full power will shortly be required, and the engine-starting operation begun before the road load reaches any particular setpoint SP.

The value of the transition point may also vary in dependence on the mode of operation in effect when the road load equals a given setpoint SP. For example, suppose the setpoint at which the mode of operation is controlled to change from the low-speed mode to the highway cruising mode is normally set to 30% of MTO, as in the examples discussed above. If traffic conditions were such that the road load fluctuated around this value, and engine operation were controlled solely in response to road load, the engine would be repeatedly started and shut off as the road load exceeded 30% of MTO for a few hundred yards at a time, and then fell back below 30% of MTO, as might often occur in suburban traffic. Repeated restarts might also occur if the road load averaged over 30% of MTO but occasionally dropped below this value, as might occur in moderate-speed, flat-road cruising.

By monitoring the road load over time, and comparing it to different setpoints accordingly, much of this undesirable repetitive sequence of engine starting and shut-off can be eliminated. It might be preferable to commence mode IV operation upon the occurrence of differing conditions; for example, mode IV might be entered from mode I only after the road load exceeded a first, lower setpoint SP for an extended period of time, so that the engine would be run for extended low-speed cruising, but to start the engine immediately if the road load exceeded a higher setpoint SP2, e.g. 50% of MTO, as during acceleration to highway speed. Similarly, the engine might preferably be shut down only if the road load was less than a minimum setpoint for mode IV operation for an extended period of time. Thus providing "hysteresis" in the mode-switching determination would limit repetitive engine starts in certain types of driving. These limits could be further adjusted as the driving pattern became clear, i.e., as discerned by the microprocessor.

In a further refinement, the setpoint at which the engine is shut off as the road load droppped below the usual minimum value for mode IV operation could vary dependent on BSC; if the batteries were substantially fully charged, the engine might be shut off as road load dropped below 30% of MTO, but if their charge was lower the engine might be controlled to continue to run, even at a stop, i.e., zero road load, to charge the batteries. Of course, the clutch would still have to be disengaged at when the road load fell below 20-30% of MTO, in order that the engine could run at an efficient speed for production of torque.

FIG. 9 thus shows the main decision points of the control program run by the microprocessor, with the transition point between mode I, low-speed operation, and mode IV highway cruising, set at a road load equal to 30% of MTO. Examples are then given for some of the various options discussed above, by substituting various of the decision points with alternatives indicated below. Other optional points not specifically shown but discussed herein are within the scope of the invention.

The control program is entered at step 100, where the microprocessor determines whether the road load RL is less than 30% of MTO. If the answer is yes ("Y"), the clutch is disengaged if necessary as indicated at steps 103 and 105. The state of charge of the battery bank BSC is then tested at step 110; if BSC is between 50 and 70% of full charge, the vehicle can operate for some time as a straight electric vehicle, and mode I is accordingly entered, as indicated at 115. A "mode I" loop is then established, including steps 100, 103, and 110; as long as all conditions tested in these steps remain stable, the vehicle continues to be operated in mode I.

However, if at step 110 it was determined that BSC was less than 50% of its maximum value ("N"), the engine should be run, if possible, to charge the battery bank, up to, for example, 75% of its maximum charge, as tested at step 120. If the engine is already running, as tested at step 125, the battery is charged as indicated at 130, and a stable "mode II" loop, as noted at 135, is established including steps 100, 103, 110, 120, 125, and 130. (Normal operation of step 110 would be bypassed or disabled in this mode to prevent battery charging from being stopped when BSC reaches 70%). If the engine is not running, an engine starting subroutine (shown separately, by FIG. 9(a), is entered, as indicated at step 140.

In the engine starting subroutine, beginning with the 'enter' block 141, the clutch is disengaged if necessary at steps 142-143, and the catalyst temperature is tested at 145, to determine whether it is at least about 350° C.; the catalyst is heated as necessary, as indicated at 150. When the catalyst is heated suitably, the engine is then spun by the starter motor until a desired starting speed is reached, as indicated by the loop including blocks 155 and 160. When the engine reaches its desired starting speed, it is started at step 165, by supply of fuel and firing of its spark plugs, concluding the engine starting subroutine as indicated by 'return' block 170. If the engine starting subroutine was entered from the mode II loop, as above, the battery bank may then be charged as indicated at 130.

If in performance of step 120 it appeared that BSC was less than 40%, which would only occur upon failure of the engine or charging system, step 175 may be performed; thus, if 30%<BSC<40%, the vehicle may be operated in mode III as an electric car, to provide emergency operation. However, this should be strictly limited to avoid deep discharge of the battery bank, tending to shorten its useful life. As indicated at 177, the vehicle is completely disabled if BSC falls below 30%.

If RL is determined to exceed 30% of MTO in step 100, the program goes to step 180, where the term 30%>RL>100% is evaluated; that is, the microprocessor determines whether the road load is appropriate for highway cruising in mode IV. If so, and if the engine is running, as tested at step 190, a stable loop including steps 180 and 190 is established; the system remains in mode IV, as indicated at 185, until the state of one of these tests changes.

If in step 190 it is determined that the engine is not running, the engine start subroutine, starting with step 140 as discussed above, is entered as indicated at 195; upon return, at 200, the clutch is engaged at 210, and the loop including steps 180 and 190 is entered.

As noted, in step 180 it is determined whether RL is between 30 and 100% of MTO; if not, it is determined in step 220 whether RL is greater than 100% of MTO. If so, mode V is entered, and the traction motor (and optionally the starting motor) is powered to provide additional torque propelling the vehicle, as indicated at 230. A loop including steps 220 and 230 is thus established, so that mode V remains stable until the state of the test performed in step 220 changes.

When in performance of step 220, it appears that RL is now less than 100% of MTO, it is then determined in step 215 whether RL is less than 30% of MTO. If so, the engine is shut off, as indicated at 240, and the program returns to step 100; if not, the program is returned to step 180.

It will be appreciated that according to the FIG. 9 flowchart, it is possible for the system to proceed directly from mode I to mode V, that is, from step 100 to step 220, if the road load rapidly increases from less than 30% of MTO to more than 100% of MTO. Permitting the operator to thus operate the system is an important safety feature, for example when fast acceleration from a stop is required to merge into highway traffic. In these circumstances the engine would not be running during initial operation in mode V, necessitating a significant drain on the battery bank and overdriving the traction motor. Accordingly, steps equivalent to steps 190, 195, and 210 (including the engine starting subroutine) are to be understood to follow step 220 and precede step 230. That is, in the event mode IV was effectively omitted in passing directly from mode I to mode V, the engine is started and the clutch engaged as soon as possible; these duplicate steps are not shown, for clarity.

In the above discussion of FIG. 9, it was assumed that the transition point between low-speed and highway operation is set so that the transition occurs when the road load is equal to 30% of MTO under all circumstances. However, as discussed above, it may be desirable to operate the system so that the vehicle goes from the low-speed mode I to the highway-cruising mode IV at a higher road load, e.g., 50% of MTO, than the road load at which the low-speed mode is reentered, e.g., when road load in mode IV falls to below 20%. This "hysteresis" of the mode switching point—for example, allowing the vehicle to accelerate in mode I up to road loads of up to 50% of MTO, but not shutting the engine off, ending mode IV operation, until road load falls below 20% of MTO—avoids excessive mode-switching during periods of fluctuating road load.

For example, in typical suburban traffic, one might commonly accelerate past 30% of MTO, to what might otherwise be a normal cruising speed, but stop again shortly thereafter; it would be inefficient to thus repetitively stop and restart the engine as the load fluctuates around 30%. Hysteresis might similarly be useful in avoiding needless mode switching in moderate-speed, flat road cruising in mode IV, when the road load might well occasionally drop below 30%; again, it would be inefficient to repeatedly shut off and restart the engine.

Thus providing differing mode switching points depending on the direction of the change in road load can be accomplished readily by monitoring the road load RL as a function of time, and taking appropriate control action. For example, if the system is maintained in mode I until RL exceeds the "normal" 30% of MTO mode switching point for a period of, for example, 30 seconds, and without exceeding 50% of MTO, the excessive mode switching otherwise likely to be encountered in suburban traffic can be largely avoided. FIG. 9(b) shows a step 100' replacing step 100 in FIG. 9 and implementing this "low-speed hysteresis". As indicated, the system remains in the low-speed mode I as long as RL is less than 30% of MTO, or unless RL exceeds 30% of MTO for more than 30 seconds, or exceeds 50% of MT0; if either of the latter conditions occurs, the program goes to step 180, initiating mode IV operation.

Similarly, hysteresis in mode IV cruising, in order to implement excessive mode shifting that might otherwise occur if the road load fluctuates around a fixed mode switching point, can be implemented by simply providing that the system remains in mode IV as long as RL remains between 30 and 100% of MTO, unless RL is less than RL for more than 30 seconds, or exceeds 100% of MTO. This can be implemented as shown in FIG. 9(c); a revised step 215' replaces step 215 of FIG. 9, and provides that, if the system is in mode IV, unless RL is less than 30% of MTO for more than 30 seconds, step 180 is re-entered, thus preserving the "mode IV loop"; when RL is less than 30% of MTO for more than 30 seconds, the engine is shut down, at step 240, control is passed to step 100, and mode I re-entered.

Numerous further modifications to the detailed control strategy of the invention as illustrated in FIGS. 6-9 will occur to those of skill in the art, and are within the scope of the invention. For example, it may be desirable to vary the operation of the system insofar as responsive to BSC in accordance with monitored variables indicative of battery temperature, ambient temperature, and the like; e.g., on a hot day it may be advisable to avoid charging the battery bank to more than 60% of full charge, as this may cause overheating. Further, as noted above the transition points between modes I, IV, and V in particular may vary in accordance with the operator's commands, so as to provide maximum vehicle responsiveness for safety and ease of consumer acceptance, and over periods of days or weeks, as the microprocessor builds up a detailed historical record of the vehicle's usage pattern, from which an optimized control strategy may be derived.

It may also be possible to provide the microprocessor with useful control information from the operator, without requiring the operator to understand the workings of the system in detail. For example, operators are now well-accustomed to set a "cruise control" when a desired cruising speed is reached; thereafter, existing engine management systems control the instantaneous engine torque output with respect to variation in the road load to maintain vehicle speed substantially constant. It would be a simple matter for the microprocessor to accept a desired cruising speed thus input by the operator, as indicated in FIG. 4. The operator would then be relieved of continuous throttle control, and the microprocessor would similarly control the instantaneous engine torque output with respect to variation in the road load to maintain vehicle speed substantially constant, both as conventional; however, according to the invention, the microprocessor would also reset the transition point so that the system would remain in cruising mode IV until the operator had indicated to the contrary, i.e., by exiting cruise mode.

As discussed above, according to a further embodiment of the invention, additional flexibility is provided to the hybrid vehicle as described above by providing a turbocharger 100, also controlled by the microprocessor 48 so as to be operated when useful in further improving vehicle efficiency and drivability and not at other times. Providing the "turbocharger-on-demand" allows the engine to function efficiently in different torque output ranges, as needed. Essentially, the turbocharger 100 is employed only when the vehicle's torque requirements, the "road load" as above, exceeds the engine's normally-aspirated maximum torque capacity for a relatively extended period T of time, for example, during extended high-speed driving, towing a trailer, or driving up a long hill. Where the road load exceeds the engine's maximum torque for a relatively short period less than T, the traction motor (and possibly also the starting motor) are used to provide additional torque, as in the '970 patent and above. According to a further aspect of the invention, the period T is controlled in response to the state of charge of the battery bank; when the battery bank is relatively depleted, the turbocharger is activated sooner than otherwise, so as to preserve the battery bank.

As is well known to those of skill in the art, a turbocharger 100 (see FIG. 11) typically comprises two turbine wheels 102 and 104 on a common shaft 106, referred to herein as the exhaust-side and air-side wheels respectively. The flow of exhaust gas from engine 40 causes exhaust-side wheel 102 to spin; air-side wheel 104 is driven by shaft 106, drawing air into the body of turbocharger 100 through air filter 110. Waste heat in the exhaust stream is thus effectively recovered by compressing the intake air, which is then ducted to the intake manifold 122 of engine 40. Additional fuel can be burned in the additional air thus provided, so that additional torque is produced. The compressed air may be cooled adiabatically by heat exchange with ambient air in intercooler 117 if desired, further improving thermal efficiency of engine 40.

In typical turbocharger operation, a "wastegate" 114 is provided to limit the exhaust pressure incident on exhaust-side wheel 102, thus limiting the speed of air-side wheel 104 and regulating the "boost" provided by the turbocharger. The waste gate may be spring-loaded to open at a fixed boost pressure (as typically provided to regulate the output of turbocharged racing engines) or may be controlled in a feedback loop using the pressure in the engine intake manifold as the control variable. See *Automotive Handbook*, *2nd Ed.*, Robert Bosch GmbH (1986), p. 356. Further, in conventional practice, the turbocharger is used at all times, and the engine's design is optimized accordingly. For example, turbocharged gasoline engines typically have compression ratios of 7 or 8 to 1, as compared to 9-11 to 1 for normally-aspirated engines. Neither practice is employed according to the present invention; the turbocharger is controlled by the microprocessor to operate only when needed, and the engine's compression ratio, and other design parameters, are selected based on design criteria relevant when operated in the normally-aspirated mode.

According to the present invention, the waste gate 114 is controlled by the microprocessor 48; except under circumstances when the extra power provided by turbocharging is needed, the waste gate 114 is open (as shown in FIG. 1), so that the engine exhaust essentially bypasses the turbocharger 100. A valve 120, also controlled by microprocessor 48, may also be provided in the duct connecting the air side of the turbocharger 100 and the intake manifold 122 of the engine, so that the engine 40 draws air through the turbocharger only when in use; a second air filter 124 is then also provided.

Commonly, turbocharging for automotive use is employed in order that relatively small-displacement engines will produce high horsepower at the upper end of their operating range; the other design parameters of such engines (e.g., camshaft profiles) are chosen similarly. Engines thus optimized for high-rpm horsepower produce reduced low-speed torque, that is, are "peaky" compared to normally-aspirated engines. A variable-ratio transmission is essential to obtain reasonable acceleration from low speeds. Stated differently, turbocharging as usually implemented for automotive use provides relatively high torque at the upper end of the engine's speed range, but relatively poor torque at lower speeds; such an engine would be unsuitable in practice of the present invention. Moreover, turbocharged engines typically suffer "turbo lag", that is, slow response to sudden increase in torque required. As discussed further below, this particular problem is overcome by use of the turbocharger in a hybrid vehicle according to the invention.

Those of skill in the art will recognize that turbocharged engines are also used in heavy-load road vehicle applications, such as trucks and the like, but these vehicles demand transmissions having 12, 16, or more ratios, so that the engine's narrow power peak can be matched to the load, and exhibit extremely poor acceleration, as well as excessive gear-changing and cost, all of which would be unacceptable to the ordinary motorist. Thus, normally-turbocharged engines, of both the low-speed truck type, or the high-speed automotive type, are not satisfactory in implementation of the present invention.

As also noted above, as conventionally employed, a turbocharger is used at all times. By comparison, according to the present invention, the turbocharger is controlled by the microprocessor 48 to be used only under specified driving conditions, allowing the engine to be operated efficiently in other modes.

Figure 12:
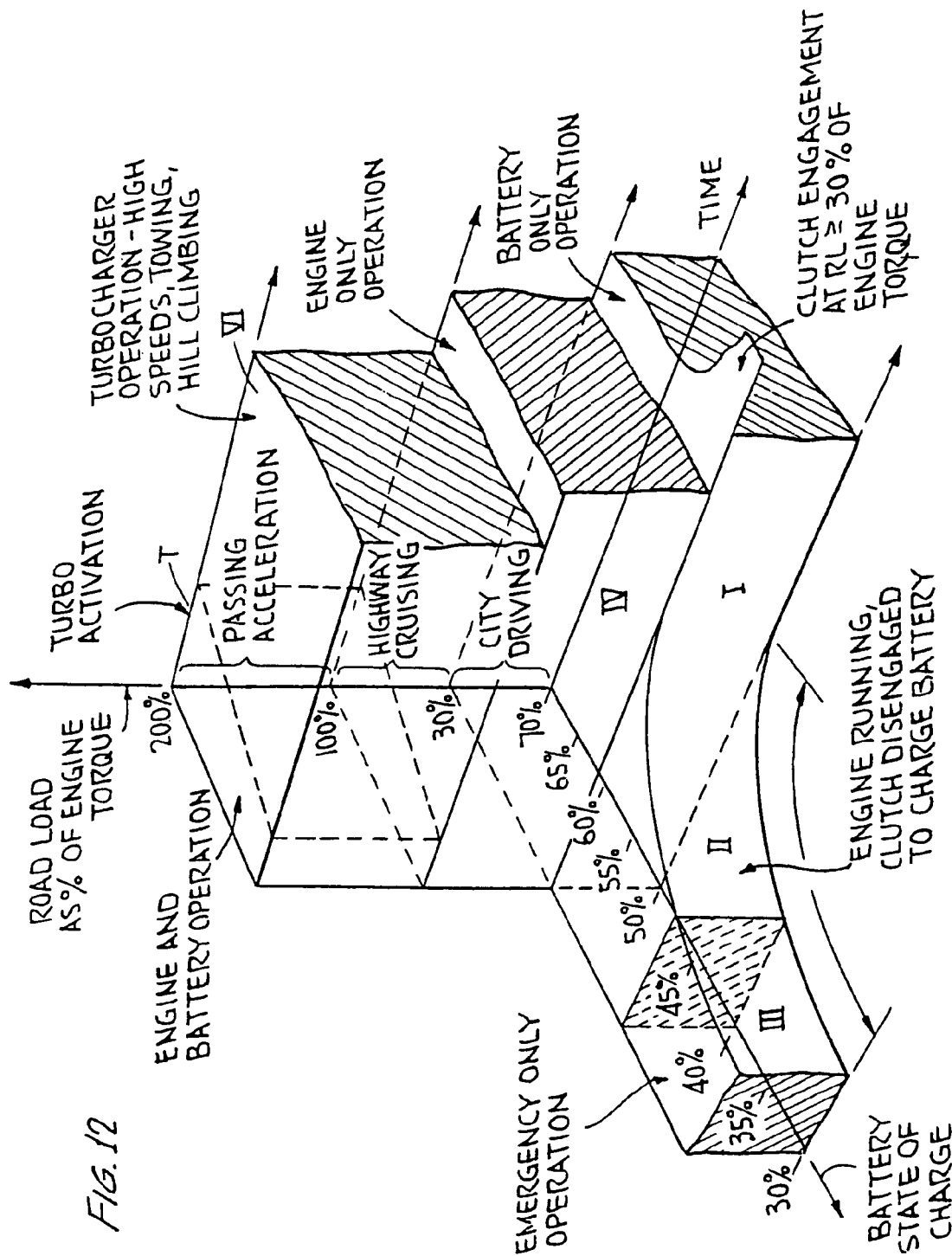
FIG. 12 is a three-dimensional diagram comparable to FIG. 6, showing the modes of operation of the turbocharged hybrid vehicle of FIG. 11.

FIG. 12, as indicated above, is a diagram comparable to FIG. 6. The differing modes of operation of the hybrid vehicle powertrain of the invention shown thereon are identical to those of the FIGS. 3 and 4 vehicle illustrated in FIG. 6, with the addition of turbocharged mode VI. Similarly, FIG. 13 is similar to FIG. 7, but illustrates the operation of a vehicle including a "turbocharger-on-demand" according to this aspect of the invention.

As shown in FIG. 12, according to this aspect of the present invention, a further region VI is provided, wherein the turbocharger 100 is activated by the microprocessor 48 when it detects that the road load has exceeded the engine's maximum output for more than a period of time T. Typically these events will occur when the vehicle is towing a trailer or is otherwise heavily laden, is climbing a long hill, or is operated at high speed for a long period of time.

More specifically, when the road load only exceeds the engine's maximum power for a short time, less than T, as during acceleration onto a highway or during passing, the traction motor is employed to provide the additional torque required, as described above. When the road load exceeds the engine's maximum power for a time greater than T, the turbocharger is energized by closing waste gate 114, and operating valve 120, if provided, to open the duct between the air-side of turbocharger 100 and the intake manifold 122 of engine 40. As the turbocharger "spools up" to its operating speed range, the maximum torque produced by engine 40 increases, and the torque produced by traction motor 25 is gradually reduced. This sequence of events is discussed further below in connection with FIG. 13.

FIG. 12 also shows, by the angle of the line separating regions V and VI with respect to the t=0 plane, that T can vary with the state of charge of the battery bank 22; when the battery bank is fully charged, T is longer—that is, energy from the battery bank is used to satisfy road load in excess of the engine's maximum torque output for a longer period—than when the battery bank is relatively less fully charged. The turbocharger can also be operated to provide additional engine power when full acceleration is needed, e.g., upon detection of the operator's aggressively pressing the accelerator pedal down completely.

As mentioned above, FIG. 13, comprising FIGS. 13(*a*)-(*c*), and extending over two sheets, is a timing diagram showing the relationship between road load, engine torque output, the state of charge of the battery bank, and operation of the engine in electric car, normally-aspirated and turbocharged modes as these vary over time, during low-speed city driving, highway cruising, and extended high-load driving, thus further illustrating the control strategy employed according to the invention. FIG. 13 is essentially identical to FIG. 7, with the addition of illustration of the operation of turbocharger 100 when the road load exceeds 100% of MTO for more than a period of time T.

Figures 13A, 13B, 13C:
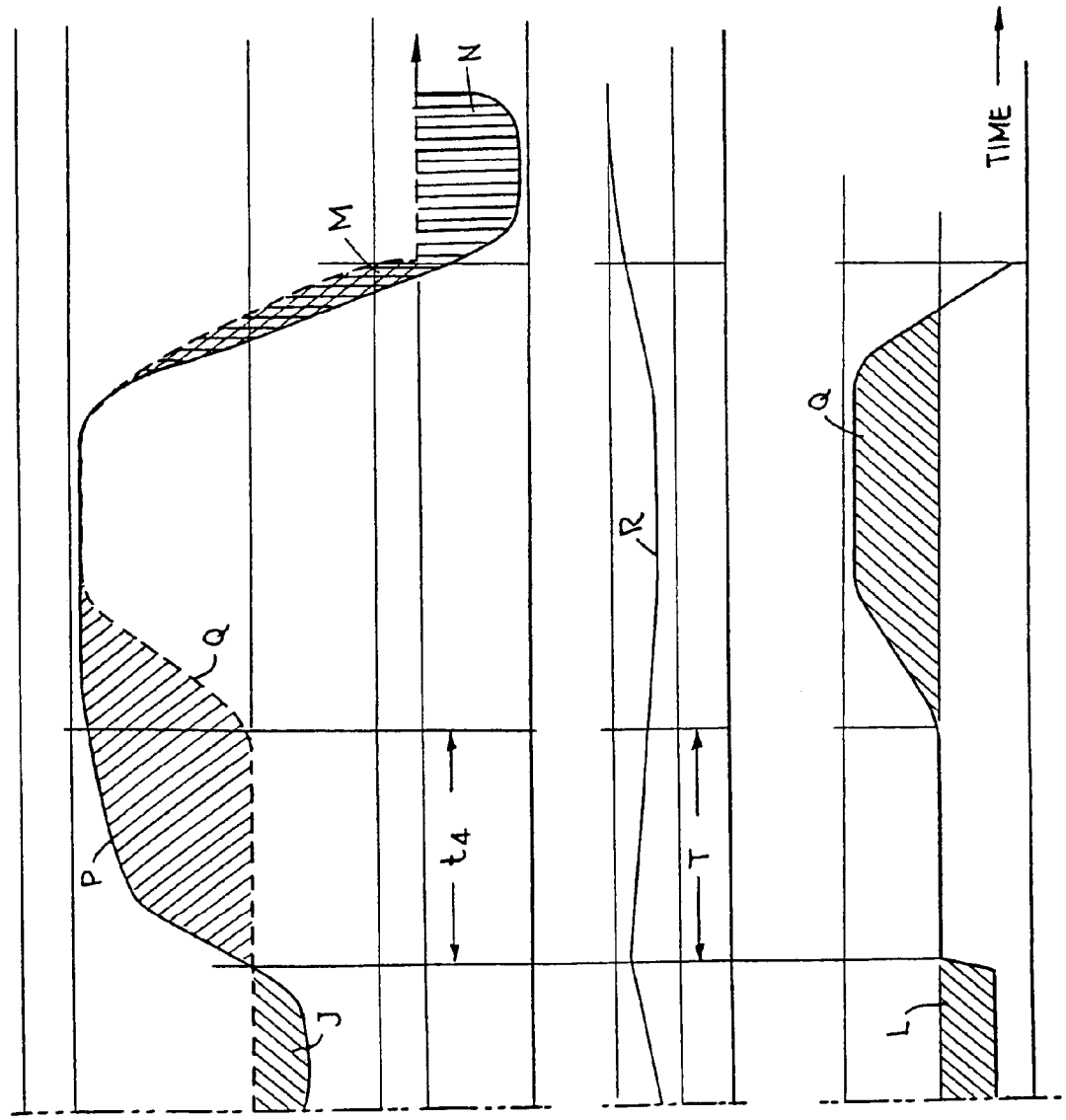
FIG. 13 is a timing diagram similar to FIG. 7, again comprising FIGS. 13(a)-(c), extending over two sheets, and illustrating typical operation of the turbocharged hybrid vehicle of FIG. 11.

Thus, as shown in FIG. 13(a) at $t_1$, $t_2$, $t_3$, and $t_4$, the microprocessor monitors the length of time t during which road load exceeds 100% of MTO, and compares t continually to a value T preferably varied in accordance with BSC; this is shown by the relative lengths of the arrows marked T on FIG. 13(b). While t<T, as at E, F, and G in FIG. 13(a), the excess torque required by the road load is provided by either or both of the traction and starting motors, drawing power from the battery bank. Note that the motors together are rated to be capable of continuously providing torque up to at least 100% of MTO, in accordance with the '970 patent; this allows the motors to provide adequate torque for good vehicle performance without a variable-ratio transmission. The motors may also be overdriven to provide more than their rated torque, well over 100% of MTO, for short periods of time, t<T, as at F; as noted, according to an important aspect of the invention, where torque in excess of MTO is needed for a longer period of time, t>T, the turbocharger is activated.

Thus, when $t_4 \geq T$, as at P, the microprocessor activates the turbocharger essentially as discussed above, that is, by closing waste gate 114 and valve 120 (if provided). As the turbocharger "spools up", which may take some seconds, and the boost it provides increases, as indicated at Q, the torque provided by the traction motor (and possibly also by the starting motor) is decreased accordingly, as indicated at R. The operator need not be aware of or take any action to initiate the turbocharger's activation; this is controlled by the microprocessor in response to monitoring the road load over time and the state of charge of the battery bank.

As discussed in connection with both FIGS. 12 and 13, T is preferably varied in accordance with BSC, so that the turbocharger is activated relatively sooner when BSC is relatively low; this limits the amount of energy drained from the battery during operation of the engine and the traction motor (or both motors) when the road load exceeds 100% of MTO, so that BSC does not fall to an undesirably low value.

Those of skill in the art will recognize that provision of a microprocessor-controlled turbocharger in a hybrid vehicle according to the invention permits operation in an additional mode, providing increased flexibility in the operational scheme provided; essentially the turbocharger provides a larger engine only when needed, at no cost in efficiency at other times. This is particularly significant in meeting the goals of the hybrid vehicle of the invention. More specifically, in addition to the operational advantages noted, provision of a "turbocharger-on-demand" in the hybrid vehicle according to the invention allows the engine to be smaller than otherwise, that is, to provide adequate highway performance in a vehicle of a given weight. As the starting motor/generator must be sized such that when it is operated to charge the batteries (e.g., in extended city driving) it loads the engine adequately that the engine is operated efficiently, employment of a smaller engine allows use of a smaller generator motor. For similar reasons, provision of a smaller engine allows it to be used to efficiently propel the vehicle in highway driving commencing at lower average speeds, resulting in turn in better fuel economy. By providing the "turbocharger-on-demand" according to the invention, all these advantages can be realized without sacrifice in the ultimate performance of the vehicle.

As noted above, one convenient implementation of the "turbocharger-on-demand" according to the invention is to operate the wastegate by a solenoid or the like controlled by the microprocessor, that is, to employ the wastegate as a bypass valve except when turbocharged operations are desired. A separate bypass valve might also or alternatively be provided. The wastegate is still preferably implemented as a spring-loaded relief valve, as illustrated in FIG. 11, and as generally conventional, to limit the "boost" provided. It is also within the invention to operate the waste gate to take intermediate positions, that is, between fully-open and closed positions, so as to limit the torque to limit wheelspin as detected, and to keep the turbocharger wheels spinning at an intermediate speed, to reduce the time necessary to "spool up" to full speed. It is also within the invention to adjust the wastegate responsive to an atmospheric-pressure signal provided by a suitable sensor 107 (FIG. 11) to ensure that adequate boost is provided at higher altitudes to ensure vehicle performance.

It will also be appreciated that a supercharger, that is, a positive-displacement air pump driven by the engine, could be used to implement the differing modes of vehicle operation illustrated in FIGS. 12 and 13; for example, the supercharger's operation could be controlled by the microprocessor by driving it through an electrically-controlled clutch, and this is accordingly within the invention. However, this would be less efficient than turbocharger operation, as turbocharging effectively recovers some of the waste heat in the engine exhaust by compressing the air reaching the inlet manifold, while supercharging consumes engine torque. Turbocharging, as discussed in detail, is accordingly preferred.

It will therefore be appreciated that by providing the internal-combustion engine of a hybrid vehicle with a turbocharger controlled by the vehicle's controller to operate only during extended periods of high torque requirements, a number of important advantages are realized, both as compared to a conventional system wherein the turbocharger is continually activated, or as compared to a large engine having the same maximum torque as the smaller turbocharged engine. As to the latter, as explained above all internal combustion engines are extremely inefficient, except when operated at near peak torque output; the larger the engine, the less frequently this will occur. As to the former, employing a conventionally-turbocharged engine, having the typical "peaky" torque curve, would not allow the engine to be used to propel the vehicle during highway driving without a variable-speed transmission. Instead, by providing a "turbocharger-on-demand", that is, which is only employed when it is actually needed, the vehicle of the invention can employ a small engine optimized for its main function of propelling the vehicle efficiently during highway cruising, and which is operable as a much larger engine when needed.

Other advantages provided by the invention include the fact that as the wastegate is normally open, the exhaust temperature will stay high, optimizing catalytic converter performance; as conventionally implemented, cooling of the exhaust gases as their energy is removed in spinning the turbocharger rotor can prevent good catalytic converter performance, especially at low speeds. Further, because the traction motor provides additional torque when needed, the "turbo lag" experienced in conventional turbocharged vehicles as the turbocharger "spools up" when the operator calls for more power is eliminated.

When constructed and operated according to the invention, that is, as a hybrid vehicle having an internal-combustion engine with a turbocharger controlled by the vehicle's controller to operate only during extended periods of high torque requirements, even a heavy vehicle having poor aerodynamic characteristics, such as a sport-utility vehicle or van, can offer good acceleration and hill-climbing and towing ability, while still providing extremely good fuel economy and extremely low emissions.

Another aspect of the invention concerns the method of sizing the various components of the system. Examples were given above of component selection for a vehicle not including a turbocharger according to this aspect of the present invention. Using as a further example a 5,500 pound "sport-utility vehicle" ("SUV") required to have reasonable acceleration and passing performance even while towing a 6,000 pound trailer, sizing of the components of the hybrid drive system of the present invention is preferably accomplished as follows:

1. An internal combustion engine is selected which has sufficient torque to drive the SUV without trailer at medium to high speed along a moderate grade. More specifically, a typical specification will require that the engine be sufficiently powerful to proceed up a 6% grade of unlimited extent at 50 mph. An engine of 100 hp at 6,000 maximum RPM is appropriate to meet this requirement for the SUV described above.

2. If a trailer is to be towed, a turbocharger, operated as above, is added. The turbocharger is sized so that when it is operated the engine provides up to 140 hp.

3. The charger motor is sized so as to provide an engine load equal to approximately 70% of the engine's maximum torque at a suitable engine speed. In this way fuel is used efficiently during battery charging, as discussed above. In the example, the charger motor is preferably an induction motor of 15-30 hp capacity, possibly configured as a "faceplate" or "pancake" type, essentially forming the flywheel of the engine. Such a motor can be operated as a generator requiring 20-22 hp, which is 70% of the maximum torque produced by the engine specified above when operated at 1200-1500 rpm; battery charging can thus be accomplished in a very fuel-efficient manner. This is essentially equivalent to specifying the starter/generator based on its ability to accept at least about 30% of the engine's maximum torque output (MTO, as above); in this way the engine is operated at a fuel-efficient power level during charging.

4. The traction motor is sized to provide adequate torque at zero speed to overcome the maximum grade specified from rest, with the starter motor assisting as needed. In the example the traction motor may be an induction motor of 100 hp, with a maximum speed of 16,000 rpm, and be connected to the drive wheels through a chain drive providing the appropriate reduction ratio. It will be appreciated that in this example the total torque available from the starting and traction motors combined exceeds that provided by the engine, in accordance with an aspect of the invention of the '970 patent.

5. The torque vs. speed profile of the traction motor is selected to allow city driving, in particular, to provide acceleration sufficient to conform to the Federal urban driving fuel mileage test ("FUDS"), without use of torque from the engine.

6. The battery capacity is then selected to provide sufficient cycle life, i.e., so as not to be overstressed by deep discharge over many repetitive driving cycles. In the example, an 800 v, 8.5 KAH battery pack is provided. The battery bank should be sized and arranged so that the maximum current to be absorbed with the starter/generator being driven at 30% of MTO is no more than 50 amperes.

7. Finally, the controller is provided with software to implement the control scheme described in detail above, that is, to use the traction motor as the only source of drive torque at low speed, to start the engine when the road load increases beyond a setpoint, to operate the turbocharger when the road load exceeds the engine's maximum torque for more than a prescribed time T, which may be varied in accordance with the state of charge of the batteries, and otherwise as described above. Essentially, the controller is operated so that the engine is only operated in a fuel-efficient range, e.g., driving a load at least equal to 30% of MTO.

Simulations show that vehicles configured as above will generally be capable of 80-100% improvement in fuel economy with respect to conventional vehicles of similar size, weight and performance characteristics.

Further Improvements According to the Continuation-in-Part

Component Specification

In addition to the methods of sizing the components of the powertrain and ancillary components set forth above, another method of doing so is generally as follows. As set forth above, it is desirable for a number of reasons to operate the system of the invention at relatively high voltages, e.g., 800 V or above, in the case of larger vehicles; this reduces the current flowing throughout the system, which allows use of plug-in rather than bolted connectors, allows use of inexpensive automatic disconnects, and reduces resistance heating losses.

More particularly, suppose that the "average maximum" current (e.g., defined as the maximum current flowing for more than, for example, thirty seconds; under most circumstances, the average current would be much less) is controlled to be 50 A. This allows use of inexpensive mass-produced plug-in connectors, and can be controlled by inexpensive mass-produced power electronic components, as needed to construct the inverter/charger units. These components can be designed to conduct up to approximately 200 A for up to thirty seconds, so that full acceleration can be provided for a time sufficient for the vehicle to reach essentially its maximum speed; according to this-aspect of the invention, the peak current can accordingly be set at, for example, 150 A, and the power electronics components then sized based on this value.

More particularly, it appears useful to size the components with respect to one another, in particular, the battery bank with respect to the traction motor(s), so that the peak current is no more than about 150 A, and so that under peak electrical loading (usually under acceleration) a ratio of at least 2.5:1 of the battery voltage to the peak current is exceeded.

For example, suppose it is desired to implement the invention with respect to a relatively heavy, e.g., 6000 pound, vehicle having target acceleration capabilities such that a 120 HP electric traction motor, typically drawing 100 kW, will be required. The battery bank for such a vehicle is sized to provide a nominal voltage of 830 V (i.e., when not under load); this will drop to approximately 650 V under load. The battery bank will thus be required to produce 153 A (=100 kW/650 V) during full acceleration, and the ratio of voltage to peak current is 3.92 (=650 V/153 A).

In another example, of a much lighter 3000 lb vehicle, a 80 HP, 60 kW motor might be sufficient. To keep the peak current to 115 A, a battery bank of 600 V nominal, 500 V under load would be required. The ratio is then 4.3 (=500V/115 A).

By comparison, insofar as known to the inventors, the Toyota "Prius" hybrid car now being marketed uses a 30 kW motor, and its battery bank provides approximately 230 V under load; the current required is thus approximately 120 A (=30 kW/230 V) and the ratio between the voltage under load and the peak current is only about 2 (=230V/120 A). The motor in the Prius is incapable of providing adequate acceleration without assistance; this in turn requires that an internal combustion engine (ICE) be provided, and be connected to the wheels by way of a variable-ratio plantary gearset. Operation of the ICE in the Prius is thus constrained by the vehicle's torque requirements, which unacceptably complicates its operation and renders it incapable of maximally efficient operation.

Applicants assert, therefore, that according to the invention the components of the hybrid vehicles of the invention are to be sized so that the ratio between battery voltage under load to peak current is at least about 2.5, and preferably is at least 3.5 to 4:1; this allows adequate acceleration from low speeds without use of torque from the ICE, which in turn allows elimination of any multiple-speed or variable-ratio transmission, and allows the ICE to be declutched from the wheels except when the ICE can be employed efficiently to propel the vehicle (or the ICE is being motored during deceleration or coast-down, as above). In turn this requirement leads to operation at higher voltages than typical, to keep both average maximum and peak currents low, which provides the very significant advantages mentioned above.

Range-Broadening Transmission

As mentioned above, in some embodiments of the invention as disclosed by the present continuation-in-part application, a two-speed transmission may be provided to broaden the range of utility of the vehicle. An exemplary hybrid vehicle powertrain providing this and further additional features is shown in FIG. 14; where not otherwise described, this embodiment of the invention includes features in common with those discussed above in connnection with the '970 patent and the '817 and '743 applications.

More specifically, according to one embodiment of this aspect of the invention of the present continuation-in-part application, the range of efficient use of the hybrid vehicle of the invention is further broadened by providing a two-speed "range shifting" transmission, akin to those presently provided on SUVs and the like to allow shifting into a "low range", so that when the load is expected to be heavy for extended period of time, for example, when a heavy trailer is to be towed, the transmission can be operated to select the low range. As indicated, such a transmission would normally only be operated once per trip, and is accordingly not equivalent to a conventional multiple-speed transmission which is operated to provide a sequence of effective overall gear ratios each time the vehicle is accelerated, as suggested in numerous prior art references dealing with hybrid vehicles. However, in another embodiment, the two-speed transmission thus provided could be operated conventionally, i.e., shifted automatically during acceleration, or in "kick-down" mode responsive to the operator's demand for acceleration.

Figure 14:
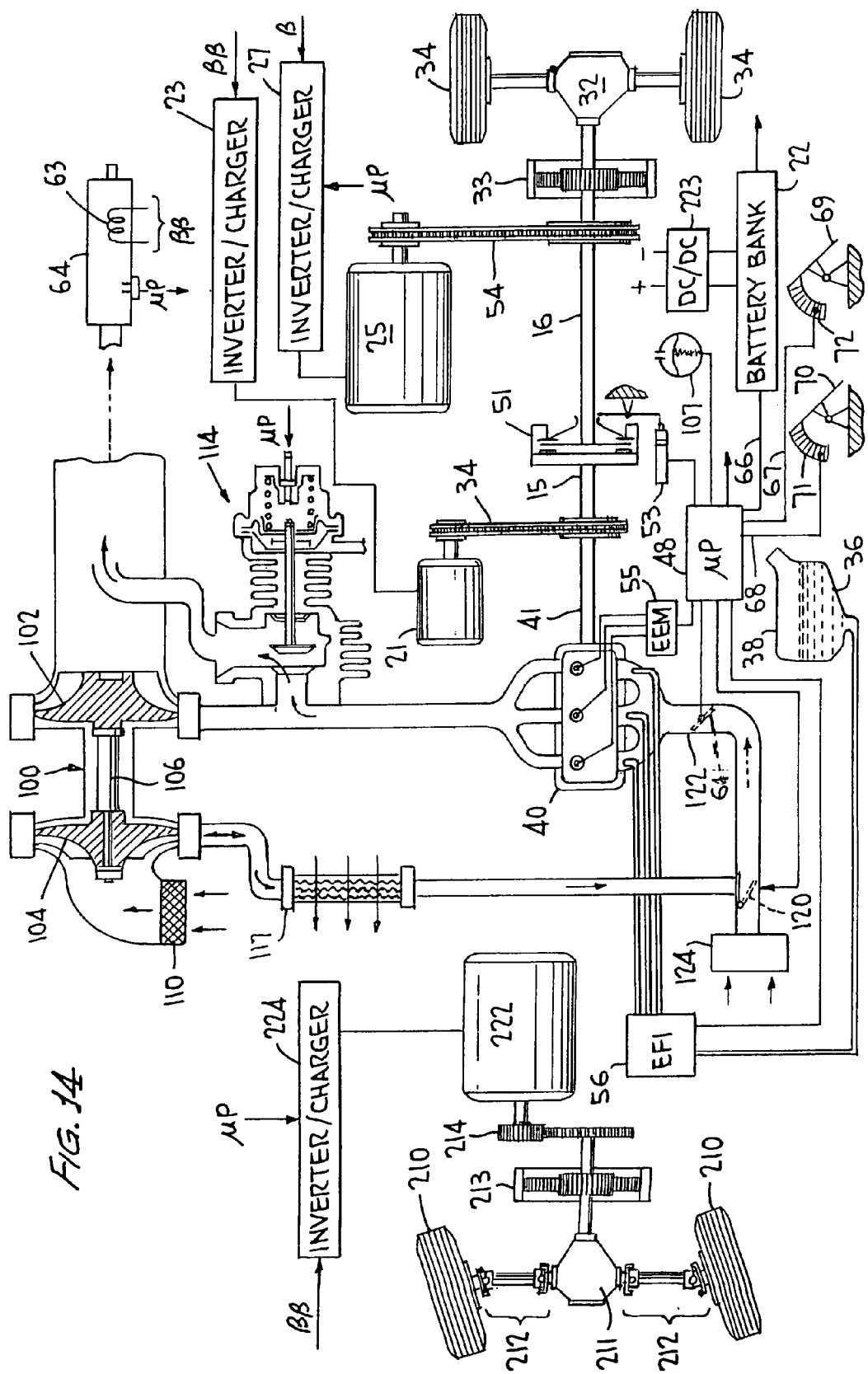
FIG. 14 is a schematic diagram similar to FIGS. 3 and 11, illustrating a further alternative embodiment of the hybrid vehicle powertrain according to the invention, wherein a second traction motor is connected to a second set of road wheels, providing a particularly convenient way of providing four-wheel drive.

In one implementation of this aspect of the invention, as shown in FIG. 14, a planetary gearbox 33 is disposed between the output shafts from the traction motor 25 and the combination of engine 40 and starting motor 21. Gearbox 33 may be controlled directly by the operator, as conventional, or by the microprocessor 48, in response to an operator command or responsive to sensing that the road load has exceeded some predetermined value, e.g. 125% of MTO, for an extended time, e.g. several minutes, or conventionally, i.e., shifted under ordinary acceleration. Typically the gearbox 33 will be locked, providing a direct drive, under ordinary circumstances; when a lower ratio is needed, for example, when towing a heavy trailer, the gearbox 33 may be controlled to yield a reduction of 0.5-0.8:1.

FIG. 14 also shows a second traction motor 222 driving a second set of road wheels 210 through a second differential 211. This is a convenient way of providing a "four-wheel drive" hybrid vehicle, which avoids the fore-and-aft driveshaft and third differential needed by conventional four-wheel drive vehicles. In this embodiment, road wheels 210 are configured as the steering wheels of the vehicle; accordingly halfshaft assemblies 212 incorporating universal joints are employed allowing wheels 210 to pivot, as illustrated. Traction motor 222 is connected to battery bank ("BB" in FIGS. 14 and 15) via a further inverter/charger 224, controlled by microprocessor 48 essentially similarly to traction motor 25. As noted above, a DC-to-DC converter 223 may be provided to allow the vehicle of the invention to be connected to vehicles having conventional 12 volt electrical systems for emergency starting purposes, and to provide 12 VDC for operation of conventional accessories.

Provision of separate traction motors 222 and 25 with respect to the corresponding pairs of road wheels 210 and 34 has several advantages with respect to conventional vehicles; as noted above, the fore-and-aft driveshaft and third differential normally required are eliminated, freeing substantial space normally required by these components. Further, "traction control"—that is, control of the amount of torque directed to each pair of wheels responsive to the traction conditions, which is useful in driving in snow or mud, or on wet or icy pavement—is conveniently accomplished by the microprocessor, simply by monitoring the wheels' response to given amounts of current and reducing the current to spinning wheels.

As shown by FIG. 14, vehicles according to the invention provided with two traction motors and having a planetary gearbox 33 between one traction motor and its corresponding road wheels may have a similar gearbox 213 between the second traction motor 222 and its wheels; however, this second gearbox 213 is not expected to be commonly required. Similarly, second traction motor 222 can be configured as a high-RPM unit, with its output shaft connected to the road wheels through reduction gears 214. In this implementation starter motor/generator 21 is also shown connected to the road wheels through a reduction device 34, illustrated as a chain drive; as indicated above, providing a mechanical reduction between the various motors 21, 25, and 222 and the respective road wheels is desirable in order that the motors can be selected and optimized to operate at higher speeds than engine 40.

Another possibility not shown specifically by FIG. 14, but within the scope of the invention, is to provide a "torque converter" of essentially conventional design, preferably fitted with a "lock-up" clutch, between the traction motor(s) and the corresponding wheels. As is well known, torque converters are commonly employed as part of automatic transmissions for passenger cars; the torque converter multiplies the input torque at low speeds. Such a torque converter would provide increased acceleration from rest. However, a similar effect can be obtained more simply by overdriving the traction motor(s) beyond their rated power for the first few seconds of acceleration.

Braking System

Numerous patents, including the '970 patent discussed above, recognize that one advantage of hybrid vehicles is that by appropriate control of electric motor/generators connected to the road wheels, a substantial fraction of the energy lost by conventional vehicles to friction can be recovered through regenerative braking, that is, by converting the vehicle's kinetic energy to stored battery power by using torque available at the road wheels to drive the motor(s) in generator mode, and storing the resulting electrical energy in the battery bank for use later. It is commonly estimated that most of the energy expended in accelerating the vehicle in city driving can be recovered in this way, since irrecoverable losses due to air resistance and rolling resistance contribute relatively little to the vehicle's energy demands at low speeds; by comparison, less of the energy expended to drive the vehicle at highway speeds can thus be recovered, although regenerative braking is nonetheless desirable.

More particularly, it is known to operate the motor/generator and cooperating inverter/charger electronics of hybrid vehicles so that electrical power is generated and stored in the battery bank when the operator desires to slow the vehicle. Accordingly "regenerative braking" per se is known. It is generally also apparent to those of skill in the art that a conventional mechanical braking system must also be provided, both for safety in the event of a failure in the regenerative braking system and to provide braking in the event the battery bank is fully charged; that is, it is important to avoid overcharging the battery bank in order to maximize its useful life. See Boll U.S. Pat. No. 5,788,597 and Frank U.S. Pat. No. 5,842,534. Similarly, mechanical braking is also needed when regenerative braking is not possible, e.g., at a stop. However, the art known to the inventors does not address all the concerns relevant to provision of a braking system of a hybrid vehicle, and to do so is another object of the present invention. See, e.g., Mikami et al U.S. Pat. No. 5,839,533, which suggests employment of engine braking (i.e., retardation of the vehicle using torque due to compression of air in the engine, and friction therein) as well as regenerative braking. The choice between the two is apparently to be made by the operator, at least in part responsive to the battery's state of charge. This would be far too complex for general acceptance.

The disclosure of the Boll patent itself is directed to optimizing the use of regenerative, engine, and mechanical braking. Boll also recognizes the desirability of maintaining a consistent brake pedal "feel" in the various brake modes.

German patent application DT 19 05 641 B2 to Strifler discloses a combined regenerative and mechanical braking system for an electric vehicle, wherein regenerative braking is effected upon the operator's first operating a brake lever, and mechanical braking is further effected upon reaching the maximum regenerative braking effect. If the battery cannot accept further charge, the mechanical braking is triggered relatively earlier, so that the operator experiences substantially the same pedal "feel" regardless whether regenerative or mechanical-braking is being implemented.

The present invention also recognizes that providing proper brake "feel" to the operator is important to provision of a satisfactory vehicle, but differs substantially from the teachings of the art, and the Boll and Strifler references in particular, in the type of pedal feel preferred.

More particularly, it will be appreciated that typical vehicle mechanical brake systems provide a relatively linear relationship between the force exerted on the brake pedal and the retarding force exerted on the wheels by the brakes. It is essential that this relatively linear relationship be provided by the brake system of any hybrid vehicle, so that the operator can smoothly and controllably brake the vehicle as desired.

Providing a relatively linear relationship between the force exerted on the brake pedal and the retarding force exerted on the tires by the brakes is substantially straightforward in the case of conventional mechanical braking systems. It is much more complicated in the case of a brake system incorporating regenerative braking as described above, since such a system must provide a linear relationship between the force exerted on the brake pedal and the retarding force exerted on the tires by the brakes and motor/generator(s) under all circumstances. The problem is particularly complicated during transitions from one braking regime to another. For example, if regenerative braking is used to commence deceleration but hydraulic braking must take over, e.g., if the battery bank's state of charge becomes full during a long descent, or if a leisurely stop suddenly becomes abrupt, the braking regime must change smoothly and controllably. Regenerative braking is also not available when the vehicle is moving very slowly or is at rest, and mechanical brakes must be available under these circumstances.

In addition to maintenance of the linear relationship, it is deemed preferable by the present inventors that the operator be made aware by a change in the "feel" of the brake pedal that regenerative braking is not available, typically due to the battery bank's state of charge becoming full. As noted, this is contrary to the teachings of the Boll patent and the Strifler German application. More specifically, it is considered desirable by the inventors that the brake pedal resist depression by the operator to a degree proportional to the amount of regenerative braking actually being effected at all times.

Finally, it will be appreciated that the engine manifold vacuum as conventionally used to produce "power braking", i.e., servo assistance, is not available to a hybrid vehicle if the engine is not running; some other source of power for servo assistance is required in order that brake effort is not unacceptably high.

Figure 15:
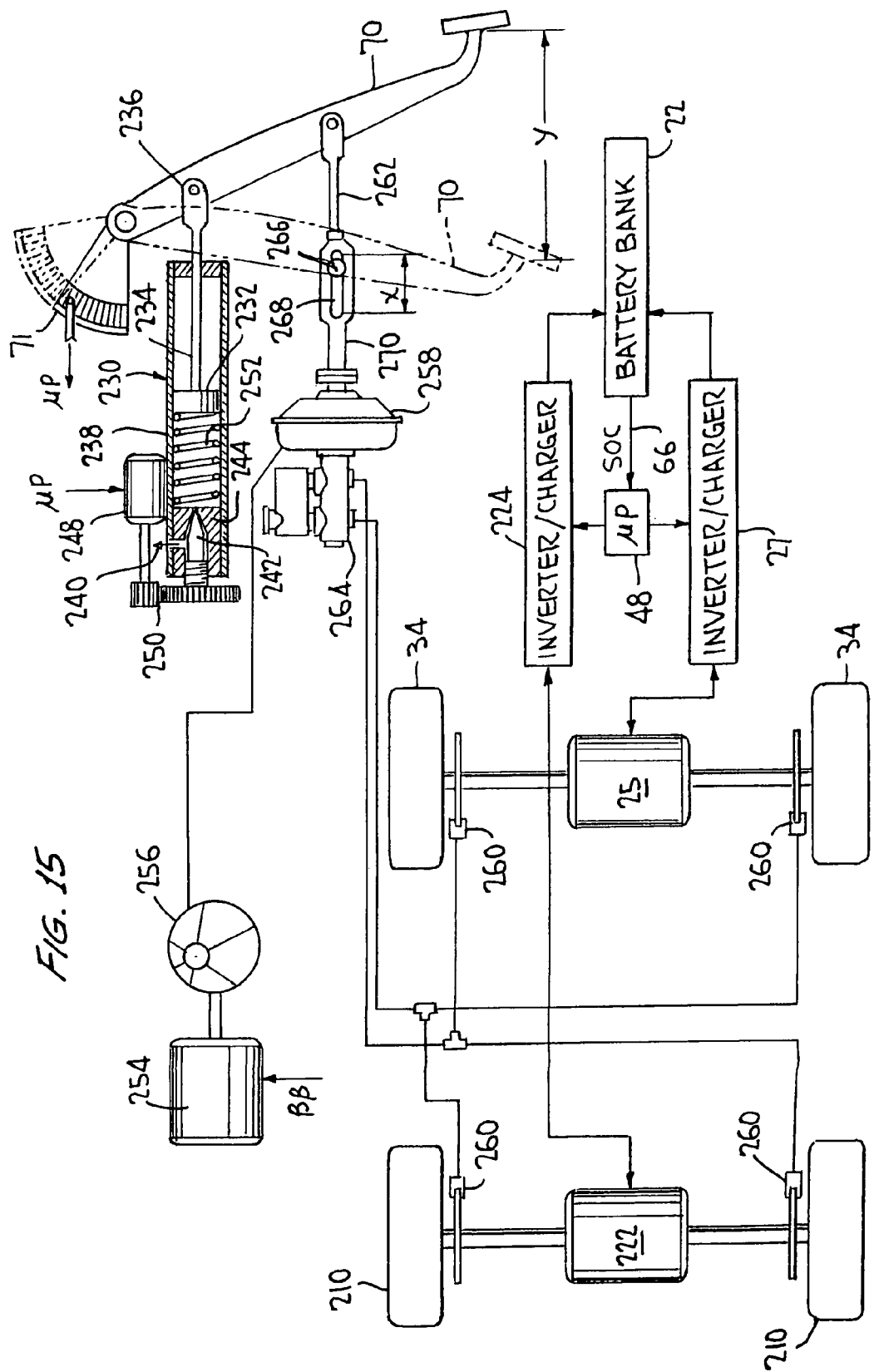
FIG. 15 is a schematic diagram of the preferred brake system of a hybrid vehicle according to the invention.

FIG. 15 shows schematically the principal components of a brake system for a hybrid vehicle that addresses the concerns above. Where common reference numerals are employed, the components are common with those shown in other Figures, while components not important to understanding of the braking system are omitted for simplicity. Thus, FIG. 15 shows traction motors 222 and 25 connected directly to the respective road wheels 210 and 34 respectively, omitting the other components discussed above. (In vehicles where a single traction motor drives a single pair of wheels, the improvements described herein would be provided as to these, while a four-wheel hydraulic braking system would also be provided.) As also discussed above, motors 222 and 25 are connected to battery bank 22 through respective inverter/chargers 224 and 27. Inverter/chargers 224 and 27 are controlled by microprocessor 48 to operate so that the motors can draw power from battery bank 22 and impart torque to the respective wheels to propel the vehicle in the appropriate modes of vehicle operation; during regenerative braking, inverter/chargers 224 and 27 are controlled so that the motors absorb torque from the wheels, slowing the vehicle, and storing the power thus generated in the battery bank 22.

Control of the inverter/chargers and motors to absorb a desired amount of torque from the wheels in response to a braking command from microprocessor 48 is considered to be within the skill of the art. The command itself may be determined by microprocessor 48 responsive to the degree to which brake pedal 70 is depressed, as measured by a potentiometer or similar device, indicated at 71. However, according to the invention, as above, a device is provided which varies the "feel" of the pedal (essentially its resistance to being depressed by the driver) responsive to the degree regenerative braking is in fact being implemented, thereby providing tactile feedback to the driver enabling smooth deceleration and, when appropriate, also providing an indication that regenerative braking is not available.

In the implementation of the invention shown, controllable resistance to the movement of brake pedal 70 is provided by connecting it to a microprocessor-controlled pneumatic cylinder assembly 230. A piston 232 fitting within a pneumatic cylinder 238 is driven by a connecting rod 234 attached to pedal 70 by a clevis 236. As the pedal is depressed, moving from right to left in FIG. 15, i.e., from the position shown in full to that shown in dotted lines, piston 232 expels air from the interior of cylinder 238 via vent 240. The rate at which air is expelled in response to any given pedal pressure is controlled by the spacing of a needle valve 242 from a seat 244; the needle valve 242 is moved closer to its seat 244 to increase the resistance to airflow, or moved away from seat 244 to reduce the resistance. The spacing is controlled by microprocessor 48 in order to vary the feel of the brake pedal 70; in the implementation shown, the needle valve 242 is threaded into the body in which valve seat 244 is formed, and the spacing is controlled by the microprocessor 48 by commands sent to a motor 248 rotating the needle valve 242 through a pair of gears 250. A spring 252 may be provided to return the pedal to its initial position. Thus, for example, if regenerative braking is not available, needle valve 242 is opened, so that the cylinder provides little resistance to the pedal, effectively informing the driver that only hydraulic braking is available. When regenerative braking is initiated, responsive to the microprocessor's detecting a signal from potentiometer 71, the needle valve is closed responsive to the degree of braking provided, resisting motion of the pedal 70, and so that the pedal feel provided to the operator is responsive to the degree of regenerative braking actually being effected. Obviously, numerous other arrangements to thus controllably vary the feel of the brake pedal will occur to those of skill in the art.

The mechanical design of the hydraulic braking system of the hybrid vehicle according to the invention is generally conventional, with two principal exceptions as follows: First, as the engine is not always running during movement of the hybrid vehicle, there is no consistent source of manifold vacuum as conventionally employed to provide servo assistance to braking. Therefore, a motor 254 powered directly by the battery bank BB is provided, and drives a vacuum pump 256, providing vacuum to a conventional servo booster 258, in turn operating conventional wheel brakes 260. The same motor 254 can be used to power other "ancillary" systems that in conventional vehicles are powered by the engine, such as the power steering pump and the air conditioning compressor. (The art does recognize that hybrid vehicles require different sources of power for ancillary devices, such as power steering pumps or power brake pumps. See Heidl U.S. Pat. No. 5,249,637, at col. 1, lines 7-45.) Second, in order that the initial movement of the brake pedal 70 activates only the regenerative braking process (in order to obtain the maximum benefit therefrom), a mechanism is provided so that the rod 262 actuating the piston within master cylinder 264 and thence the wheel brakes 260 moves a distance X before the master cylinder itself is actuated. In the implementation shown, this mechanism simply involves provision of a cross-pin 266 fixed to rod 262 and sliding within a slot 268 formed in the piston rod 270 of master cylinder 264; accordingly, the master cylinder piston(s) do not begin to move until the cross-pin 266 reaches the left end of slot 268. If the overall pedal travel Y is six inches, the distance X defined by slot 268 may be such as to allow pedal 70 to move freely through 1-½ inches before the piston(s) of the master cylinder 264 begins to move.

Thus, according to this aspect of the invention, potentiometer 71 provides a signal to the microprocessor 48 when the brake pedal 70 is depressed by the driver. The microprocessor 48 evaluates the battery bank state of charge (SOC) as indicated at 66; unless this is such that further charging is undesirable, the inverter/chargers 224 and 27 are operated such that motors 222 and 25 are operated as generators, so that torque provided to the wheels by the road is converted into electrical power, retarding the vehicle and charging the battery bank. The degree of retardation thus provided depends on the degree to which pedal 70 is depressed. The driver feels resistance to depressing the pedal from air resistance controlled by the opening of needle valve 242; microprocessor 48 controls the opening of valve 242 so that the pedal feel corresponds to the degree of regenerative braking that is provided. In the event regenerative braking is not available for some reason, perhaps because the battery bank is fully charged, because of some flaw in the charging circuits, or because the vehicle is stopped, valve 242 is opened, so that the driver feels little resistance to initial pedal travel, until the hydraulic brake system is activated.

It will be apparent that other types of devices for controlling the resistance to pedal travel to correspond to the amount of regenerative braking being provided, and thus to provide the desired linear relationship between pedal resistance and vehicle retardation, could be substituted for the pneumatic cylinder with microprocessor-controlled vent device shown. For example, a device controllably varying the friction between the pedal pivot and its mounting structure could be provided; a hydraulic system, similarly controlling the resistance to flow of a fluid through an orifice, might be provided; or a device varying the preload of a return spring might be provided. Other equivalent devices for achieving the same goals will occur to those of skill in the art.

HVAC System

The essential components of the heating, ventilation and air conditioning (HVAC) systems of conventional vehicles are a heater core, connected to the engine cooling system, an air conditioning system including an evaporator, and a fan to blow air over the heater core and evaporator and into the passenger cabin. There are several issues to be addressed in adapting the conventional automotive HVAC system to use in a hybrid vehicle. One is that conventionally the air conditioning compressor is driven by the engine through an electrically-controlled clutch; in a hybrid vehicle this is unacceptable, as the engine is not run constantly. Therefore the air conditioning compressor must be powered differently. Similarly, again as the engine is not run constantly, the heater core cannot be relied upon to heat the cabin.

The art does recognize that hybrid vehicles require different sources of power for ancillary devices, such as power steering pumps or power brake pumps. See Heidl U.S. Pat. No. 5,249,637, at col. 1, lines 7-45. Heidl's disclosure is to the effect that a motor/generator used to drive the ancillaries during electric operation can be used as a generator when the vehicle is propelled by an internal combustion engine.

FIG. 16 shows the principal components of an HVAC system for a hybrid vehicle according to the invention. The complex ducting that is typically provided to supply conditioned air throughout the vehicle cabin is represented by a single duct 300. A fan 302 forces air through the duct 300, and in succession past an evaporator 304, a heater core 306, and an electric heater 308. The evaporator 304 is connected to an air conditioning compressor 310 driven by an electric motor 312 powered from the battery bank, so that the air conditioning system can be operated independent of the engine 40.

Motor 312 could be the same motor used to power other ancillaries, such as the vacuum pump 256 (FIG. 15) used to provide servo assistance to the brake system, or could be a separate motor dedicated to powering the compressor 310. The latter may be preferred, as this would allow elimination of the clutch otherwise needed to permit operation of the compressor only when needed; elimination of the clutch would also allow elimination of seals that are a source of leaks. Another advantage of driving the compressor from the battery bank according to the invention is as follows. Conventionally, in order to be useful under all circumstances, the compressor must be sized to provide full cooling with the engine at idle. Such a compressor is very inefficient at higher speeds; by decoupling the compressor from the vehicle drivetrain according to the invention, it can be designed to be driven by motor 312 at a single optimally efficient speed. Cabin temperature can be thermostatically controlled by a throttling valve controlling the flow of refrigerant, or by turning motor 312 on and off as required. The other components of the air conditioning system, including an expansion valve 314 and a condenser 316, are shown schematically, and are generally conventional.

When the engine is running, it is efficient to employ waste heat from the engine cooling system to provide cabin heat, and accordingly an essentially conventional heater core 306 and control elements (not shown) are provided; heater core 306 is downstream of the evaporator 304 with respect to the flow of air through duct 300, as conventional, so that dehumidified air can be heated to provide efficient demisting.

In order to provide heat as may be required when the engine is not running, an electric heating element 308, essentially comprising a coil of Nichrome wire or the like, is provided, again downstream of the evaporator 304. Heating element 308 is provided with conventional controls (not shown) and is powered directly from the battery bank 22, as indicated.

It will be appreciated that according to this aspect of the invention, suitably heated or cooled cabin air is thus available regardless of the mode of operation of the vehicle, as needed in order that the hybrid vehicle of the invention suffers no comfort or convenience drawback with respect to conventional vehicles. Indeed, because ample electrical power is available from the large battery bank of the hybrid vehicle, electric heater 308 can be designed to heat the cabin much more rapidly than does the coolant heat exchanging core of a conventional engine, thus providing a convenience advantage. Similarly, conductors can be embedded in the vehicle windows and windshield and powered by the battery bank for improved electrically-operated de-misting and de-icing.

It will be appreciated that the hybrid vehicle and operational strategy therefor of the invention provide numerous advantages over the prior art discussed herein, and that further improvements and modifications thereto are within the skill of the art. Accordingly, while a preferred embodiment of the invention has been disclosed, and various alternatives mentioned specifically, the invention is not to be limited thereby.

The inventioned claimed is:

1. A hybrid vehicle, comprising:
   one or more wheels;
   an internal combustion engine operable to propel the hybrid vehicle by providing torque to the one or more wheels;
   a first electric motor coupled to the engine;
   a second electric motor operable to propel the hybrid vehicle by providing torque to the one or more wheels;
   a battery coupled to the first and second electric motors, operable to:
      provide current to the first and/or the second electric motors; and
      accept current from the first and second electric motors; and
   a controller, operable to control the flow of electrical and mechanical power between the engine, the first and the second electric motors, and the one or more wheels;
   wherein the controller is operable to operate the engine when torque required from the engine to propel the hybrid vehicle and/or to drive one or more of the first or the second motors to charge the battery is at least equal to a setpoint (SP) above which the torque produced by the engine is efficiently produced, and wherein the torque produced by the engine when operated at the SP is substantially less than the maximum torque output (MTO) of the engine.

2. The hybrid vehicle of claim 1, wherein the controller is operable to stop the engine when the torque required to propel the vehicle is less than the SP.

3. The hybrid vehicle of claim 1, wherein the controller is operable to stop the engine when the torque required to propel the vehicle and/or charge the battery is less than the SP.

4. The hybrid vehicle of claim 1, wherein to operate the engine, the controller is operable to start the engine via the first electric motor if the engine is not already running.

5. The hybrid vehicle of claim 1, wherein the controller is further operable to monitor patterns of vehicle operation over time and vary the SP accordingly.

6. The hybrid vehicle of claim 1, wherein the controller is further operable to:
   monitor road load (RL) on the hybrid vehicle over time; and
   control transition between propulsion of the hybrid vehicle by the first and/or the second electric motors to propulsion by the engine responsive to the RL reaching the SP, wherein the transition only occurs when:
      the RL>the SP for at least a first length of time; or
      the RL>a second setpoint (SP2), wherein the SP2>the SP.

7. The hybrid vehicle of claim 6, wherein if the engine is not started, the controller is operable to start the engine for the transition between propulsion of the hybrid vehicle by the first and/or the second electric motors to propulsion by the engine.

8. The hybrid vehicle of claim 6, wherein the controller is further operable to control transition from propulsion of the hybrid vehicle by the engine to propulsion by the first and/or the second electric motors such that the transition occurs only when the RL<the SP for at least a second length of time.

9. The hybrid vehicle of claim 8, wherein the first length of time is the same as the second length of time.

10. The hybrid vehicle of claim 8, wherein the first length of time and the second length of time are predetermined.

11. The hybrid vehicle of claim 8, wherein the controller is further operable to stop the engine after the transition between propulsion of the hybrid vehicle by the engine to propulsion by the first and/or the second electric motors.

12. The hybrid vehicle of claim 1, wherein the controller is operable to vary the SP as a function of speed of the engine.

13. The hybrid vehicle of claim 1, wherein the SP is at least approximately 20% of the MTO of the engine when normally-aspirated.

14. The hybrid vehicle of claim 1 wherein the SP is at least approximately 30% of the MTO of the engine when normally-aspirated.

15. The hybrid vehicle of claim 1, wherein the SP is less than approximately 70% of the MTO of the engine when normally-aspirated.

16. The hybrid vehicle of claim 1, wherein the controller is operable to implement a plurality of operating modes responsive to road load (RL) and the SP, wherein both the RL and the SP are expressed as percentages of the MTO of the engine when normally-aspirated, and wherein the operating modes comprise:
  a low-load mode I, wherein, when the RL<the SP, the second electric motor is operable to provide torque to propel the hybrid vehicle;
  a highway cruising mode IV, wherein, when the SP<the RL<the MTO, the engine is operable to provide torque to propel the hybrid vehicle, and wherein the controller is operable to start the engine if the engine is not running to enter the highway cruising mode IV; and
  an acceleration mode V, wherein, when the RL>the MTO, the engine, the first electric motor, and/or the second electric motor is operable to provide torque to propel the hybrid vehicle, and wherein the controller is operable to start the engine if the engine is not running to enter the acceleration mode V.

17. The hybrid vehicle of claim 16, wherein the controller is operable to decouple the engine and the first electric motor from the one or more wheels during operation in the mode I and couple the engine and the first electric motor to the one or more wheels during operation in the modes IV and V.

18. The hybrid vehicle of claim 16, wherein the plurality of operating modes further comprise a low-speed battery charging mode II, wherein, when the RL<the SP and a state of charge of the battery is below a predetermined level:
  the controller is operable to decouple the engine and the first electric motor from the one or more wheels and start the engine if the engine is not running to enter the battery charging mode II;
  the second electric motor is operable to provide torque to propel the hybrid vehicle; and
  the engine is operable to provide torque at least equal to the SP to the first motor for charging the battery.

19. The hybrid vehicle of claim 16, wherein the controller is operable to control direct transition from operation of the hybrid vehicle in the mode I to operation of the hybrid vehicle in the mode V in response to operator input, and wherein the operator input specifies a rapid increase in torque to be applied to the one or more wheels of the hybrid vehicle.

20. The hybrid vehicle of claim 16, further comprising a turbocharger controllably coupled to the internal combustion engine, operable to increase the MTO of the engine;
  wherein the plurality of operation modes further comprise a sustained high-power turbocharged mode VI, wherein, when the RL>the MTO for more than a predetermined time T, the controller is operable to engage the turbocharger to increase the effective MTO of the engine.

21. The hybrid vehicle of claim 20, wherein the controller is operable to vary the time T with respect to a state of charge of the battery.

22. The hybrid vehicle of claim 1, further comprising a turbocharger controllably coupled to the internal combustion engine, operable to increase the MTO of the engine.

23. The hybrid vehicle of claim 1, wherein the controller is operable to receive operator input of a desired cruising speed, and thereafter control instantaneous torque output of the engine and/or one or more of the first or the second electric motors in accordance with variation in RL so as to maintain a substantially constant vehicle speed.

24. The hybrid vehicle of claim 1, wherein the battery is operable to be regeneratively charged when instantaneous torque output by the internal combustion engine>the RL, when the RL is negative, and/or when braking is initiated by the operator.

25. The hybrid vehicle of claim 1, wherein total torque available to the one or more wheels from the engine is no greater than total torque available from the first and second electric motors combined.

26. The hybrid vehicle of claim 1, wherein the engine and first electric motor are coupled to a first set of the one or more wheels of the hybrid vehicle and the second electric motor is coupled to a second set of the one or more wheels of the hybrid vehicle.

27. The hybrid vehicle of claim 1, further comprising a variable-ratio transmission disposed between the engine and the one or more wheels of the hybrid vehicle.

28. The hybrid vehicle of claim 1, wherein the controller is operable to rotate the engine via the first electric motor before starting the engine such that cylinders of the engine are heated by compression of air therein.

29. The hybrid vehicle of claim 1, wherein the controller is operable to limit a rate of change of torque produced by the engine, such that combustion of fuel within the engine occurs substantially at a stoichiometric ratio, and wherein if the engine is incapable of supplying an instantaneous torque required, the controller is operable to transfer additional torque from one or more of the first or the second electric motors.

30. The hybrid vehicle of claim 1, wherein the engine is controllably coupled to the one or more wheels of the hybrid vehicle by a clutch.

31. The hybrid vehicle of claim 30, wherein the clutch connects a first output shaft of or driven by the engine and the first electric motor with a second output shaft of or driven by the second electric motor coupled to the one or more wheels, and wherein the controller is operable to control the speeds of the engine and the first electric motor and of the second motor such that when the clutch is engaged, the speeds of the first and second output shafts are substantially equal.

32. The hybrid vehicle of claim 1, wherein the controller is operable to start and operate the engine at torque output levels less than SP under abnormal and transient conditions to satisfy drivability and/or safety considerations.

33. A method for controlling a hybrid vehicle, comprising:
  determining instantaneous road load (RL) required to propel the hybrid vehicle responsive to an operator command;
  operating at least one electric motor to propel the hybrid vehicle when the RL required to do so is less than a setpoint (SP);
  operating an internal combustion engine of the hybrid vehicle to propel the hybrid vehicle when the RL required to do so is between the SP and a maximum torque output (MTO) of the engine, wherein the engine is operable to efficiently produce torque above the SP, and wherein the SP is substantially less than the MTO;

operating both the at least one electric motor and the engine to propel the hybrid vehicle when the torque RL required to do so is more than the MTO; and monitoring patterns of vehicle operation over time and varying the SP accordingly.

34. The method of claim 33, further comprising:
turning off the engine when the torque required to propel the vehicle is less than the SP.

35. The method of claim 33, further comprising:
turning off the engine when the torque required to propel the vehicle and/or charge the battery is less than the SP.

36. The method of claim 33, further comprising:
monitoring a state of charge of a battery comprised in the hybrid vehicle, wherein the battery is operable to:
store power from the at least one electric motor and/or the engine; and
transmit power to the at least one electric motor to propel the hybrid vehicle.

37. The method of claim 33, further comprising:
operating the engine to charge the battery when the state of charge of the battery indicates the need to do so, wherein the engine is operable to provide torque at least equal to the SP to propel the hybrid vehicle and to drive the at least one electric motor to charge the battery, wherein a first portion of the torque equal to RL is used to propel the hybrid vehicle, wherein a second portion of the torque in excess of RL is used to drive the at least one electric motor to charge the battery, and wherein said operating the engine to charge the battery comprises if the engine is not already running, starting the engine.

38. The method of claim 33, wherein said operating the internal combustion engine of the hybrid vehicle to propel the hybrid vehicle and said operating both the at least one electric motor and the engine to propel the hybrid vehicle, each comprises:
if the engine is not already running, starting the engine.

39. The method of claim 33, further comprising:
monitoring the RL over time;
wherein said operating the internal combustion engine to propel the hybrid vehicle is performed when:
the RL>the SP for at least a predetermined time; or
the RL>a second setpoint (SP2), wherein the SP2 is a larger percentage of the MTO than the SP.

40. The method of claim 33, further comprising:
monitoring the RL over time;
wherein said operating the at least one electric motor to propel the hybrid vehicle is performed when the RL<the SP for at least a predetermined amount of time.

41. The method of claim 33, further comprising:
receiving operator input specifying a desired cruising speed;
controlling instantaneous engine torque output and operation of the at least one electric motor in accordance with variation in the RL to maintain the speed of the hybrid vehicle according to the desired cruising speed.

42. The method of claim 33, wherein the SP is at least approximately 30% of the MTO.

43. The method of claim 33,
wherein the hybrid vehicle is operated in a plurality of operating modes corresponding to values for the RL and the SP;

wherein said operating the at least one electric motor to drive the hybrid vehicle composes a low-load operation mode I;

wherein said operating the internal combustion engine of the hybrid vehicle to propel the hybrid vehicle composes a high-way cruising operation mode IV; and wherein said operating both the at least one electric motor and the engine to propel the hybrid vehicle composes an acceleration operation mode V.

44. The method of claim 43, further comprising:
decoupling the engine from wheels of the hybrid vehicle for operation in mode I; and
coupling the engine to the wheels for operation in modes IV and V.

45. The method of claim 43, wherein the at least one electric motors comprises a first electric motor and a second electric motor, the method further comprising:
monitoring a state of charge of a battery comprised in the hybrid vehicle, wherein the battery is operable to store power from the engine and/or the at least one electric motor and transmit power to the at least one electric motor to propel the vehicle;
operating the engine to charge the battery when the state of charge of the battery is below a predetermined level and when the RL<the SP, wherein said operating the engine to charge the battery composes a low-load battery charging mode II, and wherein said operating the engine to charge the battery comprises:
decoupling the engine from wheels of the hybrid vehicle; and
the engine providing torque at least equal to the SP to the first electric motor to charge the battery;
wherein during said operating the engine to charge the battery when the state of charge of the battery is below a predetermined level, the hybrid vehicle is propelled by torque provided by the second electric motor in response to energy supplied by the battery.

46. The method of claim 43, further comprising:
receiving operator input specifying a change in required torque to be applied to wheels of the hybrid vehicle; and
if the received operator input specifies a rapid increase in the required torque, changing operation from operating mode I directly to operating mode V.

47. The method of claim 43, wherein the hybrid vehicle further comprises a turbocharger controllably coupled to the engine, and wherein said operating both the engine and the at least one electric motor occurs when the RL>the MTO for less than a predetermined time T, wherein the method further comprises:
operating the turbocharger to increase the MTO of the engine when desired, wherein said operating the turbocharger to increase the MTO of the engine occurs when the RL>the MTO for more than the predetermined time T, and wherein said operating the turbocharger composes a turbocharged operation mode VI.

48. The method of claim 47, further comprising:
varying the time T responsive to the state of charge of the battery.

49. The method of claim 33, wherein the hybrid vehicle further comprises a turbocharger controllably coupled to the engine, wherein the method further comprises:
operating the turbocharger to increase the MTO of the engine when desired.

50. The method of claim 33, further comprising:
regeneratively charging a battery of the hybrid vehicle when instantaneous torque output of the engine>the RL, when the RL is negative, and/or when braking is initiated by an operator of the hybrid vehicle.

51. The method of claim 33, wherein the hybrid vehicle comprises a variable-ratio transmission disposed between the engine and the wheels of the hybrid vehicle.

52. The method of claim 33, wherein the engine is controllably coupled to one or more wheels of the hybrid vehicle by a clutch.

53. The method of claim 33, further comprising:
controlling the engine such that combustion of fuel within the engine occurs substantially at a stoichiometric ratio, wherein said controlling the engine comprises limiting a rate of change of torque output of the engine; and
if the engine is incapable of supplying instantaneous torque required to propel the hybrid vehicle, supplying additional torque from the at least one electric motor.

54. The method of claim 33, further comprising:
rotating the engine before starting the engine such that its cylinders are heated by compression of air therein.

55. The method of claim 33, further comprising:
operating the engine at torque output levels less than the SP under abnormal and transient conditions to satisfy drivability and/or safety considerations.

56. The hybrid vehicle of claim 1, wherein a ratio of maximum DC voltage to maximum current supplied is at least 2.5.

57. The hybrid vehicle of claim 56, wherein the maximum DC voltage is at least approximately 500 volts.

58. The hybrid vehicle of claim 56, wherein the maximum current is less than approximately 150 amperes.

59. The hybrid vehicle of claim 1, wherein a maximum DC voltage supplied from said battery is at least approximately 500 volts.

60. The hybrid vehicle of claim 1, wherein a maximum current supplied from said battery is less than approximately 150 amperes.

61. The hybrid vehicle of claim 1, wherein the hybrid vehicle further comprises:
a first alternating current-direct current (AC-DC) converter having an AC side coupled to said second electric motor, operable to accept AC or DC current and convert the current to DC or AC current respectively;
a second AC-DC converter coupled to said first electric motor, at least operable to accept AC current and convert the current to DC;
wherein said battery is coupled to a DC side of said AC-DC converters, wherein said battery is operable to store DC energy received from said AC-DC converters and provide DC energy to at least said first AC-DC converter for providing power to at least said second electric motor; and
wherein a ratio of maximum DC voltage on the DC side of at least said first AC-DC converter coupled to said second electric motor to current supplied from said battery to at least said first AC-DC converter, when maximum current is so supplied, is at least 2.5.

62. The hybrid vehicle of claim 61, wherein the maximum DC voltage on the DC side of either of said AC-DC converters is at least approximately 500 volts.

63. The hybrid vehicle of claim 61, wherein the maximum DC current on the DC side of either of said AC-DC converters is less than approximately 150 amperes.

64. The hybrid vehicle of claim 61, wherein a maximum DC voltage supplied from said battery is at least approximately 500 volts.

65. The hybrid vehicle of claim 61, wherein a maximum current supplied from said battery is less than approximately 150 amperes.

66. The hybrid vehicle of claim 27, wherein said variable-ratio transmission disposed between the engine and the one or more wheels of the hybrid vehicle comprises a planetary gear mechanism.

67. The hybrid vehicle of claim 1, wherein the second electric motor is sufficiently powerful to provide acceleration of said vehicle sufficient to conform to the Federal urban cycle driving fuel mileage test without use of torque from the engine to propel the vehicle.

68. The method of claim 33,
wherein said operating the at least one electric motor comprises supplying power from a battery;
wherein a ratio of maximum DC voltage to maximum current supplied is at least 2.5.

69. The method of claim 68, wherein the maximum DC voltage is at least approximately 500 volts.

70. The method of claim 68, wherein the maximum current is less than approximately 150 amperes.

71. The method of claim 33,
wherein said operating the at least one electric motor comprises supplying power from a battery;
wherein a maximum DC voltage supplied from said battery is at least approximately 500 volts.

72. The method of claim 33,
wherein said operating the at least one electric motor comprises supplying power from a battery;
wherein a maximum current supplied from said battery is less than approximately 150 amperes.

73. The method of claim 33, wherein the at least one electric motor comprises a first electric motor and a second electric motor, the method further comprising:
operating a first alternating current-direct current (AC-DC) converter having an AC side coupled to the second electric motor, wherein said operating the first AC-DC converter comprises accepting AC or DC current and converting the current to DC or AC current respectively;
operating a second AC-DC converter coupled to a first electric motor, wherein said operating the second AC-DC converter comprises accepting AC current and converting the current to DC;
wherein said operating the at least one electric motor comprises supplying power from a battery;
wherein said battery is coupled to a DC side of said AC-DC converters;
storing DC energy received from said AC-DC converters and providing DC energy to at least said first AC-DC converter for providing power to at least said second electric motor; and
wherein a ratio of maximum DC voltage on the DC side of at least said first AC-DC converter coupled to said second electric motor to current supplied from said battery to at least said first AC-DC converter, when maximum current is so supplied, is at least 2.5.

74. The method of claim 73, wherein the maximum DC voltage on the DC side of either of said AC-DC converters is at least approximately 500 volts.

75. The method of claim 73, wherein the maximum DC current on the DC side of either of said AC-DC converters is less than approximately 150 amperes.

76. The method of claim 73, wherein a maximum DC voltage supplied from said battery is at least approximately 500 volts.

77. The method of claim 73, wherein a maximum current supplied from said battery is less than approximately 150 amperes.

78. The method of claim 51, wherein said variable-ratio transmission comprises a planetary gear mechanism.

79. The hybrid vehicle of claim 1, wherein the second electric motor is sufficiently powerful to provide acceleration of said vehicle sufficient to conform to the Federal urban cycle driving fuel mileage test without use of torque from the engine to propel the vehicle.

80. A method for controlling a hybrid vehicle, comprising:
determining instantaneous road load (RL) required to propel the hybrid vehicle responsive to an operator command;
monitoring the RL over time;
operating at least one electric motor to propel the hybrid vehicle when the RL required to do so is less than a setpoint (SP);
operating an internal combustion engine of the hybrid vehicle to propel the hybrid vehicle when the RL required to do so is between the SP and a maximum torque output (MTO) of the engine, wherein the engine is operable to efficiently produce torque above the SP, and wherein the SP is substantially less than the MTO; and
wherein said operating the internal combustion engine to propel the hybrid vehicle is performed when:
the RL>the SP for at least a predetermined time; or
the RL>a second setpoint (SP2), wherein the SP2 is a larger percentage of the MTO than the SP; and
operating both the at least one electric motor and the engine to propel the hybrid vehicle when the torque RL required to do so is more than the MTO.

81. The method of claim 80,
wherein said operating the at least one electric motor comprises supplying power from a battery;
wherein a ratio of maximum DC voltage to maximum current supplied is at least 2.5.

82. The method of claim 81, wherein the maximum DC voltage is at least approximately 500 volts.

83. The method of claim 81, wherein the maximum current is less than approximately 150 amperes.

84. The method of claim 80,
wherein said operating the at least one electric motor comprises supplying power from a battery;
wherein a maximum DC voltage supplied from said battery is at least approximately 500 volts.

85. The method of claim 80,
wherein said operating the at least one electric motor comprises supplying power from a battery;
wherein a maximum current supplied from said battery is less than approximately 150 amperes.

86. The method of claim 80, wherein the at least one electric motor comprises a first electric motor and a second electric motor, the method further comprising:
operating a first alternating current-direct current (AC-DC) converter having an AC side coupled to the second electric motor, wherein said operating the first AC-DC converter comprises accepting AC or DC current and converting the current to DC or AC current respectively;
operating a second AC-DC converter coupled to a first electric motor, wherein said operating the second AC-DC converter comprises accepting AC current and converting the current to DC;
wherein said operating the at least one electric motor comprises supplying power from a battery;
wherein said battery is coupled to a DC side of said AC-DC converters;
storing DC energy received from said AC-DC converters and providing DC energy to at least said first AC-DC converter for providing power to at least said second electric motor; and
wherein a ratio of maximum DC voltage on the DC side of at least said first AC-DC converter coupled to said second electric motor to current supplied from said battery to at least said first AC-DC converter, when maximum current is so supplied, is at least 2.5.

87. The method of claim 86, wherein the maximum DC voltage on the DC side of either of said AC-DC converters is at least approximately 500 volts.

88. The method of claim 86, wherein the maximum DC current on the DC side of either of said AC-DC converters is less than approximately 150 amperes.

89. The method of claim 86, wherein a maximum DC voltage supplied from said battery is at least approximately 500 volts.

90. The method of claim 86, wherein a maximum current supplied from said battery is less than approximately 150 amperes.

91. The method of claim 80, further comprising:
turning off the engine when the torque required to propel the vehicle is less than the SP.

92. The method of claim 80, further comprising:
turning off the engine when the torque required to propel the vehicle and/or charge the battery is less than the SP.

93. The method of claim 80, further comprising:
monitoring a state of charge of a battery comprised in the hybrid vehicle, wherein the battery is operable to:
store energy from the at least one electric motor and/or the engine; and
transmit energy to the at least one electric motor to propel the hybrid vehicle.

94. The method of claim 80, further comprising:
operating the engine to charge the battery when the state of charge of the battery indicates the need to do so, wherein the engine is operable to provide torque at least equal to the SP to propel the hybrid vehicle and to drive the at least one electric motor to charge the battery, wherein a first portion of the torque equal to RL is used to propel the hybrid vehicle, wherein a second portion of the torque in excess of RL is used to drive the at least one electric motor to charge the battery, and wherein said operating the engine to charge the battery comprises if the engine is not already running, starting the engine.

95. The method of claim 80, wherein said operating the internal combustion engine of the hybrid vehicle to propel the hybrid vehicle and said operating both the at least one electric motor and the engine to propel the hybrid vehicle, each comprises:
if the engine is not already running, starting the engine.

96. The method of claim 80, further comprising:
monitoring the RL over time;
wherein said operating the at least one electric motor to propel the hybrid vehicle is performed when the RL<the SP for at least a predetermined amount of time.

97. The method of claim 80, further comprising:
receiving operator input specifying a desired cruising speed;
controlling instantaneous engine torque output and operation of the at least one electric motor in accordance with variation in the RL to maintain the speed of the hybrid vehicle according to the desired cruising speed.

98. The method of claim 80, wherein the SP is at least approximately 30% of the MTO.

99. The method of claim 80,
wherein the hybrid vehicle is operated in a plurality of operating modes corresponding to values for the RL and the SP;
wherein said operating the at least one electric motor to drive the hybrid vehicle composes a low-load operation mode I;
wherein said operating the internal combustion engine of the hybrid vehicle to propel the hybrid vehicle composes a high-way cruising operation mode IV; and
wherein said operating both the at least one electric motor and the engine to propel the hybrid vehicle composes an acceleration operation mode V.

100. The method of claim 99, wherein the engine can be operated in mode I without transmitting power to the wheels.

101. The method of claim 99, wherein the at least one electric motors comprises a first electric motor and a second electric motor, the method further comprising:
monitoring a state of charge of a battery comprised in the hybrid vehicle, wherein the battery is operable to store power from the engine and/or the at least one electric motor and transmit power to the at least one electric motor to propel the vehicle;
operating the engine to charge the battery when the state of charge of the battery is below a predetermined level and when the RL<the SP, wherein said operating the engine to charge the battery composes a low-load battery charging mode II, and wherein said operating the engine to charge the battery comprises:
decoupling the engine from wheels of the hybrid vehicle; and
the engine providing torque at least equal to the SP to the first electric motor to charge the battery;
wherein during said operating the engine to charge the battery when the state of charge of the battery is below a predetermined level, the hybrid vehicle is propelled by torque provided by the second electric motor in response to energy supplied by the battery.

102. The method of claim 99, further comprising:
receiving operator input specifying a change in required torque to be applied to wheels of the hybrid vehicle; and
if the received operator input specifies a rapid increase in the required torque, changing operation from operating mode I directly to operating mode V.

103. The method of claim 99, wherein the hybrid vehicle further comprises a turbocharger controllably coupled to the engine, and wherein said operating both the engine and the at least one electric motor occurs when the RL>the MTO for less than a predetermined time T, wherein the method further comprises:
operating the turbocharger to increase the MTO of the engine when desired, wherein said operating the turbocharger to increase the MTO of the engine occurs when the RL>the MTO for more than the predetermined time T, and wherein said operating the turbocharger composes a turbocharged operation mode VI.

104. The method of claim 103, further comprising:
varying the time T responsive to the state of charge of the battery.

105. The method of claim 80, wherein the hybrid vehicle further comprises a turbocharger controllably coupled to the engine, wherein the method further comprises:
operating the turbocharger to increase the MTO of the engine when desired.

106. The method of claim 80, further comprising:
regeneratively charging a battery of the hybrid vehicle when instantaneous torque output of the engine>the RL, when the RL is negative, and/or when braking is initiated by an operator of the hybrid vehicle.

107. The method of claim 80, wherein the hybrid vehicle comprises a variable-ratio transmission disposed between the engine and the wheels of the hybrid vehicle.

108. The method of claim 107, wherein said variable-ratio transmission comprises a planetary gear mechanism.

109. The method of claim 80, wherein the engine is controllably coupled to one or more wheels of the hybrid vehicle by a clutch.

110. The method of claim 80, further comprising:
controlling the engine such that combustion of fuel within the engine occurs substantially at a stoichiometric ratio, wherein said controlling the engine comprises limiting a rate of change of torque output of the engine; and
if the engine is incapable of supplying instantaneous torque required to propel the hybrid vehicle, supplying additional torque from the at least one electric motor.

111. The method of claim 80, further comprising:
rotating the engine before starting the engine such that its cylinders are heated by compression of air therein.

112. The method of claim 80, further comprising:
operating the engine at torque output levels less than the SP under abnormal and transient conditions to satisfy drivability and/or safety considerations.

113. The method of claim 80, wherein the second electric motor is sufficiently powerful to provide acceleration of said vehicle sufficient to conform to the Federal urban cycle driving fuel mileage test without use of torque from the engine to propel the vehicle.

114. A method for controlling a hybrid vehicle, comprising:
determining instantaneous road load (RL) required to propel the hybrid vehicle responsive to an operator command;
monitoring the RL over time;
operating at least one electric motor to propel the hybrid vehicle when the RL required to do so is less than a setpoint (SP);
wherein said operating the at least one electric motor to propel the hybrid vehicle is performed when the RL<the SP for at least a predetermined amount of time;
operating an internal combustion engine of the hybrid vehicle to propel the hybrid vehicle when the RL required to do so is between the SP and a maximum torque output (MTO) of the engine, wherein the engine is operable to efficiently produce torque above the SP, and wherein the SP is substantially less than the MTO; and
operating both the at least one electric motor and the engine to propel the hybrid vehicle when the torque RL required to do so is more than the MTO.

115. The method of claim 114,
wherein said operating the at least one electric motor comprises supplying energy from a battery;
wherein a ratio of maximum DC voltage to maximum current supplied is at least 2.5.

116. The method of claim 115, wherein the maximum DC voltage is at least approximately 500 volts.

117. The method of claim 115, wherein the maximum current is less than approximately 150 amperes.

118. The method of claim 114,
wherein said operating the at least one electric motor comprises supplying energy from a battery;

wherein a maximum DC voltage supplied from said battery is at least approximately 500 volts.

119. The method of claim 114, wherein said operating the at least one electric motor comprises supplying energy from a battery; wherein a maximum current supplied from said battery is less than approximately 150 amperes.

120. The method of claim 114, wherein the at least one electric motor comprises a first electric motor and a second electric motor, the method further comprising:
   operating a first alternating current-direct current (AC-DC) converter having an AC side coupled to the second electric motor, wherein said operating the first AC-DC converter comprises accepting AC or DC current and converting the current to DC or AC current respectively;
   operating a second AC-DC converter coupled to a first electric motor, wherein said operating the second AC-DC converter comprises accepting AC current and converting the current to DC;
   wherein said operating the at least one electric motor comprises supplying energy from a battery;
   wherein said battery is coupled to a DC side of said AC-DC converters;
   storing DC energy received from said AC-DC converters and providing DC energy to at least said first AC-DC converter for providing power to at least said second electric motor; and
   wherein a ratio of maximum DC voltage on the DC side of at least said first AC-DC converter coupled to said second electric motor to current supplied from said battery to at least said first AC-DC converter, when maximum current is so supplied, is at least 2.5.

121. The method of claim 120, wherein the maximum DC voltage on the DC side of either of said AC-DC converters is at least approximately 500 volts.

122. The method of claim 120, wherein the maximum DC current on the DC side of either of said AC-DC converters is less than approximately 150 amperes.

123. The method of claim 120, wherein a maximum DC voltage supplied from said battery is at least approximately 500 volts.

124. The method of claim 120, wherein a maximum current supplied from said battery is less than approximately 150 amperes.

125. The method of claim 114, further comprising:
   turning off the engine when the torque required to propel the vehicle is less than the SP.

126. The method of claim 114, further comprising:
   turning off the engine when the torque required to propel the vehicle and/or charge the battery is less than the SP.

127. The method of claim 114, further comprising:
   monitoring a state of charge of a battery comprised in the hybrid vehicle, wherein the battery is operable to:
      store energy from the at least one electric motor and/or the engine; and
      transmit energy to the at least one electric motor to propel the hybrid vehicle.

128. The method of claim 114, further comprising:
   operating the engine to charge the battery when the state of charge of the battery indicates the need to do so, wherein the engine is operable to provide torque at least equal to the SP to propel the hybrid vehicle and to drive the at least one electric motor to charge the battery, wherein a first portion of the torque equal to RL is used to propel the hybrid vehicle, wherein a second portion of the torque in excess of RL is used to drive the at least one electric motor to charge the battery, and wherein said operating the engine to charge the battery comprises if the engine is not already running, starting the engine.

129. The method of claim 114, wherein said operating the internal combustion engine of the hybrid vehicle to propel the hybrid vehicle and said operating both the at least one electric motor and the engine to propel the hybrid vehicle, each comprises:
   if the engine is not already running, starting the engine.

130. The method of claim 114, further comprising:
   receiving operator input specifying a desired cruising speed;
   controlling instantaneous engine torque output and operation of the at least one electric motor in accordance with variation in the RL to maintain the speed of the hybrid vehicle according to the desired cruising speed.

131. The method of claim 114, wherein the SP is at least approximately 30% of the MTO.

132. The method of claim 114,
   wherein the hybrid vehicle is operated in a plurality of operating modes corresponding to values for the RL and the SP;
   wherein said operating the at least one electric motor to drive the hybrid vehicle composes a low-load operation mode I;
   wherein said operating the internal combustion engine of the hybrid vehicle to propel the hybrid vehicle composes a high-way cruising operation mode IV; and
   wherein said operating both the at least one electric motor and the engine to propel the hybrid vehicle composes an acceleration operation mode V.

133. The method of claim 132, wherein the engine can be operated without transfer of power to wheels of the hybrid vehicle in mode I.

134. The method of claim 132, wherein the at least one electric motors comprises a first electric motor and a second electric motor, the method further comprising:
   monitoring a state of charge of a battery comprised in the hybrid vehicle, wherein the battery is operable to store energy from the engine and/or the at least one electric motor and transmit energy to the at least one electric motor to propel the vehicle;
   operating the engine to charge the battery when the state of charge of the battery is below a predetermined level and when the RL<the SP, wherein said operating the engine to charge the battery composes a low-load battery charging mode II, and wherein said operating the engine to charge the battery comprises:
      decoupling the engine from wheels of the hybrid vehicle; and
      the engine providing torque at least equal to the SP to the first electric motor to charge the battery;
   wherein during said operating the engine to charge the battery when the state of charge of the battery is below a predetermined level, the hybrid vehicle is propelled by torque provided by the second electric motor in response to energy supplied by the battery.

135. The method of claim 132, further comprising:
   receiving operator input specifying a change in required torque to be applied to wheels of the hybrid vehicle; and
   if the received operator input specifies a rapid increase in the required torque, changing operation from operating mode I directly to operating mode V.

136. The method of claim 132, wherein the hybrid vehicle further comprises a turbocharger controllably coupled to the engine, and wherein said operating both the engine and the at least one electric motor occurs when the RL>the MTO for less than a predetermined time T, wherein the method further comprises:
    operating the turbocharger to increase the MTO of the engine when desired, wherein said operating the turbocharger to increase the MTO of the engine occurs when the RL>the MTO for more than the predetermined time T, and wherein said operating the turbocharger composes a turbocharged operation mode VI.

137. The method of claim 136, further comprising:
varying the time T responsive to the state of charge of the battery.

138. The method of claim 114, wherein the hybrid vehicle further comprises a turbocharger controllably coupled to the engine, wherein the method further comprises:
    operating the turbocharger to increase the MTO of the engine when desired.

139. The method of claim 114, further comprising:
    regeneratively charging a battery of the hybrid vehicle when instantaneous torque output of the engine>the RL, when the RL is negative, and/or when braking is initiated by an operator of the hybrid vehicle.

140. The method of claim 114, wherein the hybrid vehicle comprises a variable-ratio transmission disposed between the engine and the wheels of the hybrid vehicle.

141. The method of claim 140, wherein said variable-ratio transmission comprises a planetary gear mechanism.

142. The method of claim 114, wherein the engine is controllably coupled to one or more wheels of the hybrid vehicle by a clutch.

143. The method of claim 114, further comprising:
    controlling the engine such that combustion of fuel within the engine occurs substantially at a stoichiometric ratio, wherein said controlling the engine comprises limiting a rate of change of torque output of the engine; and
    if the engine is incapable of supplying instantaneous torque required to propel the hybrid vehicle, supplying additional torque from the at least one electric motor.

144. The method of claim 114, further comprising:
    rotating the engine before starting the engine such that its cylinders are heated by compression of air therein.

145. The method of claim 114, further comprising:
    operating the engine at torque output levels less than the SP under abnormal and transient conditions to satisfy drivability and/or safety considerations.

146. The method of claim 114, wherein the at least one electric motor is sufficiently powerful to provide acceleration of said vehicle sufficient to conform to the Federal urban cycle driving fuel mileage test without use of torque from the engine to propel the vehicle.

147. A method for controlling a hybrid vehicle, comprising:
    determining instantaneous road load (RL) required to propel the hybrid vehicle responsive to an operator command;
    wherein the hybrid vehicle is operated in a plurality of operating modes corresponding to values for the RL and a setpoint (SP);
    operating at least one first electric motor to propel the hybrid vehicle when the RL required to do so is less than the SP;
    wherein said operating the at least one first electric motor to drive the hybrid vehicle comprises a low-load operation mode I;
    operating an internal combustion engine of the hybrid vehicle to propel the hybrid vehicle when the RL required to do so is between the SP and a maximum torque output (MTO) of the engine, wherein the engine is operable to efficiently produce torque above the SP, and wherein the SP is substantially less than the MTO;
    wherein said operating the internal combustion engine of the hybrid vehicle to propel the hybrid vehicle comprises a highway cruising operation mode IV;
    operating both the at least one first electric motor and the engine to propel the hybrid vehicle when the torque RL required to do so is more than the MTO;
    wherein said operating both the at least one first electric motor and the engine to propel the hybrid vehicle comprises an acceleration operation mode V;
    monitoring a state of charge of a battery comprised in the hybrid vehicle, wherein the battery is operable to store power from the engine and/or the at least one first electric motor and transmit power to the at least one first electric motor to propel the vehicle; and
    operating the engine to charge the battery when the state of charge of the battery is below a predetermined level and when the RL<the SP, wherein said operating the engine to charge the battery comprises a low-load battery charging mode II, and wherein said operating the engine to charge the battery comprises:
        operating the engine without transferring power to the wheels of the hybrid vehicle; and
        the engine providing torque at least equal to the SP to the at least one first electric motor to charge the battery;
    wherein during said operating the engine to charge the battery when the state of charge of the battery is below a predetermined level, the hybrid vehicle is propelled by torque provided by at least one second electric motor in response to energy supplied by the battery.

148. The method of claim 147,
    wherein said operating the at least one electric motor comprises supplying energy from a battery;
    wherein a ratio of maximum DC voltage to maximum current supplied is at least 2.5.

149. The method of claim 148, wherein the maximum DC voltage is at least approximately 500 volts.

150. The method of claim 148, wherein the maximum current is less than approximately 150 amperes.

151. The method of claim 147,
    wherein said operating the at least one electric motor comprises supplying power from a battery;
    wherein a maximum DC voltage supplied from said battery is at least approximately 500 volts.

152. The method of claim 147,
    wherein said operating the at least one electric motor comprises supplying power from a battery;
    wherein a maximum current supplied from said battery is less than approximately 150 amperes.

153. The method of claim 147, wherein the at least one electric motor comprises a first electric motor and a second electric motor, the method further comprising:
    operating a first alternating current-direct current (AC-DC) converter having an AC side coupled to the second electric motor, wherein said operating the first AC-DC converter comprises accepting AC or DC current and converting the current to DC or AC current respectively;
    operating a second AC-DC converter coupled to a first electric motor, wherein said operating the second AC-DC converter comprises accepting AC current and converting the current to DC;

wherein said operating the at least one electric motor comprises supplying power from a battery;

wherein said battery is coupled to a DC side of said AC-DC converters;

storing DC energy received from said AC-DC converters and providing DC energy to at least said first AC-DC converter for providing power to at least said second electric motor; and wherein a ratio of maximum DC voltage on the DC side of at least said first AC-DC converter coupled to said second electric motor to current supplied from said battery to at least said first AC-DC converter, when maximum current is so supplied, is at least 2.5.

154. The method of claim 153, wherein the maximum DC voltage on the DC side of either of said AC-DC converters is at least approximately 500 volts.

155. The method of claim 153, wherein the maximum DC current on the DC side of either of said AC-DC converters is less than approximately 150 amperes.

156. The method of claim 153, wherein a maximum DC voltage supplied from said battery is at least approximately 500 volts.

157. The method of claim 153, wherein a maximum current supplied from said battery is less than approximately 150 amperes.

158. The method of claim 147, wherein the engine can be operated without transferring power to the wheels of the hybrid vehicle during operation in mode I.

159. The method of claim 147, further comprising:
receiving operator input specifying a change in required torque to be applied to wheels of the hybrid vehicle; and
if the received operator input specifies a rapid increase in the required torque, changing operation from operating mode I directly to operating mode V.

160. The method of claim 147, wherein the at least one electric motor is sufficiently powerful to provide acceleration of said vehicle sufficient to conform to the Federal urban cycle driving fuel mileage test without use of torque from the engine to propel the vehicle.

161. A method for controlling a hybrid vehicle, comprising:
determining instantaneous road load (RL) required to propel the hybrid vehicle responsive to an operator command;
wherein the hybrid vehicle is operated in a plurality of operating modes corresponding to values for the RL and a setpoint (SP);
operating at least one first electric motor to propel the hybrid vehicle when the RL required to do so is less than the SP;
wherein said operating the at least one first electric motor to drive the hybrid vehicle composes a low-load operation mode I;
operating an internal combustion engine of the hybrid vehicle to propel the hybrid vehicle when the RL required to do so is between the SP and a maximum torque output (MTO) of the engine, wherein the engine is operable to efficiently produce torque above the SP, and wherein the SP is substantially less than the MTO;
wherein said operating the internal combustion engine of the hybrid vehicle to propel the hybrid vehicle composes a high-way cruising operation mode IV;
operating both the at least one first electric motor and the engine to propel the hybrid vehicle when the torque RL required to do so is more than the MTO;
wherein said operating both the at least one first electric motor and the engine to propel the hybrid vehicle composes an acceleration operation mode V;
receiving operator input specifying a change in required torque to be applied to wheels of the hybrid vehicle; and
if the received operator input specifies a rapid increase in the required torque, changing operation from operating mode I directly to operating mode V.

162. The method of claim 161,
wherein said operating the at least one electric motor comprises supplying energy from a battery;
wherein a ratio of maximum DC voltage to maximum current supplied is at least 2.5.

163. The method of claim 161, wherein the maximum DC voltage is at least approximately 500 volts.

164. The method of claim 161, wherein the maximum current is less than approximately 150 amperes.

165. The method of claim 161,
wherein said operating the at least one electric motor comprises supplying energy from a battery;
wherein a maximum DC voltage supplied from said battery is at least approximately 500 volts.

166. The method of claim 161,
wherein said operating the at least one electric motor comprises supplying energy from a battery;
wherein a maximum current supplied from said battery is less than approximately 150 amperes.

167. The method of claim 161, wherein the at least one electric motor comprises a first electric motor and a second electric motor, the method further comprising:
operating a first alternating current-direct current (AC-DC) converter having an AC side coupled to the second electric motor, wherein said operating the first AC-DC converter comprises accepting AC or DC current and converting the current to DC or AC current respectively;
operating a second AC-DC converter coupled to a first electric motor, wherein said operating the second AC-DC converter comprises accepting AC current and converting the current to DC;
wherein said operating the at least one electric motor comprises supplying power from a battery;
wherein said battery is coupled to a DC side of said AC-DC converters;
storing DC energy received from said AC-DC converters and providing DC energy to at least said first AC-DC converter for providing power to at least said second electric motor; and
wherein a ratio of maximum DC voltage on the DC side of at least said first AC-DC converter coupled to said second electric motor to current supplied from said battery to at least said first AC-DC converter, when maximum current is so supplied, is at least 2.5.

168. The method of claim 167, wherein the maximum DC voltage on the DC side of either of said AC-DC converters is at least approximately 500 volts.

169. The method of claim 167, wherein the maximum DC current on the DC side of either of said AC-DC converters is less than approximately 150 amperes.

170. The method of claim 167, wherein a maximum DC voltage supplied from said battery is at least approximately 500 volts.

171. The method of claim 167, wherein a maximum current supplied from said battery is less than approximately 150 amperes.

172. The method of claim 161, wherein said engine can be operated without transmitting power to the wheels of the hybrid vehicle during operation in mode I.

173. The method of claim 161, wherein said at least one electric motor is sufficiently powerful to provide acceleration of said vehicle sufficient to conform to the Federal urban cycle driving fuel mileage test without use of torque from the engine to propel the vehicle.

174. A method for controlling a hybrid vehicle, comprising:
determining instantaneous road load (RL) required to propel the hybrid vehicle responsive to an operator command;
wherein the hybrid vehicle is operated in a plurality of operating modes corresponding to values for the RL and a setpoint (SP);
operating at least one first electric motor to propel the hybrid vehicle when the RL required to do so is less than the SP;
wherein said operating the at least one first electric motor to drive the hybrid vehicle composes a low-load operation mode I;
operating an internal combustion engine of the hybrid vehicle to propel the hybrid vehicle when the RL required to do so is between the SP and a maximum torque output (MTO) of the engine, wherein the engine is operable to efficiently produce torque above the SP, and wherein the SP is substantially less than the MTO;
wherein said operating the internal combustion engine of the hybrid vehicle to propel the hybrid vehicle composes a high-way cruising operation mode IV;
operating both the at least one first electric motor and the engine to propel the hybrid vehicle when the torque RL required to do so is more than the MTO;
wherein said operating both the at least one first electric motor and the engine to propel the hybrid vehicle composes an acceleration operation mode V, and wherein said operating both the engine and the at least one electric motor occurs when the RL>the MTO for less than a predetermined time T; and
operating a turbocharger controllably coupled to the engine to increase the MTO of the engine when desired, wherein said operating the turbocharger to increase the MTO of the engine occurs when the RL>the MTO for more than the predetermined time T, and wherein said operating the turbocharger composes a turbocharged operation mode VI.

175. The method of claim 174,
wherein said operating the at least one electric motor comprises supplying energy from a battery;
wherein a ratio of maximum DC voltage to maximum current supplied is at least 2.5.

176. The method of claim 174, wherein the maximum DC voltage is at least approximately 500 volts.

177. The method of claim 174, wherein the maximum current is less than approximately 150 amperes.

178. The method of claim 174,
wherein said operating the at least one electric motor comprises supplying energy from a battery;
wherein a maximum DC voltage supplied from said battery is at least approximately 500 volts.

179. The method of claim 174,
wherein said operating the at least one electric motor comprises supplying energy from a battery;
wherein a maximum current supplied from said battery is less than approximately 150 amperes.

180. The method of claim 174, wherein the at least one electric motor comprises a first electric motor and a second electric motor, the method further comprising:
operating a first alternating current-direct current (AC-DC) converter having an AC side coupled to the second electric motor, wherein said operating the first AC-DC converter comprises accepting AC or DC current and converting the current to DC or AC current respectively;
operating a second AC-DC converter coupled to a first electric motor, wherein said operating the second AC-DC converter comprises accepting AC current and converting the current to DC;
wherein said operating the at least one electric motor comprises supplying power from a battery;
wherein said battery is coupled to a DC side of said AC-DC converters;
storing DC energy received from said AC-DC converters and providing DC energy to at least said first AC-DC converter for providing power to at least said second electric motor; and
wherein a ratio of maximum DC voltage on the DC side of at least said first AC-DC converter coupled to said second electric motor to current supplied from said battery to at least said first AC-DC converter, when maximum current is so supplied, is at least 2.5.

181. The method of claim 180, wherein the maximum DC voltage on the DC side of either of said AC-DC converters is at least approximately 500 volts.

182. The method of claim 180, wherein the maximum DC current on the DC side of either of said AC-DC converters is less than approximately 150 amperes.

183. The method of claim 180, wherein a maximum DC voltage supplied from said battery is at least approximately 500 volts.

184. The hybrid vehicle of claim 180, wherein a maximum current supplied from said battery is less than approximately 150 amperes.

185. The method of claim 174, wherein the engine can be operated without transfer of power to the wheels of the hybrid vehicle during operation in mode I.

186. The method of claim 174, further comprising:
varying the time T responsive to the state of charge of the battery.

187. The method of claim 174, wherein the at least one first electric motor is sufficiently powerful to provide acceleration of said vehicle sufficient to conform to the Federal urban cycle driving fuel mileage test without use of torque from the engine to propel the vehicle.

188. A method for controlling a hybrid vehicle, comprising:
determining instantaneous road load (RL) required to propel the hybrid vehicle responsive to an operator command;
operating at least one electric motor to propel the hybrid vehicle when the RL required to do so is less than a setpoint (SP);
operating an internal combustion engine of the hybrid vehicle to propel the hybrid vehicle when the RL required to do so is between the SP and a maximum torque output (MTO) of the engine, wherein the engine is operable to efficiently produce torque above the SP, and wherein the SP is substantially less than the MTO; and
operating both the at least one electric motor and the engine to propel the hybrid vehicle when the torque RL required to do so is more than the MTO; and operating a turbocharger controllably coupled to the engine to increase the MTO of the engine when desired.

189. The method of claim 188,
wherein said operating the at least one electric motor comprises supplying energy from a battery;
wherein a ratio of maximum DC voltage to maximum current supplied is at least 2.5.

190. The method of claim 189, wherein the maximum DC voltage is at least approximately 500 volts.

191. The method of claim 189, wherein the maximum current is less than approximately 150 amperes.

192. The method of claim 188,
wherein said operating the at least one electric motor comprises supplying energy from a battery;
wherein a maximum DC voltage supplied from said battery is at least approximately 500 volts.

193. The method of claim 188,
wherein said operating the at least one electric motor comprises supplying energy from a battery;
wherein a maximum current supplied from said battery is less than approximately 150 amperes.

194. The method of claim 188, wherein the at least one electric motor comprises a first electric motor and a second electric motor, the method further comprising:
operating a first alternating current-direct current (AC-DC) converter having an AC side coupled to the second electric motor, wherein said operating the first AC-DC converter comprises accepting AC or DC current and converting the current to DC or AC current respectively;
operating a second AC-DC converter coupled to a first electric motor, wherein said operating the second AC-DC converter comprises accepting AC current and converting the current to DC;
wherein said operating the at least one electric motor comprises supplying power from a battery;
wherein said battery is coupled to a DC side of said AC-DC converters;
storing DC energy received from said AC-DC converters and providing DC energy to at least said first AC-DC converter for providing power to at least said second electric motor; and
wherein a ratio of maximum DC voltage on the DC side of at least said first AC-DC converter coupled to said second electric motor to current supplied from said battery to at least said first AC-DC converter, when maximum current is so supplied, is at least 2.5.

195. The method of claim 194, wherein the maximum DC voltage on the DC side of either of said AC-DC converters is at least approximately 500 volts.

196. The method of claim 194, wherein the maximum DC current on the DC side of either of said AC-DC converters is less than approximately 150 amperes.

197. The method of claim 194, wherein a maximum DC voltage supplied from said battery is at least approximately 500 volts.

198. The method of claim 194, wherein a maximum current supplied from said battery is less than approximately 150 amperes.

199. The method of claim 188, further comprising:
turning off the engine when the torque required to propel the vehicle is less than the SP.

200. The method of claim 188, further comprising:
turning off the engine when the torque required to propel the vehicle and/or charge the battery is less than the SP.

201. The method of claim 188, further comprising:
monitoring a state of charge of a battery comprised in the hybrid vehicle, wherein the battery is operable to:
store power from the at least one electric motor and/or the engine; and
transmit power to the at least one electric motor to propel the hybrid vehicle.

202. The method of claim 188, further comprising:
operating the engine to charge the battery when the state of charge of the battery indicates the need to do so, wherein the engine is operable to provide torque at least equal to the SP to propel the hybrid vehicle and to drive the at least one electric motor to charge the battery, wherein a first portion of the torque equal to RL is used to propel the hybrid vehicle, wherein a second portion of the torque in excess of RL is used to drive the at least one electric motor to charge the battery, and wherein said operating the engine to charge the battery comprises if the engine is not already running, starting the engine.

203. The method of claim 188, wherein said operating the internal combustion engine of the hybrid vehicle to propel the hybrid vehicle and said operating both the at least one electric motor and the engine to propel the hybrid vehicle, each comprises:
if the engine is not already running, starting the engine.

204. The method of claim 188, further comprising:
receiving operator input specifying a desired cruising speed;
controlling instantaneous engine torque output and operation of the at least one electric motor in accordance with variation in the RL to maintain the speed of the hybrid vehicle according to the desired cruising speed.

205. The method of claim 188, wherein the SP is at least approximately 30% of the MTO.

206. The method of claim 188,
wherein the hybrid vehicle is operated in a plurality of operating modes corresponding to values for the RL and the SP;
wherein said operating the at least one electric motor to drive the hybrid vehicle composes a low-load operation mode I;
wherein said operating the internal combustion engine of the hybrid vehicle to propel the hybrid vehicle composes a high-way cruising operation mode IV; and
wherein said operating both the at least one electric motor and the engine to propel the hybrid vehicle composes an acceleration operation mode V.

207. The method of claim 188, wherein the engine can be operated without transfer of power to the wheels of the hybrid vehicle during operation in mode I.

208. The method of claim 188, further comprising:
regeneratively charging a battery of the hybrid vehicle when instantaneous torque output of the engine>the RL, when the RL is negative, and/or when braking is initiated by an operator of the hybrid vehicle.

209. The method of claim 188, wherein the hybrid vehicle comprises a variable-ratio transmission disposed between the engine and the wheels of the hybrid vehicle.

210. The method of claim 209, wherein said variable-ratio transmission comprises a planetary gear mechanism.

211. The method of claim 188, wherein the engine is controllably coupled to one or more wheels of the hybrid vehicle by a clutch.

212. The method of claim 188, further comprising:
rotating the engine before starting the engine such that its cylinders are heated by compression of air therein.

213. The method of claim 188, further comprising:
operating the engine at torque output levels less than the SP under abnormal and transient conditions to satisfy drivability and/or safety considerations.

214. The method of claim 188, wherein at least one electric motor is sufficiently powerful to provide acceleration of said vehicle sufficient to conform to the Federal urban cycle driving fuel mileage test without use of torque from the engine to propel the vehicle.

215. A method for controlling a hybrid vehicle, comprising:
determining instantaneous road load (RL) required to propel the hybrid vehicle responsive to an operator command;
operating at least one electric motor to propel the hybrid vehicle when the RL required to do so is less than a setpoint (SP);
operating an internal combustion engine of the hybrid vehicle to propel the hybrid vehicle when the RL required to do so is between the SP and a maximum torque output (MTO) of the engine, wherein the engine is operable to efficiently produce torque above the SP, and wherein the SP is substantially less than the MTO; and
operating both the at least one electric motor and the engine to propel the hybrid vehicle when the torque RL required to do so is more than the MTO; and
regeneratively charging a battery of the hybrid vehicle when instantaneous torque output of the engine>the RL, when the RL is negative, and/or when braking is initiated by an operator of the hybrid vehicle.

216. The method of claim 215,
wherein said operating the at least one electric motor comprises supplying energy from a battery;
wherein a ratio of maximum DC voltage to maximum current supplied is at least 2.5.

217. The method of claim 216, wherein the maximum DC voltage is at least approximately 500 volts.

218. The method of claim 216, wherein the maximum current is less than approximately 150 amperes.

219. The method of claim 215,
wherein said operating the at least one electric motor comprises supplying energy from a battery;
wherein a maximum DC voltage supplied from said battery is at least approximately 500 volts.

220. The method of claim 215,
wherein said operating the at least one electric motor comprises supplying energy from a battery;
wherein a maximum current supplied from said battery is less than approximately 150 amperes.

221. The method of claim 215, wherein the at least one electric motor comprises a first electric motor and a second electric motor, the method further comprising:
operating a first alternating current-direct current (AC-DC) converter having an AC side coupled to the second electric motor, wherein said operating the first AC-DC converter comprises accepting AC or DC current and converting the current to DC or AC current respectively;
operating a second AC-DC converter coupled to a first electric motor, wherein said operating the second AC-DC converter comprises accepting AC current and converting the current to DC;
wherein said operating the at least one electric motor comprises supplying power from a battery;
wherein said battery is coupled to a DC side of said AC-DC converters;
storing DC energy received from said AC-DC converters and providing DC energy to at least said first AC-DC converter for providing power to at least said second electric motor; and
wherein a ratio of maximum DC voltage on the DC side of at least said first AC-DC converter coupled to said second electric motor to current supplied from said battery to at least said first AC-DC converter, when maximum current is so supplied, is at least 2.5.

222. The method of claim 221, wherein the maximum DC voltage on the DC side of either of said AC-DC converters is at least approximately 500 volts.

223. The method of claim 221, wherein the maximum DC current on the DC side of either of said AC-DC converters is less than approximately 150 amperes.

224. The method of claim 221, wherein a maximum DC voltage supplied from said battery is at least approximately 500 volts.

225. The hybrid vehicle of claim 221, wherein a maximum current supplied from said battery is less than approximately 150 amperes.

226. The method of claim 215, further comprising:
turning off the engine when the torque required to propel the vehicle is less than the SP.

227. The method of claim 215, further comprising:
turning off the engine when the torque required to propel the vehicle and/or charge the battery is less than the SP.

228. The method of claim 215, further comprising:
monitoring a state of charge of a battery comprised in the hybrid vehicle, wherein the battery is operable to:
store energy from the at least one electric motor and/or the engine; and
transmit energy to the at least one electric motor to propel the hybrid vehicle.

229. The method of claim 215, further comprising:
operating the engine to charge the battery when the state of charge of the battery indicates the need to do so, wherein the engine is operable to provide torque at least equal to the SP to propel the hybrid vehicle and to drive the at least one electric motor to charge the battery, wherein a first portion of the torque equal to RL is used to propel the hybrid vehicle, wherein a second portion of the torque in excess of RL is used to drive the at least one electric motor to charge the battery, and wherein said operating the engine to charge the battery comprises if the engine is not already running, starting the engine.

230. The method of claim 215, wherein said operating the internal combustion engine of the hybrid vehicle to propel the hybrid vehicle and said operating both the at least one electric motor and the engine to propel the hybrid vehicle, each comprises:
if the engine is not already running, starting the engine.

231. The method of claim 215, further comprising:
receiving operator input specifying a desired cruising speed;
controlling instantaneous engine torque output and operation of the at least one electric motor in accordance with variation in the RL to maintain the speed of the hybrid vehicle according to the desired cruising speed.

232. The method of claim 215, wherein the SP is at least approximately 30% of the MTO.

233. The method of claim 215,
wherein the hybrid vehicle is operated in a plurality of operating modes corresponding to values for the RL and the SP;

wherein said operating the at least one electric motor to drive the hybrid vehicle composes a low-load operation mode I;

wherein said operating the internal combustion engine of the hybrid vehicle to propel the hybrid vehicle composes a high-way cruising operation mode IV; and wherein said operating both the at least one electric motor and the engine to propel the hybrid vehicle composes an acceleration operation mode V.

234. The method of claim 215, wherein the engine can be operated without transfer of power to the wheels of the hybrid vehicle during operation in mode I.

235. The method of claim 215, wherein the hybrid vehicle comprises a variable-ratio transmission disposed between the engine and the wheels of the hybrid vehicle.

236. The method of claim 235, wherein said variable-ratio transmission comprises a planetary gearbox.

237. The method of claim 215, wherein the engine is controllably coupled to one or more wheels of the hybrid vehicle by a clutch.

238. The method of claim 215, further comprising:
rotating the engine before starting the engine such that its cylinders are heated by compression of air therein.

239. The method of claim 215, further comprising:
operating the engine at torque output levels less than the SP under abnormal and transient conditions to satisfy drivability and/or safety considerations.

240. The method of claim 215, wherein the at least one electric motor is sufficiently powerful to provide acceleration of said vehicle sufficient to conform to the Federal urban cycle driving fuel mileage test without use of torque from the engine to propel the vehicle.

241. A method for controlling a hybrid vehicle, comprising:
determining instantaneous road load (RL) required to propel the hybrid vehicle responsive to an operator command;
operating at least one electric motor to propel the hybrid vehicle when the RL required to do so is less than a setpoint (SP);
operating an internal combustion engine of the hybrid vehicle to propel the hybrid vehicle when the RL required to do so is between the SP and a maximum torque output (MTO) of the engine, wherein the engine is operable to efficiently produce torque above the SP, and wherein the SP is substantially less than the MTO; and
operating both the at least one electric motor and the engine to propel the hybrid vehicle when the torque RL required to do so is more than the MTO;
controlling said engine such that combustion of fuel within the engine occurs substantially at a stoichiometric ratio, wherein said controlling the engine comprises limiting a rate of change of torque output of the engine; and
if the engine is incapable of supplying instantaneous torque required to propel the hybrid vehicle, supplying additional torque from the at least one electric motor.

242. The method of claim 241,
wherein said operating the at least one electric motor comprises supplying energy from a battery;
wherein a ratio of maximum DC voltage to maximum current supplied is at least 2.5.

243. The method of claim 242, wherein the maximum DC voltage is at least approximately 500 volts.

244. The method of claim 242, wherein the maximum current is less than approximately 150 amperes.

245. The method of claim 241,
wherein said operating the at least one electric motor comprises supplying energy from a battery;
wherein a maximum DC voltage supplied from said battery is at least approximately 500 volts.

246. The method of claim 241,
wherein said operating the at least one electric motor comprises supplying energy from a battery;
wherein a maximum current supplied from said battery is less than approximately 150 amperes.

247. The method of claim 241, wherein the at least one electric motor comprises a first electric motor and a second electric motor, the method further comprising:
operating a first alternating current-direct current (AC-DC) converter having an AC side coupled to the second electric motor, wherein said operating the first AC-DC converter comprises accepting AC or DC current and converting the current to DC or AC current respectively;
operating a second AC-DC converter coupled to a first electric motor, wherein said operating the second AC-DC converter comprises accepting AC current and converting the current to DC;
wherein said operating the at least one electric motor comprises supplying power from a battery;
wherein said battery is coupled to a DC side of said AC-DC converters;
storing DC energy received from said AC-DC converters and providing DC energy to at least said first AC-DC converter for providing power to at least said second electric motor; and
wherein a ratio of maximum DC voltage on the DC side of at least said first AC-DC converter coupled to said second electric motor to current supplied from said battery to at least said first AC-DC converter, when maximum current is so supplied, is at least 2.5.

248. The method of claim 247, wherein the maximum DC voltage on the DC side of either of said AC-DC converters is at least approximately 500 volts.

249. The method of claim 247, wherein the maximum DC current on the DC side of either of said AC-DC converters is less than approximately 150 amperes.

250. The method of claim 247, wherein a maximum DC voltage supplied from said battery is at least approximately 500 volts.

251. The method of claim 247, wherein a maximum current supplied from said battery is less than approximately 150 amperes.

252. The method of claim 241, further comprising:
turning off the engine when the torque required to propel the vehicle is less than the SP.

253. The method of claim 241, further comprising:
turning off the engine when the torque required to propel the vehicle and/or charge the battery is less than the SP.

254. The method of claim 241, further comprising:
monitoring a state of charge of a battery comprised in the hybrid vehicle, wherein the battery is operable to:
store energy from the at least one electric motor and/or the engine; and
transmit energy to the at least one electric motor to propel the hybrid vehicle.

255. The method of claim 241, further comprising:
operating the engine to charge the battery when the state of charge of the battery indicates the need to do so, wherein the engine is operable to provide torque at least equal to the SP to propel the hybrid vehicle and to drive the at least one electric motor to charge the battery, wherein a first portion of the torque equal to RL is used to propel the hybrid vehicle, wherein a second portion of the torque in excess of RL is used to drive the at least one electric motor to charge the battery, and wherein said operating the engine to charge the battery comprises if the engine is not already running, starting the engine.

256. The method of claim 241, wherein said operating the internal combustion engine of the hybrid vehicle to propel the hybrid vehicle and said operating both the at least one electric motor and the engine to propel the hybrid vehicle, each comprises:

if the engine is not already running, starting the engine.

257. The method of claim 241, further comprising:

receiving operator input specifying a desired cruising speed;

controlling instantaneous engine torque output and operation of the at least one electric motor in accordance with variation in the RL to maintain the speed of the hybrid vehicle according to the desired cruising speed.

258. The method of claim 241, wherein the SP is at least approximately 30% of the MTO.

259. The method of claim 241, wherein the hybrid vehicle is operated in a plurality of operating modes corresponding to values for the RL and the SP;

wherein said operating the at least one electric motor to drive the hybrid vehicle composes a low-load operation mode I;

wherein said operating the internal combustion engine of the hybrid vehicle to propel the hybrid vehicle composes a high-way cruising operation mode IV; and wherein said operating both the at least one electric motor and the engine to propel the hybrid vehicle composes an acceleration operation mode V.

260. The method of claim 241, wherein the engine can be operated without transfer of power to the wheels of the hybrid vehicle during operation in mode I.

261. The method of claim 241, wherein the hybrid vehicle comprises a variable-ratio transmission disposed between the engine and the wheels of the hybrid vehicle.

262. The method of claim 261, wherein said variable-ratio transmission comprises a planetary gear mechanism.

263. The method of claim 241, wherein the engine is controllably coupled to one or more wheels of the hybrid vehicle by a clutch.

264. The method of claim 241, further comprising:

rotating the engine before starting the engine such that its cylinders are heated by compression of air therein.

265. The method of claim 241, further comprising:

operating the engine at torque output levels less than the SP under abnormal and transient conditions to satisfy drivability and/or safety considerations.

266. The method of claim 241, wherein the at least one electric motor is sufficiently powerful to provide acceleration of said vehicle sufficient to conform to the Federal urban cycle driving fuel mileage test without use of torque from the engine to propel the vehicle.

267. A method for controlling a hybrid vehicle, comprising:

determining instantaneous road load (RL) required to propel the hybrid vehicle responsive to an operator command;

operating at least one electric motor to propel the hybrid vehicle when the RL required to do so is less than a setpoint (SP);

operating an internal combustion engine of the hybrid vehicle to propel the hybrid vehicle when the RL required to do so is between the SP and a maximum torque output (MTO) of the engine, wherein the engine is operable to efficiently produce torque above the SP, and wherein the SP is substantially less than the MTO;

operating both the at least one electric motor and the engine to propel the hybrid vehicle when the torque RL required to do so is more than the MTO; and rotating the engine before starting the engine such that its cylinders are heated by compression of air therein.

268. The method of claim 267, wherein said operating the at least one electric motor comprises supplying energy from a battery;

wherein a ratio of maximum DC voltage to maximum current supplied is at least 2.5.

269. The method of claim 268, wherein the maximum DC voltage is at least approximately 500 volts.

270. The method of claim 268, wherein the maximum current is less than approximately 150 amperes.

271. The method of claim 267, wherein said operating the at least one electric motor comprises supplying power from a battery;

wherein a maximum DC voltage supplied from said battery is at least approximately 500 volts.

272. The method of claim 267, wherein said operating the at least one electric motor comprises supplying power from a battery;

wherein a maximum current supplied from said battery is less than approximately 150 amperes.

273. The method of claim 267, wherein the at least one electric motor comprises a first electric motor and a second electric motor, the method further comprising:

operating a first alternating current-direct current (AC-DC) converter having an AC side coupled to the second electric motor, wherein said operating the first AC-DC converter comprises accepting AC or DC current and converting the current to DC or AC current respectively;

operating a second AC-DC converter coupled to a first electric motor, wherein said operating the second AC-DC converter comprises accepting AC current and converting the current to DC;

wherein said operating the at least one electric motor comprises supplying power from a battery;

wherein said battery is coupled to a DC side of said AC-DC converters;

storing DC energy received from said AC-DC converters and providing DC energy to at least said first AC-DC converter for providing power to at least said second electric motor; and wherein a ratio of maximum DC voltage on the DC side of at least said first AC-DC converter coupled to said second electric motor to current supplied from said battery to at least said first AC-DC converter, when maximum current is so supplied, is at least 2.5.

274. The method of claim 273, wherein the maximum DC voltage on the DC side of either of said AC-DC converters is at least approximately 500 volts.

275. The method of claim 273, wherein the maximum DC current on the DC side of either of said AC-DC converters is less than approximately 150 amperes.

276. The method of claim 273, wherein a maximum DC voltage supplied from said battery is at least approximately 500 volts.

277. The method of claim 273, wherein a maximum current supplied from said battery is less than approximately 150 amperes.

278. The method of claim 267, further comprising:
turning off the engine when the torque required to propel the vehicle is less than the SP.

279. The method of claim 267, further comprising:
turning off the engine when the torque required to propel the vehicle and/or charge the battery is less than the SP.

280. The method of claim 267, further comprising:
monitoring a state of charge of a battery comprised in the hybrid vehicle, wherein the battery is operable to:
store energy from the at least one electric motor and/or the engine; and
transmit energy to the at least one electric motor to propel the hybrid vehicle.

281. The method of claim 267, further comprising:
operating the engine to charge the battery when the state of charge of the battery indicates the need to do so, wherein the engine is operable to provide torque at least equal to the SP to propel the hybrid vehicle and to drive the at least one electric motor to charge the battery, wherein a first portion of the torque equal to RL is used to propel the hybrid vehicle, wherein a second portion of the torque in excess of RL is used to drive the at least one electric motor to charge the battery, and wherein said operating the engine to charge the battery comprises if the engine is not already running, starting the engine.

282. The method of claim 267, wherein said operating the internal combustion engine of the hybrid vehicle to propel the hybrid vehicle and said operating both the at least one electric motor and the engine to propel the hybrid vehicle, each comprises:
if the engine is not already running, starting the engine.

283. The method of claim 267, further comprising:
receiving operator input specifying a desired cruising speed;
controlling instantaneous engine torque output and operation of the at least one electric motor in accordance with variation in the RL to maintain the speed of the hybrid vehicle according to the desired cruising speed.

284. The method of claim 267, wherein the SP is at least approximately 30% of the MTO.

285. The method of claim 267,
wherein the hybrid vehicle is operated in a plurality of operating modes corresponding to values for the RL and the SP;
wherein said operating the at least one electric motor to drive the hybrid vehicle composes a low-load operation mode I;
wherein said operating the internal combustion engine of the hybrid vehicle to propel the hybrid vehicle composes a high-way cruising operation mode IV; and
wherein said operating both the at least one electric motor and the engine to propel the hybrid vehicle composes an acceleration operation mode V.

286. The method of claim 285, wherein the engine can be operated without transfer of power to the wheels of the hybrid vehicle during operation in mode I.

287. The method of claim 267, wherein the hybrid vehicle comprises a variable-ratio transmission disposed between the engine and the wheels of the hybrid vehicle.

288. The method of claim 287, wherein said variable-ratio transmission comprises a planetary gearbox.

289. The method of claim 267, wherein the engine is controllably coupled to one or more wheels of the hybrid vehicle by a clutch.

290. The method of claim 267, further comprising:
operating the engine at torque output levels less than the SP under abnormal and transient conditions to satisfy drivability and/or safety considerations.

291. The hybrid vehicle of claim 267, wherein the at least one electric motor is sufficiently powerful to provide acceleration of said vehicle sufficient to conform to the Federal urban cycle driving fuel mileage test without use of torque from the engine to propel the vehicle.

292. A hybrid vehicle, comprising:
a controller capable of accepting inputs indicative of vehicle operating parameters and providing control signals in response to a control program;
a battery bank;
an internal combustion engine operable to provide propulsive torque to road wheels of said vehicle;
a first AC electric starting motor electrically coupled to said battery bank and mechanically coupled to said internal combustion engine, and responsive to commands from said controller for (a) accepting electrical energy from said battery bank and (b) providing electrical energy to said battery bank, such that said first electric motor can be controlled to (1) accept torque from said engine to charge said battery bank, and (2) accept energy from said battery bank to apply torque to said engine for starting said engine;
a second AC electric traction motor, electrically coupled to said battery bank and mechanically coupled to road wheels of said vehicle, and responsive to commands from said controller, for (a) accepting electrical energy from said battery bank and (b) providing electrical energy to said battery bank such that said second electric motor can be controlled to (1) accept energy from said battery bank to apply torque to said road wheels to propel said vehicle, and (2) accept torque from said road wheels to charge said battery bank;
a solid state inverter connected to the second AC motor for converting DC to AC and AC to DC;
wherein said controller is provided with signals responsive to the instantaneous road load experienced by said vehicle and to the state of charge of said battery bank, and controls operation of said engine and said first and second motors so that said vehicle is operated in a plurality of operating modes responsive to said signals; and
wherein energy originating at the battery is supplied to the solid state inverter at a DC voltage having a peak of at least 500 volts.

293. The vehicle of claim 292 wherein energy originating at the battery is supplied to the solid state inverter at a maximum current of no more than about 75 amperes.

294. A hybrid vehicle, comprising:
a controller capable of accepting inputs indicative of vehicle operating parameters and providing control signals in response to a control program;
a battery bank;
an internal combustion engine operable to provide propulsive torque to road wheels of said vehicle;
a first AC electric starting motor electrically coupled to said battery bank and mechanically coupled to said internal combustion engine, and responsive to commands from said controller for (a) accepting electrical energy from said battery bank and (b) providing electrical energy to said battery bank, such that said first electric motor can be controlled to (1) accept torque from said engine to charge said battery bank, and (2) accept energy from said battery bank to apply torque to said engine for starting said engine;

a second AC electric traction motor, electrically coupled to said battery bank and mechanically coupled to road wheels of said vehicle, and responsive to commands from said controller, for (a) accepting electrical energy from said battery bank and (b) providing electrical energy to said battery bank such that said second electric motor can be controlled to (1) accept energy from said battery bank to apply torque to said road wheels to propel said vehicle, and (2) accept torque from said road wheels to charge said battery bank;

a solid state inverter connected to the second AC motor for converting DC to AC and AC to DC;

wherein said controller is provided with signals responsive to the instantaneous road load experienced by said vehicle and to the state of charge of said battery bank, and controls operation of said engine and said first and second motors so that said vehicle is operated in a plurality of operating modes responsive to said signals; and wherein energy originating at the battery is supplied to the solid state inverter at a maximum current of no more than about 75 amperes.

295. A hybrid vehicle, comprising:

a controller capable of accepting inputs indicative of vehicle operating parameters and providing control signals in response to a control program;

a battery bank;

an internal combustion engine operable to provide propulsive torque to road wheels of said vehicle;

a first AC electric starting motor electrically coupled to said battery bank and mechanically coupled to said internal combustion engine, and responsive to commands from said controller for (a) accepting electrical energy from said battery bank and (b) providing electrical energy to said battery bank, such that said first electric motor can be controlled to (1) accept torque from said engine to charge said battery bank, and (2) accept energy from said battery bank to apply torque to said engine for starting said engine;

a second AC electric traction motor, electrically coupled to said battery bank and mechanically coupled to road wheels of said vehicle, and responsive to commands from said controller, for (a) accepting electrical energy from said battery bank and (b) providing electrical energy to said battery bank such that said second electric motor can be controlled to (1) accept energy from said battery bank to apply torque to said road wheels to propel said vehicle, and (2) accept torque from said road wheels to charge said battery bank;

a solid state inverter connected to the second AC motor for converting DC to AC and AC to DC;

wherein said controller is provided with signals responsive to the instantaneous road load experienced by said vehicle and to the state of charge of said battery bank, and controls operation of said engine and said first and second motors so that said vehicle is operated in a plurality of operating modes responsive to said signals; and wherein energy originating at the battery is supplied to the solid state inverter at a voltage and current such that the ratio of voltage to current is at least about 2.5 to 1.

296. A hybrid vehicle, comprising:

a controller capable of accepting inputs indicative of vehicle operating parameters and providing control signals in response to a control program;

a battery bank;

an internal combustion engine operable to provide propulsive torque to road wheels of said vehicle;

a first AC electric starting motor electrically coupled to said battery bank and mechanically coupled to said internal combustion engine, and responsive to commands from said controller for (a) accepting electrical energy from said battery bank and (b) providing electrical energy to said battery bank, such that said first electric motor can be controlled to (1) accept torque from said engine to charge said battery bank, and (2) accept energy from said battery bank to apply torque to said engine for starting said engine;

a second AC electric traction motor, electrically coupled to said battery bank and mechanically coupled to road wheels of said vehicle, and responsive to commands from said controller, for (a) accepting electrical energy from said battery bank and (b) providing electrical energy to said battery bank such that said second electric motor can be controlled to (1) accept energy from said battery bank to apply torque to said road wheels to propel said vehicle, and (2) accept torque from said road wheels to charge said battery bank;

a solid state inverter connected to the second AC motor for converting DC to AC and AC to DC;

wherein said controller is provided with signals responsive to the instantaneous road load experienced by said vehicle and to the state of charge of said battery bank, and controls operation of said engine and said first and second motors so that said vehicle is operated in a plurality of operating modes responsive to said signals; and wherein energy originating at the battery is supplied to the solid state inverter at a voltage having a peak of at least about 800 volts.

297. The vehicle of claim 296 wherein energy originating at the battery is supplied to the solid state inverter at a peak current of no more than 150 amperes.

298. A hybrid vehicle, comprising:

a controller capable of accepting inputs indicative of vehicle operating parameters and providing control signals in response to a control program;

a battery bank;

an internal combustion engine operable to provide propulsive torque to road wheels of said vehicle;

a first AC electric starting motor electrically coupled to said battery bank and mechanically coupled to said internal combustion engine, and responsive to commands from said controller for (a) accepting electrical energy from said battery bank and (b) providing electrical energy to said battery bank, such that said first electric motor can be controlled to (1) accept torque from said engine to charge said battery bank, and (2) accept energy from said battery bank to apply torque to said engine for starting said engine;

a second AC electric traction motor, electrically coupled to said battery bank and mechanically coupled to road wheels of said vehicle, and responsive to commands from said controller, for (a) accepting electrical energy from said battery bank and (b) providing electrical energy to said battery bank such that said second electric motor can be controlled to (1) accept energy from said battery bank to apply torque to said road wheels to propel said vehicle, and (2) accept torque from said road wheels to charge said battery bank;

a solid state inverter connected to the second AC motor for converting DC to AC and AC to DC;

wherein said controller is provided with signals responsive to the instantaneous road load experienced by said vehicle and to the state of charge of said battery bank, and controls operation of said engine and said first and second motors so that said vehicle is operated in a plurality of operating modes responsive to said signals; and wherein energy originating at the battery is supplied to the solid state inverter at a maximum current of no more than 150 amperes.

299. A hybrid vehicle, comprising:

a controller capable of accepting inputs indicative of vehicle operating parameters and providing control signals in response to a control program;

a battery bank;

an internal combustion engine operable to provide propulsive torque to road wheels of said vehicle;

a first AC electric starting motor electrically coupled to said battery bank and mechanically coupled to said internal combustion engine, and responsive to commands from said controller for (a) accepting electrical energy from said battery bank and (b) providing electrical energy to said battery bank, such that said first electric motor can be controlled to (1) accept torque from said engine to charge said battery bank, and (2) accept energy from said battery bank to apply torque to said engine for starting said engine;

a second AC electric traction motor, electrically coupled to said battery bank and mechanically coupled to road wheels of said vehicle, and responsive to commands from said controller, for (a) accepting electrical energy from said battery bank and (b) providing electrical energy to said battery bank such that said second electric motor can be controlled to (1) accept energy from said battery bank to apply torque to said road wheels to propel said vehicle, and (2) accept torque from said road wheels to charge said battery bank;

a solid state inverter connected to the second AC motor for converting DC to AC and AC to DC;

wherein said controller is provided with signals responsive to the instantaneous road load experienced by said vehicle and to the state of charge of said battery bank, and controls operation of said engine such that said engine is operated only above a setpoint (SP), said setpoint SP varying as a function of said vehicle operating parameters.

300. The vehicle of claim 299, wherein said setpoint SP is varied as a function of vehicle speed.

301. The hybrid vehicle of claim 299, wherein the second electric motor is sufficiently powerful to provide acceleration of said vehicle sufficient to conform to the Federal urban cycle driving fuel mileage test without use of power from the engine to propel the vehicle.

302. A hybrid vehicle, comprising:

one or more wheels;

an internal combustion engine operable to propel the hybrid vehicle by providing torque to the one or more wheels;

a first electric motor coupled to the engine;

a second electric motor operable to propel the hybrid vehicle by providing torque to the one or more wheels;

a battery coupled to the first and second electric motors, operable to:

provide current to the first and/or the second electric motors; and accept current from the first and second electric motors; and a controller, operable to control the flow of electrical and mechanical power between the engine, the first and the second electric motors, and the one or more wheels;

a first alternating current-direct current (AC-DC) converter coupled to said first electric motor, at least operable to accept AC current and convert the current to DC;

a second AC-DC converter having an AC side coupled to said second electric motor, operable to accept AC or DC current and convert the current to DC or AC current respectively;

wherein said battery is coupled to a DC side of said AC-DC converters, wherein said battery is operable to store DC energy received from said AC-DC converters and provide DC energy to at least said second AC-DC converter for providing power to at least said second electric motor;

wherein a ratio of maximum DC voltage to maximum current supplied from said battery, measured on the DC side of at least said second AC-DC converter, is at least 2.5; and wherein the controller is operable to operate the engine when the power required from the engine to satisfy the road load experienced by the vehicle and/or to drive one or more of the first and second motors to charge the battery is at least equal to a minimum value at which power is efficiently produced by said engine but that is substantially less than the maximum power output of the engine.

303. A hybrid vehicle, comprising:

one or more wheels;

an internal combustion engine operable to propel the hybrid vehicle by providing torque to the one or more wheels;

a first electric motor coupled to the engine;

a second electric motor operable to propel the hybrid vehicle by providing torque to the one or more wheels;

a battery coupled to the first and second electric motors, operable to:

provide current to the first and/or the second electric motors; and accept current from the first and second electric motors; and a controller, operable to control the flow of electrical and mechanical power between the engine, the first and the second electric motors, and the one or more wheels;

a first alternating current-direct current (AC-DC) converter coupled to said first electric motor, at least operable to accept AC current and convert the current to DC;

a second AC-DC converter having an AC side coupled to said second electric motor, operable to accept AC or DC current and convert the current to DC or AC current respectively;

wherein said battery is coupled to a DC side of said AC-DC converters, wherein said battery is operable to store DC energy received from said AC-DC converters and provide DC energy to at least said second AC-DC converter for providing power to at least said second electric motor;

wherein the peak DC voltage, measured on the DC side of at least said second AC-DC converter, is at least about 500 volts; and wherein the controller is operable to operate the engine when the power required from the engine to satisfy the road load experienced by the vehicle and/or to drive one or more of the first and second motors to charge the battery is at least equal to a minimum value at which power is efficiently produced by said engine but that is substantially less than the maximum power output of the engine.

304. A hybrid vehicle, comprising:

one or more wheels;

an internal combustion engine operable to propel the hybrid vehicle by providing torque to the one or more wheels;

a first electric motor coupled to the engine;

a second electric motor operable to propel the hybrid vehicle by providing torque to the one or more wheels;

a battery coupled to the first and second electric motors, operable to:
  provide current to the first and/or the second electric motors; and
  accept current from the first and second electric motors; and a controller, operable to control the flow of electrical and mechanical power between the engine, the first and the second electric motors, and the one or more wheels;

a first alternating current-direct current (AC-DC) converter coupled to said first electric motor, at least operable to accept AC current and convert the current to DC;

a second AC-DC converter having an AC side coupled to said second electric motor, operable to accept AC or DC current and convert the current to DC or AC current respectively;

wherein said battery is coupled to a DC side of said AC-DC converters, wherein said battery is operable to store DC energy received from said AC-DC converters and provide DC energy to at least said second AC-DC converter for providing power to at least said second electric motor;

wherein the peak DC current, measured on the DC side of at least said second AC-DC converter, is no more than about 150 amperes; and wherein the controller is operable to operate the engine when the power required from the engine to satisfy the road load experienced by the vehicle and/or to drive one or more of the first and second motors to charge the battery is at least equal to a minimum value at which power is efficiently produced by said engine but that is substantially less than the maximum power output of the engine.

305. A hybrid vehicle, comprising:

one or more wheels;

an internal combustion engine operable to propel the hybrid vehicle by providing torque to the one or more wheels;

a first electric motor coupled to the engine;

a second electric motor operable to propel the hybrid vehicle by providing torque to the one or more wheels;

a battery coupled to the first and second electric motors, operable to:
  provide current to the first and/or the second electric motors; and
  accept current from the first and second electric motors; and a controller, operable to control the flow of electrical and mechanical power between the engine, the first and the second electric motors, and the one or more wheels;

wherein energy originating at the battery is supplied to the second motor at a peak voltage of at least about 500 volts; and wherein the controller is operable to operate the engine when the power required from the engine to satisfy the road load experienced by the vehicle and/or to drive one or more of the first and second motors to charge the battery is at least equal to a minimum value at which power is efficiently produced by said engine but that is substantially less than the maximum power output of the engine.

306. A hybrid vehicle, comprising:

one or more wheels;

an internal combustion engine operable to propel the hybrid vehicle by providing torque to the one or more wheels;

a first electric motor coupled to the engine;

a second electric motor operable to propel the hybrid vehicle by providing torque to the one or more wheels;

a battery coupled to the first and second electric motors, operable to:
  provide current to the first and/or the second electric motors; and
  accept current from the first and second electric motors; and a controller, operable to control the flow of electrical and mechanical power between the engine, the first and the second electric motors, and the one or more wheels;

wherein power originating at the battery is supplied to the second motor at a peak current no greater than about 150 amperes; and wherein the controller is operable to operate the engine when the power required from the engine to satisfy the road load experienced by the vehicle and/or to drive one or more of the first and second motors to charge the battery is at least equal to a minimum value at which power is efficiently produced by said engine but that is substantially less than the maximum power output of the engine.

* * * * *